US011910861B2

(12) United States Patent
VanDerWoude et al.

(10) Patent No.: US 11,910,861 B2
(45) **Date of Patent: *Feb. 27, 2024**

(54) SURGICAL PERSONAL PROTECTION APPARATUS

(71) Applicant: Stryker Corporation, Kalamazoo, MI (US)

(72) Inventors: Brian James VanDerWoude, Portage, MI (US); Marshall Proulx, Keller, TX (US); David H. Grulke, Battle Creek, MI (US); Bruce D. Henniges, Galesburg, MI (US)

(73) Assignee: Stryker Corporation, Kalamazoo, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/199,577

(22) Filed: May 19, 2023

(65) Prior Publication Data

US 2023/0292876 A1 Sep. 21, 2023

Related U.S. Application Data

(60) Continuation of application No. 17/133,431, filed on Dec. 23, 2020, now Pat. No. 11,684,106, which is a (Continued)

(51) Int. Cl.

*A42B 3/28* (2006.01)
*A41D 13/002* (2006.01)
(Continued)

(52) U.S. Cl.

CPC .......... *A42B 3/225* (2013.01); *A41D 13/0025* (2013.01); *A41D 13/1153* (2013.01);
(Continued)

(58) Field of Classification Search

CPC ........... A42B 3/322; A62B 17/04; A61F 9/02; A41D 13/1153; A41D 13/1218
See application file for complete search history.

(56) References Cited

U.S. PATENT DOCUMENTS 3,549,831 A 12/1970 Forney
3,963,021 A 6/1976 Bancroft
(Continued)

FOREIGN PATENT DOCUMENTS

CA 1178752 A 12/1984
CA 2201973 A1 10/1998
(Continued)

OTHER PUBLICATIONS

CS Medical, "Hopro Personal Protection System Brochure", http://www.csm-medical.com/catalogo/Ortopedia/helmet.pdf, 2018, 3 pages.
(Continued)

*Primary Examiner* — Tajash D Patel
(74) *Attorney, Agent, or Firm* — Howard & Howard Attorneys PLLC

(57) ABSTRACT

A surgical protection system to define a barrier between the user and the external environment. The surgical protection system comprising a helmet assembly, a hood and a transparent face shield. The helmet including a shell, a face frame coupled to the shell, a static tab, a first fastener disposed on the face frame; and a fan mounted to the shell and configured to circulate air about the user. The hood may include a first material defining an opening. The shield may be formed from flexible material and disposed within the opening of the hood. The shield may further include a tab extending from a top portion of the shield and define an opening configured to receive the static tab of the helmet to align the
(Continued)

shield to the helmet. The first fastener disposed on the face frame may be configured to facilitate removable attachment of the shield to the helmet.

30 Claims, 47 Drawing Sheets

Related U.S. Application Data continuation of application No. 16/208,630, filed on Dec. 4, 2018, now Pat. No. 10,874,163, which is a continuation of application No. 15/644,750, filed on Jul. 8, 2017, now Pat. No. 10,201,207, which is a division of application No. 14/927,541, filed on Oct. 30, 2015, now Pat. No. 9,706,808, which is a division of application No. 14/461,480, filed on Aug. 18, 2014, now Pat. No. 9,173,437, which is a division of application No. 13/616,010, filed on Sep. 14, 2012, now Pat. No. 8,819,869, which is a division of application No. 12/813,084, filed on Jun. 10, 2010, now Pat. No. 8,282,234, which is a division of application No. 11/485,783, filed on Jul. 13, 2006, now Pat. No. 7,735,156.

(60) Provisional application No. 60/699,166, filed on Jul. 14, 2005.

(51) Int. Cl.

| | |
|---|---|
| ***A41D 13/11*** | (2006.01) |
| ***A41D 13/12*** | (2006.01) |
| ***A42B 3/22*** | (2006.01) |
| ***A42B 3/30*** | (2006.01) |
| ***A42B 3/32*** | (2006.01) |
| ***A62B 17/04*** | (2006.01) |
| ***A62B 18/00*** | (2006.01) |
| ***A62B 18/04*** | (2006.01) |

(52) U.S. Cl.
CPC .......... *A41D 13/1209* (2013.01); *A42B 3/286* (2013.01); *A42B 3/30* (2013.01); *A42B 3/322* (2013.01); *A62B 17/04* (2013.01); *A62B 18/003* (2013.01); *A62B 18/045* (2013.01)

(56) References Cited

U.S. PATENT DOCUMENTS

| | | | |
|---|---|---|---|
| 4,280,491 | A | 7/1981 | Berg et al. |
| 4,333,983 | A | 6/1982 | Allen |
| 4,716,601 | A | 1/1988 | McNeal |
| 4,890,335 | A | 1/1990 | Crowson |
| 4,901,716 | A | 2/1990 | Stackhouse |
| 5,009,225 | A | 4/1991 | Vrabel |
| 5,054,479 | A | 10/1991 | Yelland |
| 5,054,480 | A | 10/1991 | Bare |
| 5,404,577 | A | 4/1995 | Zuckerman et al. |
| 5,421,326 | A | 6/1995 | Rankin |
| 5,592,936 | A | 1/1997 | Thomas, Jr. |
| 5,652,964 | A | 8/1997 | Reinhardt |
| 5,720,281 | A | 2/1998 | Allen et al. |
| 5,887,281 | A | 3/1999 | Green |
| 5,991,072 | A | 11/1999 | Solyntjes et al. |
| 6,026,511 | A | 2/2000 | Baumann et al. |
| 6,249,918 | B1 | 6/2001 | Lacroix |
| 6,393,617 | B1 | 5/2002 | Paris |
| 6,461,709 | B1 | 10/2002 | Janssen et al. |
| 6,481,019 | B2 | 11/2002 | Diaz et al. |
| 6,711,748 | B2 | 3/2004 | Paris |
| 6,751,807 | B2 | 6/2004 | Klotz |
| 6,777,055 | B2 | 8/2004 | Janssen et al. |
| 6,798,392 | B2 | 9/2004 | Hartwell |
| 6,973,677 | B2 | 12/2005 | Diaz et al. |
| 6,990,691 | B2 | 1/2006 | Klotz et al. |
| 7,192,151 | B2 | 3/2007 | Clupper et al. |
| 7,200,873 | B2 | 4/2007 | Klotz et al. |
| 7,357,135 | B2 | 4/2008 | Cunningham et al. |
| 7,370,991 | B1 | 5/2008 | Ellis-Fant |
| 7,534,005 | B1 | 5/2009 | Buckman |
| 7,722,921 | B2 | 5/2010 | Shimoda |
| 7,735,156 | B2 | 6/2010 | VanDerWoude et al. |
| 7,752,682 | B2 | 7/2010 | VanDerWoude et al. |
| 7,832,396 | B2 | 11/2010 | Abernethy |
| 7,937,775 | B2 | 5/2011 | Manzella, Jr. et al. |
| 8,234,722 | B2 | 8/2012 | VanDerWoude et al. |
| 8,282,234 | B2 | 10/2012 | VanDerWoude et al. |
| 8,464,366 | B2 | 6/2013 | Carron |
| 8,819,869 | B2 | 9/2014 | VanDerWoude et al. |
| 8,899,774 | B2 | 12/2014 | Strong et al. |
| 8,907,224 | B2 | 12/2014 | Kajiya et al. |
| 9,034,489 | B2 | 5/2015 | Jing et al. |
| 9,155,924 | B1 | 10/2015 | Grove |
| 9,173,437 | B2 | 11/2015 | VanDerWoude et al. |
| 9,206,335 | B2 | 12/2015 | Hager et al. |
| 9,340,683 | B2 | 5/2016 | Jing et al. |
| 9,400,101 | B2 | 7/2016 | Strong et al. |
| 9,415,561 | B2 | 8/2016 | Lindquist et al. |
| 9,556,338 | B2 | 1/2017 | Jing et al. |
| 9,575,231 | B2 | 2/2017 | Chu |
| 9,706,808 | B2 | 7/2017 | Sclafani et al. |
| 9,841,534 | B2 | 12/2017 | Tapio et al. |
| 10,160,868 | B2 | 12/2018 | Jing et al. |
| 10,175,390 | B2 | 1/2019 | Nishimura et al. |
| 10,201,207 | B2 | 2/2019 | VanDerWoude et al. |
| 10,208,190 | B2 | 2/2019 | Jing et al. |
| 10,253,964 | B2 | 4/2019 | Strong et al. |
| 10,427,385 | B2 | 10/2019 | Wilson et al. |
| 10,696,028 | B2 | 6/2020 | Johnson et al. |
| 10,830,428 | B2 | 11/2020 | Africa et al. |
| 10,836,675 | B2 | 11/2020 | Leivo et al. |
| 10,874,163 | B2 | 12/2020 | VanDerWoude et al. |
| 10,889,725 | B2 | 1/2021 | Jing et al. |
| 10,927,277 | B2 | 2/2021 | Krull et al. |
| 10,948,745 | B2 | 3/2021 | Hallock et al. |
| 2001/0032348 | A1 | 10/2001 | Diaz et al. |
| 2003/0083112 | A1 | 5/2003 | Fukuda |
| 2003/0182710 | A1 | 10/2003 | Klotz et al. |
| 2005/0010992 | A1 | 1/2005 | Klotz et al. |
| 2005/0015860 | A1 | 1/2005 | Reaux |
| 2005/0108807 | A1 | 5/2005 | Ahn et al. |
| 2005/0109337 | A1 | 5/2005 | Diaz |
| 2005/0117327 | A1 | 6/2005 | Gupta |
| 2006/0029784 | A1 | 2/2006 | Doan et al. |
| 2006/0056030 | A1 | 3/2006 | Fukuda et al. |
| 2006/0133069 | A1 | 6/2006 | Clupper et al. |
| 2007/0050898 | A1 | 3/2007 | Larson et al. |
| 2009/0239048 | A1 | 9/2009 | Sugihara |
| 2010/0035039 | A1 | 2/2010 | Jing et al. |
| 2010/0092765 | A1 | 4/2010 | Hager et al. |
| 2011/0168261 | A1 | 7/2011 | Welser et al. |
| 2012/0200816 | A1 | 8/2012 | Krasnov |
| 2013/0224478 | A1 | 8/2013 | Jing et al. |
| 2013/0247286 | A1 | 9/2013 | VanderWoude et al. |
| 2015/0359675 | A1 | 12/2015 | Wilson |
| 2016/0259102 | A1 | 9/2016 | Taka |
| 2020/0190365 | A1 | 6/2020 | Krull et al. |
| 2021/0053320 | A1 | 2/2021 | Patzman et al. |
| 2021/0177083 | A1 | 6/2021 | VanDerWoude et al. |
| 2022/0072347 | A1* | 3/2022 | Oliver, III ............ A62B 23/025 |
| 2022/0087356 | A1 | 3/2022 | Asnis et al. |
| 2022/0273066 | A1* | 9/2022 | Isham ................ A41D 13/1153 |
| 2022/0295935 | A1* | 9/2022 | Hall ....................... A62B 18/08 |
| 2023/0029404 | A1 | 1/2023 | Hall et al. |

(56) References Cited

U.S. PATENT DOCUMENTS

| | | | | |
|---|---|---|---|---|
| 2023/0111620 A1* | 4/2023 | Davie | .................... | A42B 3/286 600/249 |
| 2023/0128743 A1* | 4/2023 | Hashimoto | ............ | A42B 3/286 128/201.23 |

FOREIGN PATENT DOCUMENTS

| | | | |
|---|---|---|---|
| DE | 29818794 | U1 | 1/1999 |
| EP | 0199449 | A2 | 10/1986 |
| EP | 0338714 | A2 | 10/1989 |
| EP | 0465971 | A2 | 1/1992 |
| EP | 2316289 | A2 | 5/2011 |
| JP | S50116611 | U | 9/1975 |
| JP | S63199132 | A | 8/1988 |
| JP | H01033525 | U | 3/1989 |
| JP | H06023001 | A | 2/1994 |
| JP | H1096116 | A | 4/1998 |
| WO | 20016839 | A1 | 2/2001 |
| WO | 0114013 | A1 | 3/2001 |
| WO | 2007011646 | A2 | 1/2007 |
| WO | 2015093413 | A1 | 6/2015 |
| WO | 18095866 | A1 | 5/2018 |

OTHER PUBLICATIONS

English language abstract and machine-assisted English translation for CA 2 201 973 extracted from espacenet.com database on May 9, 2018, 1 page.
English language abstract and machine-assisted English translation for DE 298 18 794 extracted from espacenet.com database on May 9, 2018, 16 pages.
English language abstract and machine-assisted English translation for JPH 10-96116 extracted from espacenet.com database on Sep. 17, 2020, 6 pages.
English language abstract for WO 2015/093413 A1 extracted from espacenet.com database on Mar. 24, 2021, 2 pages.
EPO, "International Search Report for PCT App. No. PCT/US2006/027214, dated Feb. 2007".
EPO, "ISA Written Opinion" for PCT App. No. PCT/US2006/027214, dated Feb. 2007.
International Search Report for International Application No. PCT/US2017/044438, dated Oct. 23, 2017, 2 pages.
IP Australia, "Examination Report for AU Application No. 2013202901", dated Nov. 2013.
Anglet, M. et al., "Antireflective Films", from Chapter 15 of Handbook of Sol-Gel Science and Technology Processing Characterization and Applications, copyright 2005, pp. 332-334, 337, 339-341., taken from websitehttps://books.google.com/books?id=i9swy1D2HxIC&Ipg=PA339&dq=AR%20- thick%20film%20coatings&pg=PA339#v=onepage&q=AR%20thick%20film%20coatings&-f=false.
Li, H.-M. et al., "Influence of weight ratio in polymer blend film on the phase separation structure and its optical properties", The European Physical Journal Applied Physics, 45, 20501, published Jan. 31, 2009, EDP Sciences, 4 pages.
Machine-assisted English translation for JPH 01-033525 extracted from the Japanese Patent Office database on Sep. 17, 2020, 3 pages.
Machine-assisted English translation for JPS 50-116611 extracted from espacenet.com database on Sep. 17, 2020, 3 pages.
MDS Nordion, "Gamma Compatible Materials," https://ab-div-bdi-bl-blm.web.cern.ch/Radiation/Gamma_Compatible_Materials_List_company.pdf, Aug. 2007 4 pages.
Molnlycke, "Molnlycke Webpage", https://www.molnlycke.us/about-us/, 2018, 7 pages.
Penn Optical Coatings "Coatings Webpage", https://www.pennoc.com/capabilities/, 2017, 3 pages.
Stryker Instruments, "T-4 fiber Optic Surgical Helmet Assembly, Eng. Drawings", May 2000, Kalamazoo, MI.
Stryker Instruments, T4 Personal Protection System, T4 Fiber Optic Surgical Helmet, Instructions for Use, Jun. 2004, Kalamazoo, MI.
U.S. Appl. No. 60/664,900, filed Mar. 24, 2005.
Wikipedia, "Anti-Reflective Coating," https://en.m.wikipedia.org/wiki/Anti-reflective_coating, Jul. 13, 2017, 5 pages.
Wikipedia, "Monotonic Function," https://en.wikipedia.org/wiki/Monotonic_function, May 24, 2017, 7 pages.
Wikipedia, "Thin Film", https://en.wikipedia.org/wiki/Thin_film, Jun. 20, 2017, 11 pages.
Zhang, Xin-Xiang et al., Abstract of "One-step sol-gel preparation of PDMS-silica ORMOSILs as environment-resistant and crack-free thick antireflective coatings," Journal of Materials Chemistry, Issue 26, https://pubs.rsc.org/en/content/articlelanding/2012/jm/c2jm31005h#!divAbstract, 2012, 5 pages.

* cited by examiner

SURGICAL PERSONAL PROTECTION APPARATUS

RELATIONSHIP TO EARLIER FILED APPLICATIONS

This application is a continuation of U.S. patent application Ser. No. 17/133,431 filed 23 Dec. 2020. U.S. patent application Ser. No. 17/133,431 is a continuation of U.S. patent application Ser. No. 16/208,630 filed 4 Dec. 2018, now U.S. Pat. No. 10,874,163. U.S. patent application Ser. No. 16/208,630 is a continuation of U.S. patent application Ser. No. 15/644,750 filed on 8 Jul. 2017, now U.S. Pat. No. 10,201,207. U.S. patent application Ser. No. 15/644,750 is a divisional of U.S. patent application Ser. No. 14/927,541 filed 30 Oct. 2015 now U.S. Pat. No. 9,706,808. U.S. patent application Ser. No. 14/927,541 is a divisional of U.S. patent application Ser. No. 14/461,480 filed 18 Aug. 2014, now U.S. Pat. No. 9,173,437. U.S. patent application Ser. No. 14/461,480 is a divisional of U.S. patent application Ser. No. 13/616,010 filed 14 Sep. 2012 now U.S. Pat. No. 8,819,869. U.S. patent application Ser. No. 13/616,010 is a divisional of U.S. patent application Ser. No. 12/813,084 filed 10 Jun. 2010, now U.S. Pat. No. 8,282,234. U.S. patent application Ser. No. 12/813,084 is a divisional of U.S. patent application Ser. No. 11/485,783, filed 13 Jul. 2006, now U.S. Pat. No. 7,735,156. U.S. patent application Ser. No. 11/485,783 claims priority under 35 U.S.C. Sec. 119 from U.S. Patent Application No. 60/699,166 filed 14 Jul. 2005. The contents of the priority applications are hereby incorporated by reference.

BACKGROUND

Personal protection systems are used in surgical procedures to provide a sterile barrier between the surgical personnel and the patient. One such system is disclosed in U.S. Pat. No. 5,054,480, the contents of which are incorporated herein by reference discloses that basic structure of such a system. Specifically, the traditional system includes a helmet that supports a toga or a hood. This assemblage is worn by medical/surgical personnel that want to establish the sterile barrier. The toga or the hood includes a transparent face shield. The helmet includes a ventilation unit that includes a fan. The ventilation unit draws air through the toga/hood so the air is circulated around the wearer. This reduces both the amount of heat that is trapped within the toga/hood and the $CO_2$ that builds up in this space. It is further known to mount a light to the helmet. The light, which is directed through face shield illuminates the surgical site.

Conventional personal protection systems do a reasonable job of providing a sterile barrier between the surgical personnel and the surrounding environment. However, there are some limitations associated with their use. The toga/hood that covers the wearer blocks sound waves. This means an individual wearing the system may have to speak loudly, even shout, to be heard. This is especially the case when the hooded individual is trying to communicate with another individual similarly attired.

Furthermore, while it is known to provide light with the helmet, it has proven difficult to provide a workable light. This is because in one proposed system, it is proposed that the actual light be emitted by a source at a static console. The light is supplied to the helmet for emission therefrom through a fiber optic cable. Thus with this system, the wearer is essentially tethered to the light source. This both limits the mobility of the individual and requires other operating room personnel to navigate around the tether. Alternatively, the light source could be mounted in the helmet. Such light sources generate heat. This heat can cause the temperature beneath the toga/hood to rise to an uncomfortable level.

Moreover, the helmet and the equipment it supports, places a load on the head of the wearer. Over time this load can impose an appreciable strain on the muscles and skeletal structure.

SUMMARY

This invention relates to a new and useful personal protection system such as the type of system used to provide a sterile boundary around medical/surgical personnel.

The system of this invention includes a ventilation unit for supplying ventilation air underneath the toga/hood of wearer. There is a light unit. The light unit has a light source positioned in line with the air discharged from the ventilation unit. This arrangement minimizes the buildup of heat around the light unit.

The system of this invention also includes an in-helmet mounted RF communications system.

The system of this invention also has a head unit that substitutes for a conventional helmet. The head unit includes a head band and a ventilation unit that is suspended above the head band. The ventilation unit is adjustably positioned relative to the head band. This allows the ventilation unit to be positioned relative to the head of the wearer so it is located where it will impose only a minimal strain on the wearer.

BRIEF DESCRIPTION OF THE DRAWINGS

Other advantages of the present invention will be readily appreciated as the same becomes better understood by reference to the following detailed description when considered in connection with the accompanying drawings wherein:

FIG. 35 is a perspective view of the face frame;

DETAILED DESCRIPTION OF THE INVENTION

I. Overview

Referring to the Figures, wherein like numerals indicate like or corresponding parts throughout the several views, a personal protection system is generally shown at 10.

Figure 1:
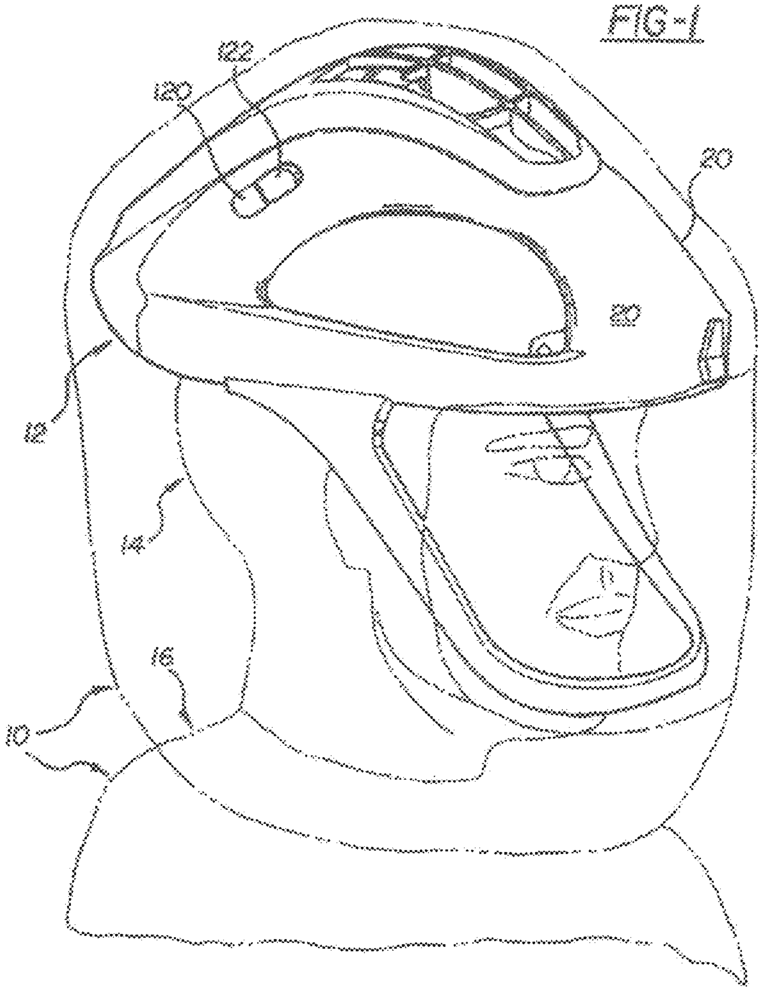
FIG. 1 is a perspective view of a helmet type personal protection system of this invention fitted over the head of a user.

The personal protection system 10 is adapted from the personal protection system 10 disclosed in U.S. Pat. No. 6,481,019 to Diaz et al. and U.S. Provisional Patent Application No. 60/664,900, both of which are hereby incorporated by reference. The personal protection system 10 of the present invention is implemented as a helmet assembly 12 mountable to the head 14 of a user, as shown in FIG. 1.

The personal protection system 10 filters air between the head 14 and body 16 of a user, e.g., a medical professional, and an environment external to the user. The helmet assembly 12 distributes air about the head 14 of the user as will be described below. More specifically, the helmet assembly 12 distributes air toward both a front of the head 14, i.e., a face of the user, and a back of the head 14, i.e., a neck of the user.

Figure 2:
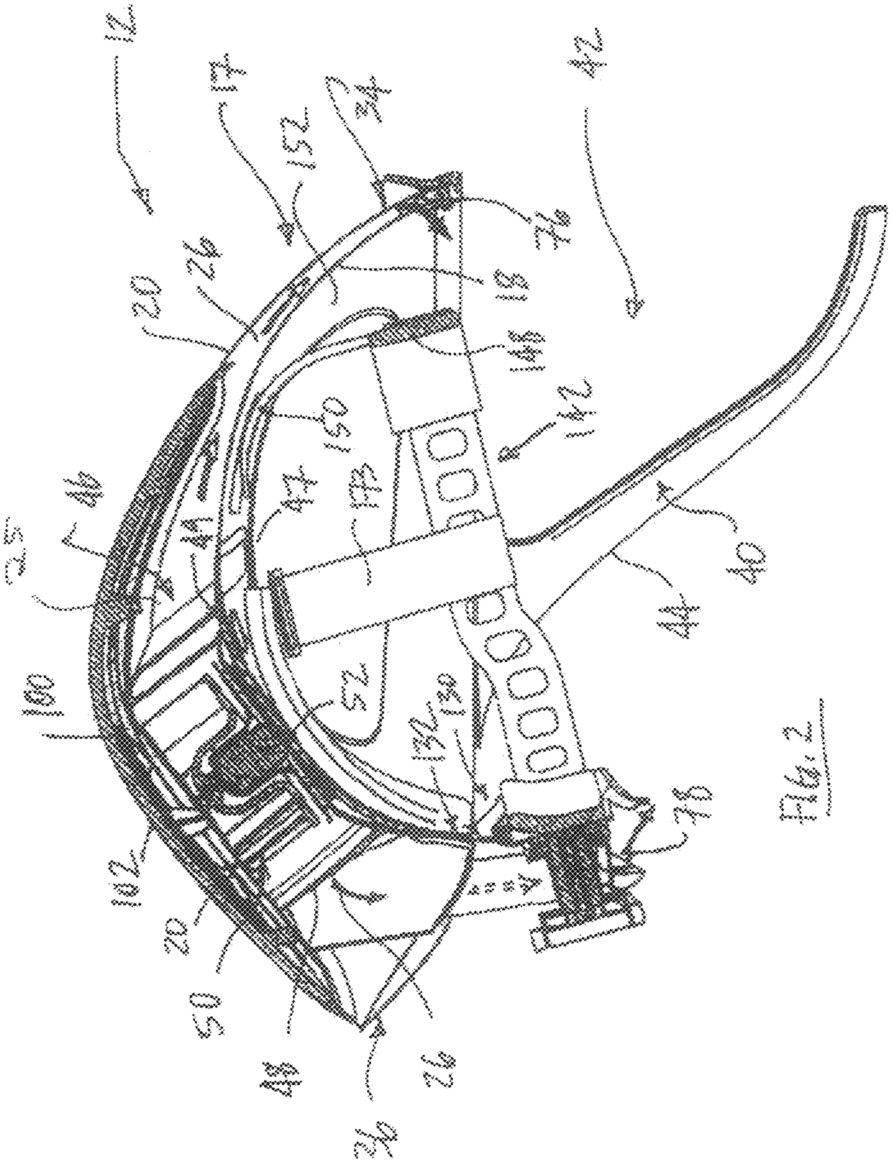
FIG. 2 is a cross-sectional view of the helmet assembly.

Referring to FIG. 2, the helmet assembly 12 includes a shell 17 having an inner shell portion 18 facing the user and an outer shell portion 20 facing away from the user. The outer shell portion 20 is spaced apart from the inner shell portion 18 to define at least one air flow channel 26 between the inner and outer shell portions 18, 20. It is to be understood that the present invention may include more than one discrete air flow channel 26. The illustrated embodiment includes a single unitary air flow channel 26 and the present invention will be described below in terms of this air flow channel 26. The shell 17 is preferably formed of acrylonitrile butadiene styrene (ABS), but may be formed, in alternative plastics.

The helmet assembly 12 also includes a facial section 40 extending from the shell 17 to define a facial opening 42. The facial section 40 of the helmet assembly 12 is a chin bar 44. The chin bar 44 is flexible and is formed of plastic such as polypropylene. The flexibility of the chin bar 44 protects the wearer's face and absorbs impact when the user contacts an external object with the helmet assembly 12. The chin bar 44 also holds the hood 92 (FIG. 1) away from the face of the wearer II. Helmet Referring to FIGS. 2-3, the helmet assembly 12 includes a fan module 46 mounted in a cavity 38 in the shell 17 Fan module 46 includes a fan 50 and a motor 52 mounted to a scroll housing 48. Fasteners M that extend through the shell 17 into threaded bores in the housing 48 to hold the module 46 in cavity 38 (housing bores not shown). A cover plate 47 is fixed to the shell 17 below cavity 38 to cover the fan module 46. A cushion 49 is disposed between the cover plate 47 and a base of the fan module 46. The cushion 49 absorbs the sound emitted by the fan motor 52. This reduces the amount of noise emitted by the system 10 of this invention. The scroll housing 48 may be formed of glass-filled polypropylene to reduce vibrations.

The helmet assembly 12 further includes an intake grid 100 mounted to the outer shell portion 20. The intake grid 100 includes a top surface spaced from the outer shell portion 20 of the helmet assembly 12. The intake grid 100 is contoured to the outer shell portion 20 between the front and rear of the shell 17. Air is drawn into the scroll housing 48 through the intake grid 100 by the fan 50.

Figure 3:
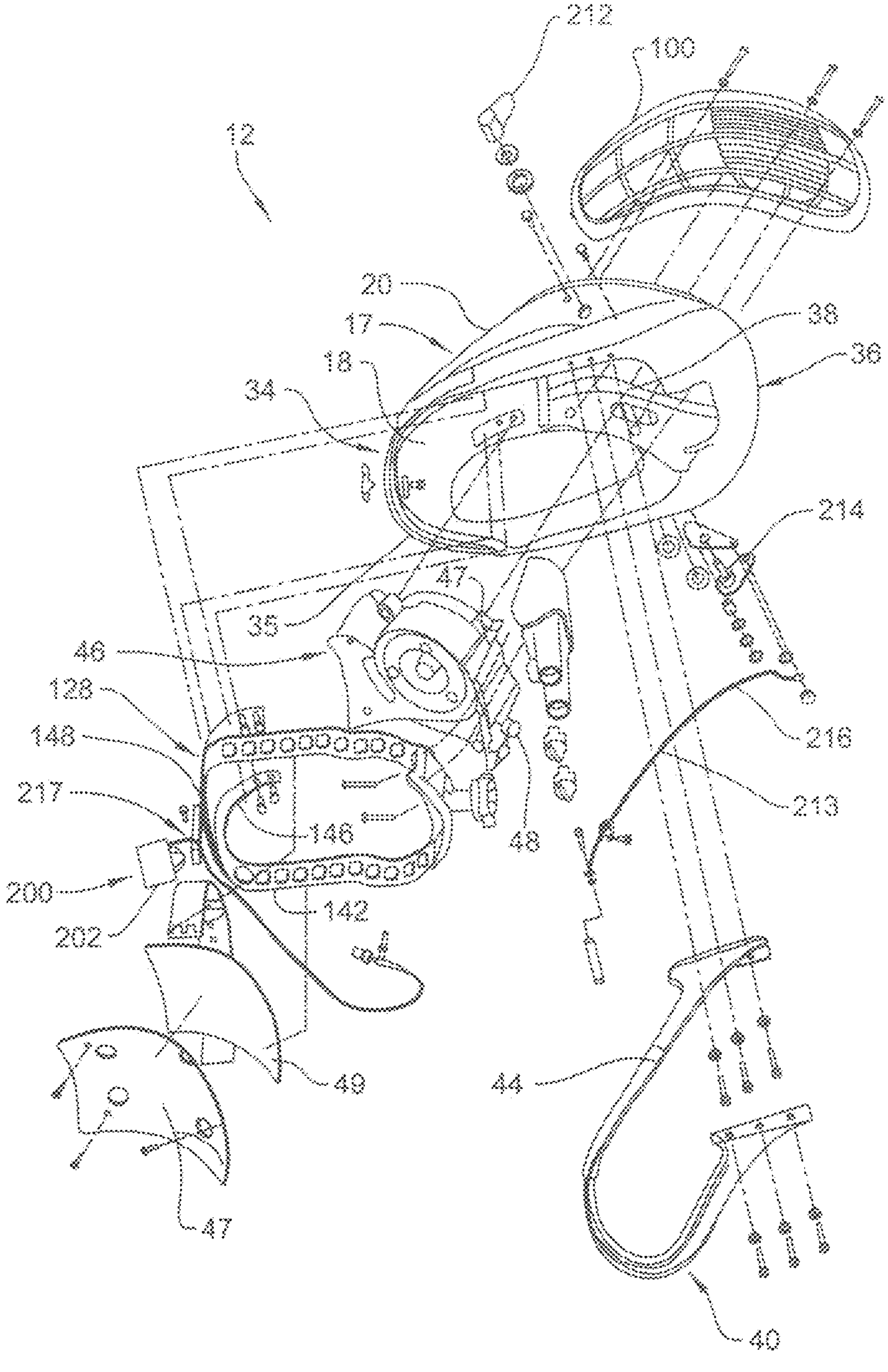
FIG. 3 is an exploded perspective view of the helmet assembly.

Also shown in FIG. 3 are various fasteners and washers, not identified, that secure the components forming helmet assembly 12 together.

In operation, the motor 52 rotates the fan 50 to draw air into the air inlet 64 of the scroll housing 48 through the intake grid 100. The air is discharged through two spaced openings in the scroll housing 48. A first opening 51 seen in FIG. 3A, is in the front of the scroll housing 48. The air discharged from opening 51 flows directly into the opening 25 into air flow channel 26. From channel 26, the air is discharged from an outlet opening 35 between the inner and outer shell portions 18 and 20, respectively, in the front of the shell 17

Figure 3B:
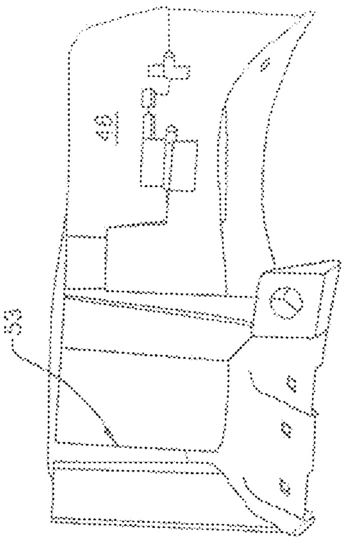
FIG. 3B is a plan view of the rear of the scroll housing.
Figure 3A:
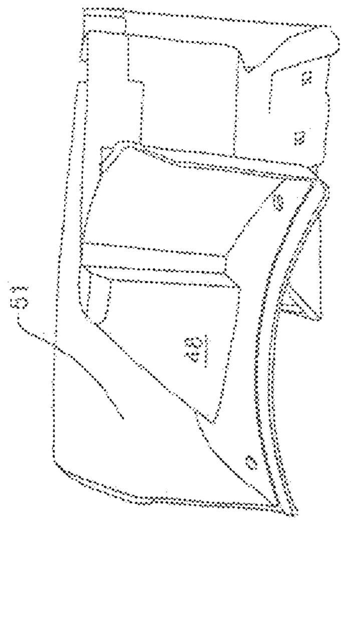
FIG. 3A is a plan view of the front of the scroll housing.
Figure 4:
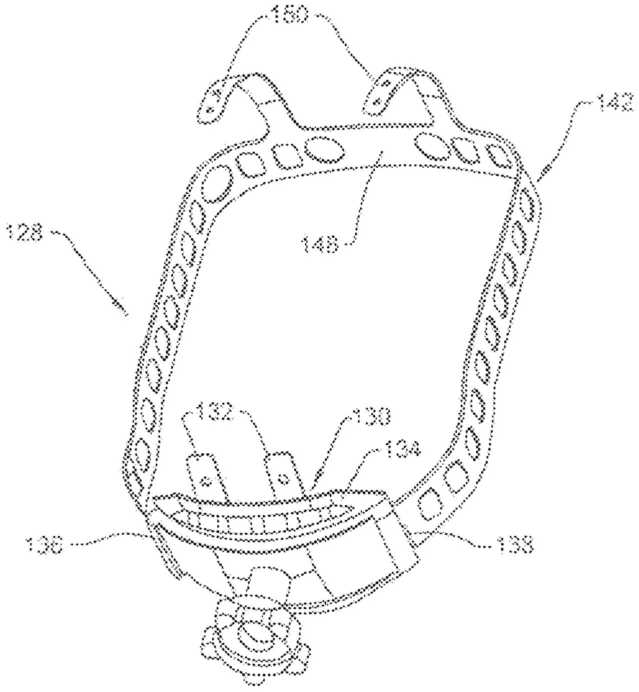
FIG. 4 is a perspective view of the head band.

The second opening, opening 53, is located in the rear of the scroll housing 48, best seen in FIG. 3B. The air discharged from opening 53 flows into a manifold mounted to the rear of the scroll housing 48. From the manifold, the air is discharged from two downwardly directed nozzles. The manifold and nozzles are formed as a single unit, S in FIG. 3. When the system 10 is worn, the nozzle discharge ports are positioned adjacent the back of the neck of the wearer.

The air flow channel 26 defined between the inner and outer shell portions 18, 20 terminates at the front section 34 with the front air exits. More specifically, the inner and outer shell portions 18, 20 converge toward the front section 34 to define the front air exits. The front air exits may have an air deflector defined between the outer shell portion 20 and the inner shell portion 18 wherein the outer shell portion 20 angles toward the inner shell portion 18 at the front air exits for proper deflection of air toward the front of the head 14 of the user. Such an air deflector is best shown in U.S. Pat. No. 6,481,019 et al., which, again, is hereby incorporated by reference. Air flow channel 26 diverges upon approaching the front air exits. The convergence and divergence of the air flow channel 26 maintains a balanced flow of air about the user's head 14. Ultimately, this also has the effect of minimizing or even completely eliminating noise within the helmet assembly 12 due to the air flow.

Referring to FIGS. 2, 3, 4 and 8, an adjustable head band 128 assists in minimizing the strain on the head 14 and the neck of the user. Strain and torque on the head 14 and neck of the user is minimized by maintaining the weight of the fan 50 and motor 52 over the neck of the user even upon adjustment of the helmet assembly 12 to fit various sized heads 14. The head band 128 includes a rear support 130 that rigidly extends from the shell 17. It is understood that the rear support 130 can be a separate part that is connected to the helmet assembly 12 or can be an integral part of the helmet assembly 12. The rear support 130 includes first and second rigid connectors 132 that connect the rear support 130 to the rear section 36. In the preferred embodiment, the rear support 130 is connected to and extends from the rear section 36 of the inner shell portion 18 and will be described below in terms of the inner shell portion 18. However, it is to be understood that the rear support 130 can connect to and extend from any portion of the shell 17.

An adjustment segment 134 having a first side 136 and a second side 138 is also part of head band 128. Although not required, the rear support 130 preferably includes the adjustment segment 134. In the preferred embodiment, the adjustment segment 134 is integral to, or the same part as, the rear support 130. In alternative embodiments, the adjustment segment 134 is a discrete component that is simply mounted to the rear support 130. In either situation, the adjustment segment 134 defines apertures 140 for receiving a first end 144 and a second end 146 of a strap 142 flexibly connected to and extending from the front section 34 of the inner shell portion 18. The first end 144 is disposed within the first side 136 of the adjustment segment 134, and the second end 146 is disposed within the second side 138 of the adjustment segment 134. Preferably, the first end 144 is movably disposed within the first side 136 of the adjustment segment 134, and preferably the second end 146 is movably disposed within the second side 138 of the adjustment segment 134. However, as will be understood from the explanation below, the first end 144 may be movably disposed within the first side 136 of the adjustment segment 134 and the second end 146 may be fixedly disposed within the second side 138 of the adjustment segment 134. Alternatively, the first end 144 may be fixedly disposed within the first side 136 of the adjustment segment 134 and the second end 146 may be movably disposed within the second side 138 of the adjustment segment 134.

The strap 142 further includes a frontal portion 148 disposed between its first and second ends 144, 146 and opposite the adjustment segment 134 of the rear support 130. At least one support arm 150 flexibly extends from the frontal portion 148 of the strap 142 to flexibly connect the strap 142 to the front section 34 of the inner shell portion 18. These support arms 150 act as hinges for the head 14 support assembly. Preferably, there are two support arms 150 that extend from the frontal portion 148 of the strap 142. In such a case, the two supports arms are connected to the front section 34 of the inner shell portion 18 and to the frontal portion 148 of the strap 142 equidistant from one another. A gap 152 exists between the frontal portion 148 of the strap 142 and the front section 34 of the inner shell portion 18.

III. Toga and Hood

Figure 5:
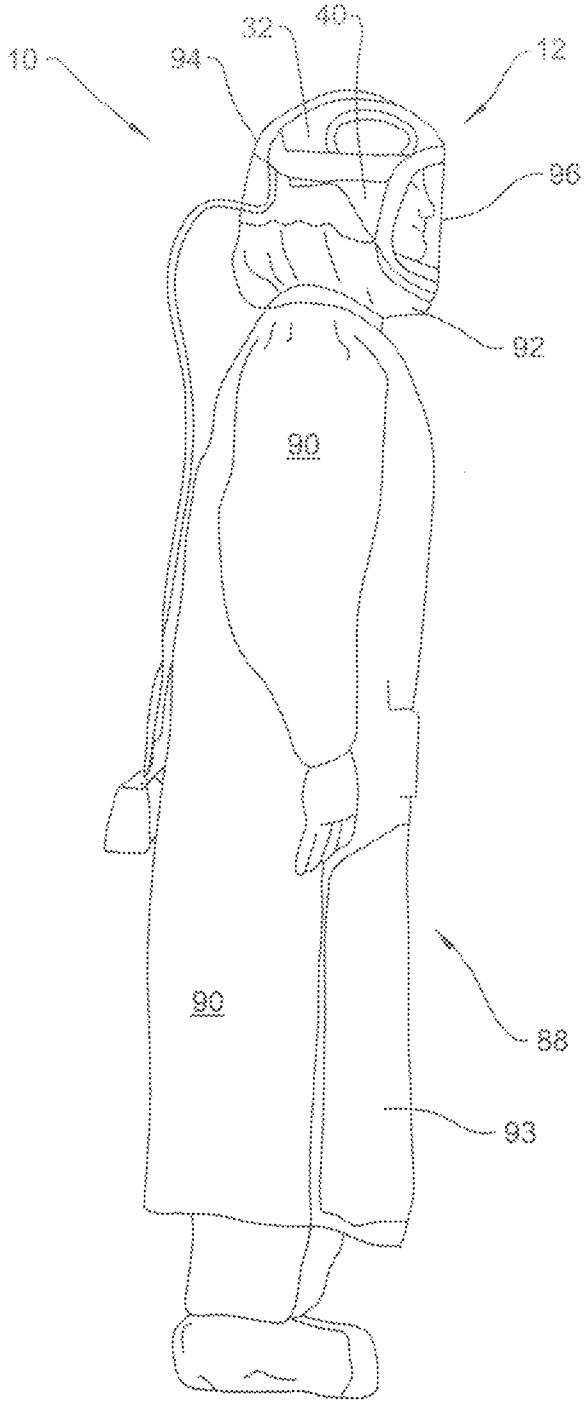
FIG. 5 is a side view of the helmet assembly with a toga and hood with face shield.
Figure 6:
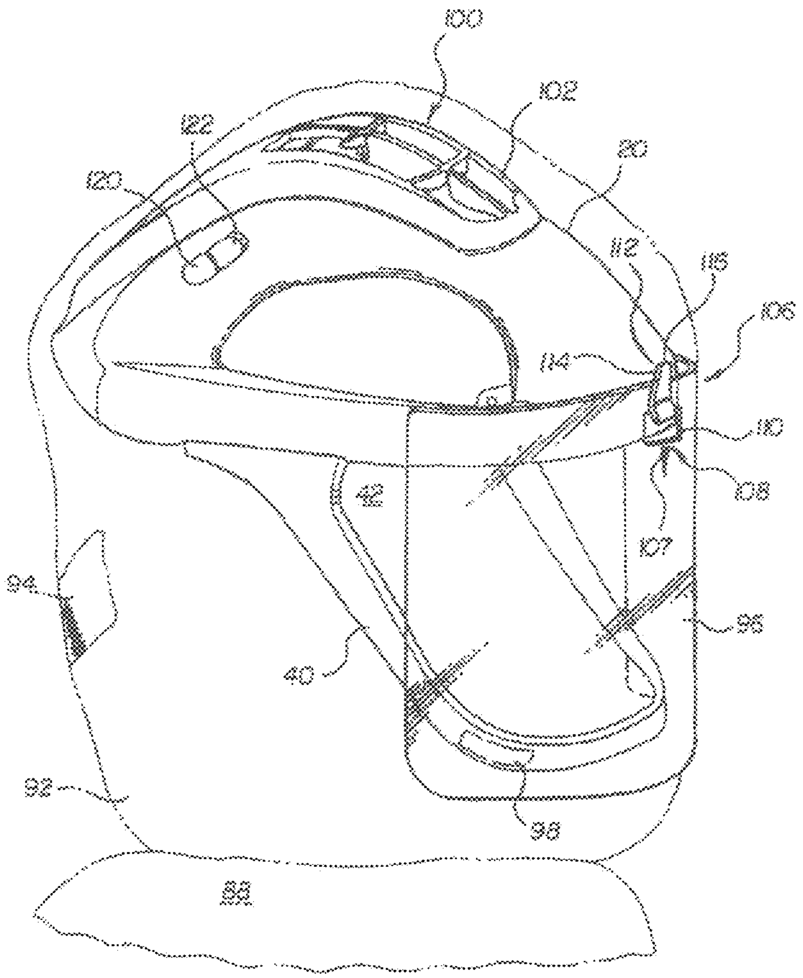
FIG. 6 is a perspective view of the helmet assembly illustrating a positioning and supporting system including a mounting clip supporting the face shield via an aperture in the face shield.
Figure 7:
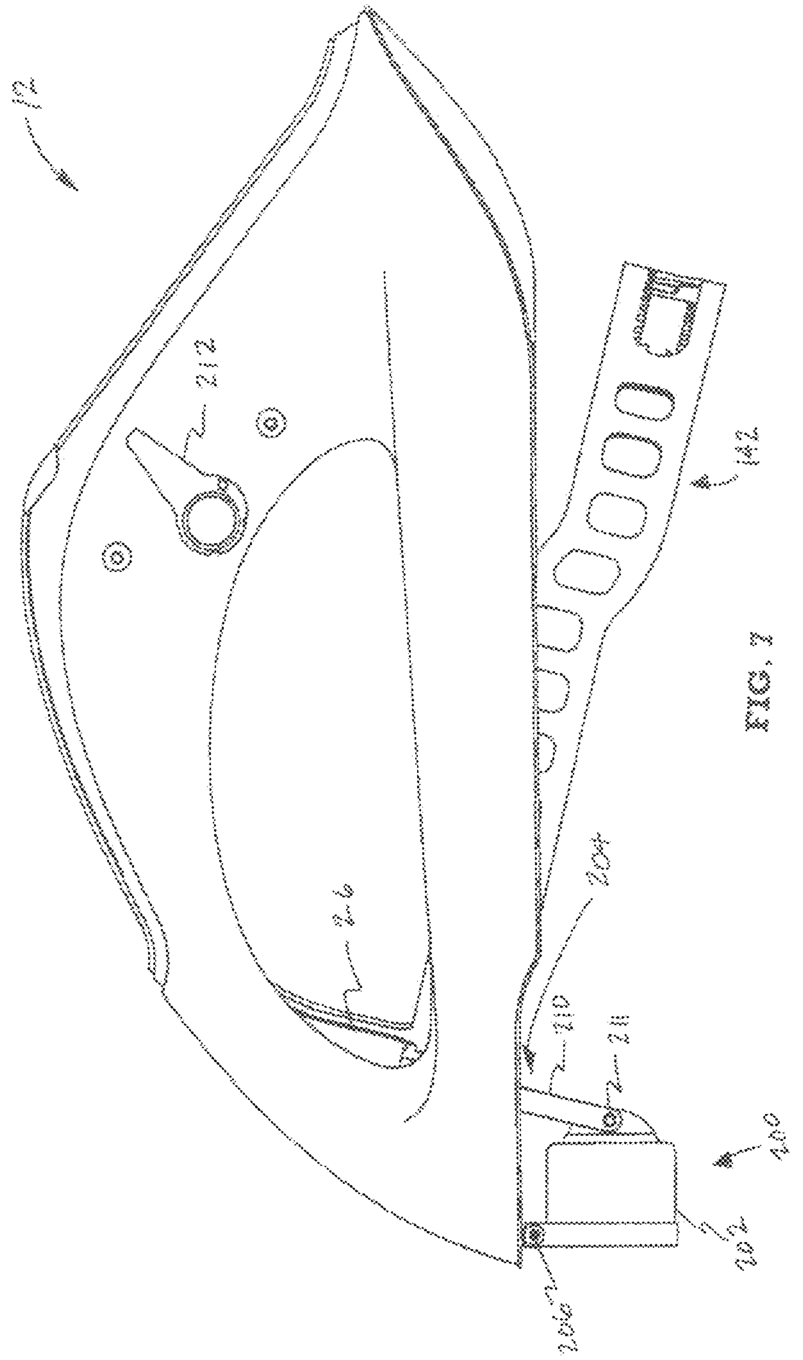
FIG. 7 is a side view of the helmet assembly implementing a light assembly.
Figure 8:
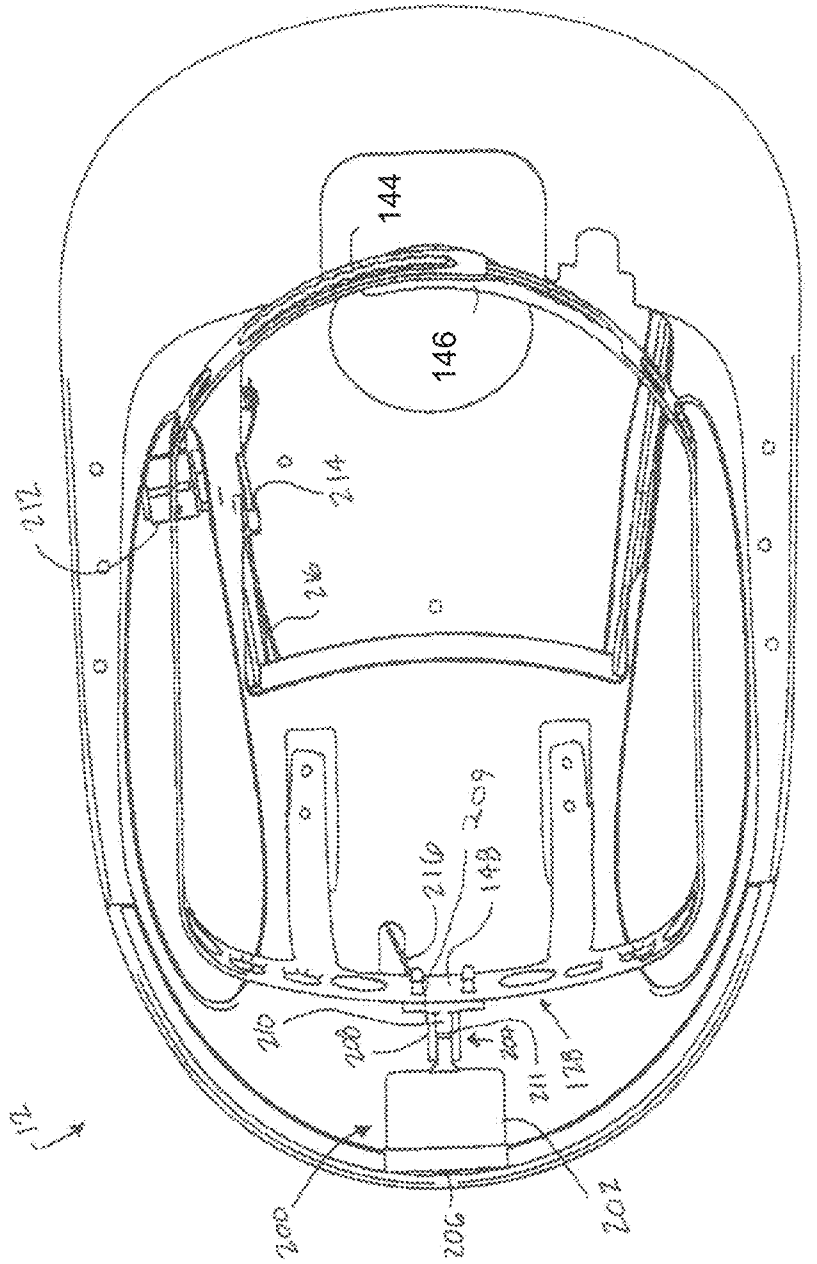
FIG. 8 is a bottom view of the helmet assembly implementing the light assembly.

Referring to FIG. 5, the personal protection system 10 includes a toga 88 having a body portion 90 for covering substantially all of the body 16. Toga 92 includes a hood 92 for covering the head and helmet assembly 12. The body portion 90 can extend downward to cover any portion of the body 16 of the user. For instance, the body portion 90 can extend downward to the waist of the user, or to the ankles of the user. The hood 92 includes a filter element 94 to filter air between the user and the external environment. The facial section 40 of the helmet assembly 12, introduced above, also operates to maintain the hood 92 away from the head 14 of the user. The intake grid 100 spaces the filter medium 94 out away from the outer shell portion 20 and the fan 50.

As is known in the art, a hood unit may be offered as a covering separate from the complete toga. This type of hood unit is used when there is only a need to provide a barrier around the head of the wearer.

A transparent face shield 96 permits the user to view through the hood 92. The face shield 96 may include anti-reflective and/or anti-refractive coatings to enhance vision through the face shield 96. As shown in FIG. 5, the face shield 96 is mounted to the hood 92 such that the face shield 96 covers the facial section 40 and the facial opening 42 of the helmet assembly 12 once the user dresses into the personal protection system 10. The face shield 96 is sewn into the hood 92. The facial opening 42 of the helmet assembly 12 receives the face shield 96. In this version of the invention, facial section 40 of the helmet assembly 12 includes a hook-and-loop fastener 98 to further facilitate attachment of the face shield 96 to the facial section 40 for covering the facial opening 42.

IV. Light Assembly and Fan Assembly

As shown in FIG. 3 and FIGS. 7-19, the personal protection system 10 includes a light assembly 200. The light assembly 200 is disposed within the hood 92 behind the face shield 96 to emit a beam of light that projects outside of the hood 92. Since the light assembly is disposed within the hood 92, there is no need to meticulously clean the light assembly to keep it to the sterile conditions of a surgical room. Light assembly 200 includes a light generating unit, light source 201, disposed adjacent to a lens (not shown).

The light source is preferably one or more light-emitting diodes (LEDs). The LED emits white light. In one version of the invention, light is emitted at a color temperature of 5500° K. Light in this spectrum is equivalent to daylight and provides true tissue color rendition. A light housing 202 supports and surrounds the LEDs and the lens. One suitable light assembly 200 is the PeriLux LED, manufactured by PeriOptix, Inc. of Mission Viejo, California. The light source may alternatively be an incandescent light bulb or other suitable sources as are well known in the art. One possible alternative is the use of a light source mounted somewhere on the user and fiber-optic cables to carry the light to the light housing.

The lens is circular in shape. In some versions of the invention, the longitudinal position of the lens relative to the light source 201 is selectively set. This allows the user to selectively focus/diffuse the beam of light emitted from the light assembly 200. Many lens displacement assemblies include a rotating collar. Rotating the collar in a first direction cause movement of the lens to focus light is concentrated in a small area. Rotation of the collar in the opposite direction results in movement of the lens so that the emitted light is diffused about a large area. This rotation of the collar may be done manually or with a focusing servo motor. Control of the electric servo motor is explained in greater detail below.

Light assembly 200 includes a light angle adjustment mechanism 204. Mechanism 204 allows the user to change the direction of the beam of light so it can be directed to a specific location. Specifically, the light housing 202 is pivotally mounted to two parallel legs 210 (one shown in FIG. 7). Legs 210 are integrally formed with and extend downwardly from a rigid block 209. Block 209 is attached to the front outer surface of the strap 142. A pin 211 that extends through the ends of the legs 210 pivotally holds the light housing 202 to the legs.

A semi-rigid cable 216 regulates the pivotal movement of the light housing 202. The cable 216 is contained in a sheath (not identified). A cable clamp AW and rivet P cooperate to hold the forward end of the sheath to the exposed face of the inner shell portion 18. The rear end of the sheath, with the cable 216 contained therein, extends through an opening in the shell 17 into the void space between the inner and outer shell portions 18 and 20, respectively. A ring clamp AZ is disposed over the front of the housing, immediately proximal to the front face. The opposed ends of the ring clamp (one shown as element 206 in FIG. 8) extend upwardly towards shell 17. An elongated screw 217 (FIG. 3) extends between ring clamp ends 206 to compression secure the ring clamp AZ to the light housing 202. The front end of the cable 216 is wrapped around the exposed section of screw BA between the ring clamp end sections 206.

Figure 9:
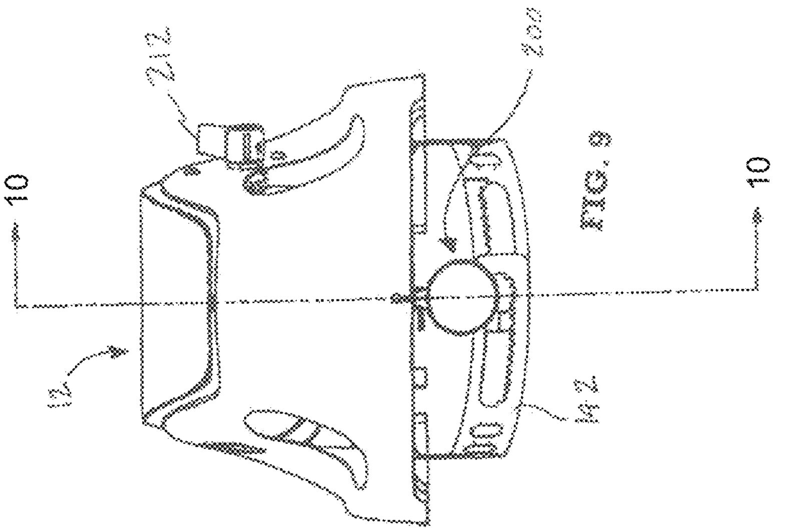
FIG. 9 is a back view of the helmet assembly implementing the light assembly.
Figure 10:
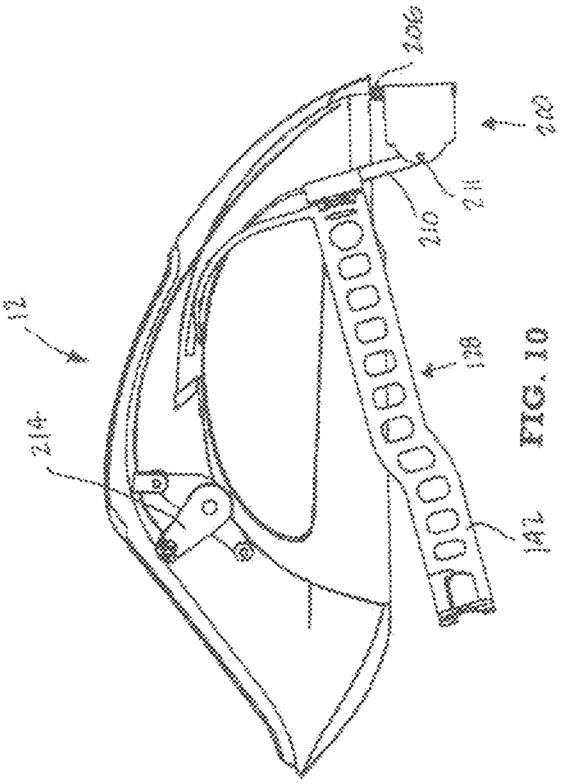
FIG. 10 is a cross-sectional view of the helmet assembly along the line 10-10 shown in FIG. 9.
Figure 12:
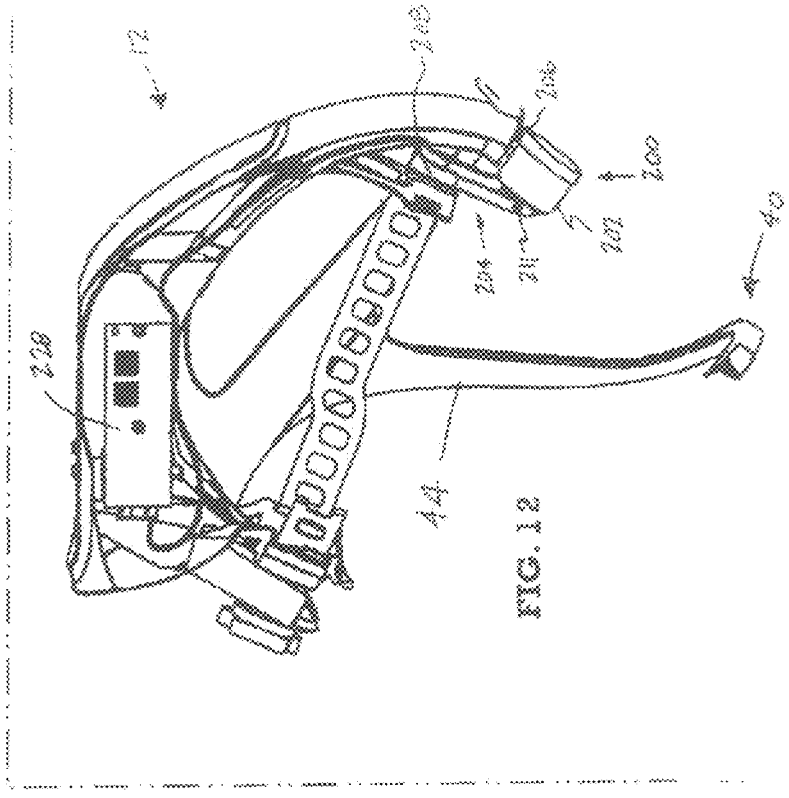
FIG. 12 is a cross-sectional side view of the helmet assembly showing a printed circuit board disposed within the helmet assembly.
Figure 11:
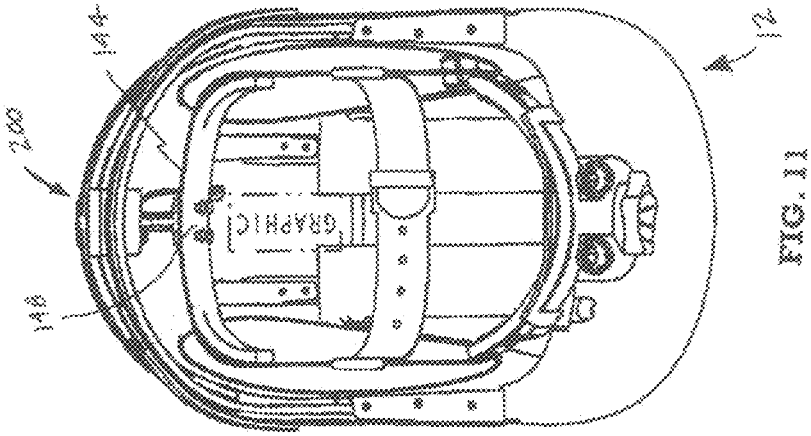
FIG. 11 is a bottom view of the helmet assembly implementing the light assembly.
Figure 14:
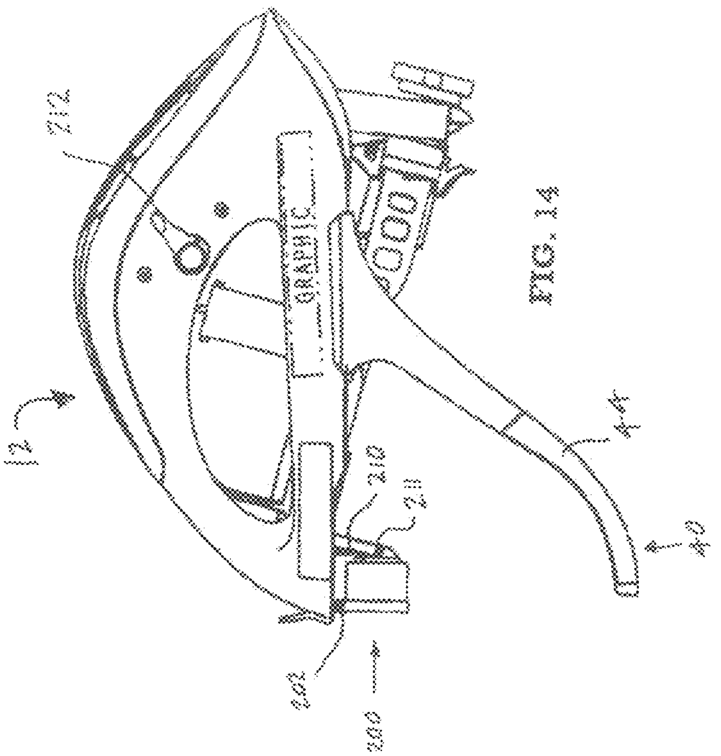
FIG. 14 is a side view of the helmet assembly showing a handle for adjusting the angle of the light assembly.
Figure 13:
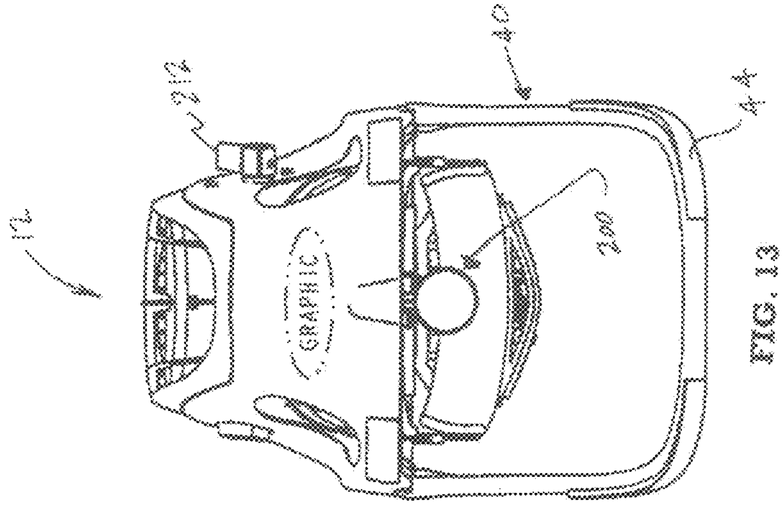
FIG. 13 is a front view of the helmet assembly.
Figures 15, 16:
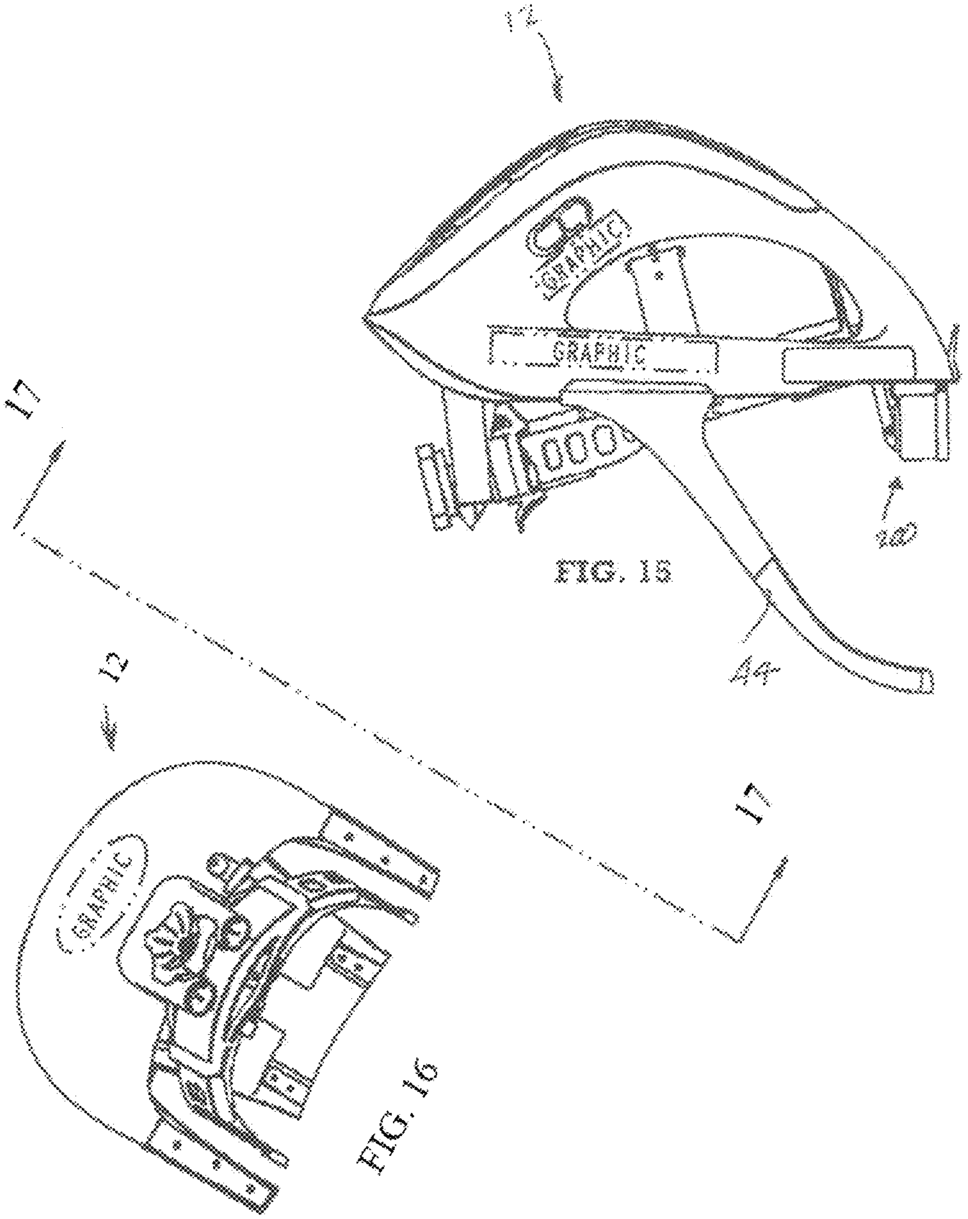
FIG. 15 is a side view of the helmet assembly.
FIG. 16 is a perspective back view of the helmet assembly along the line 16-16 shown in FIG. 15.
Figure 17:
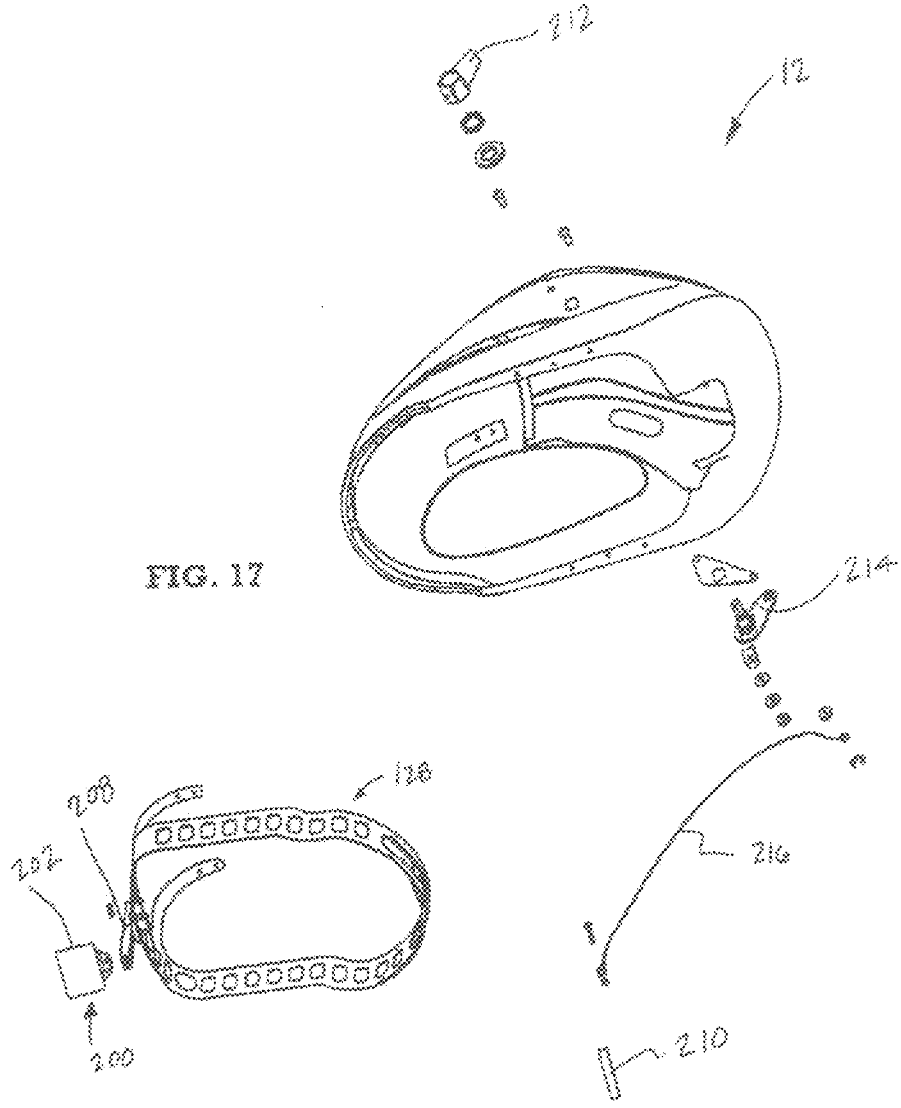
FIG. 17 is a partial exploded view of the helmet assembly showing the components of an light adjustment mechanism for adjusting the angle of the light assembly.
Figure 19:
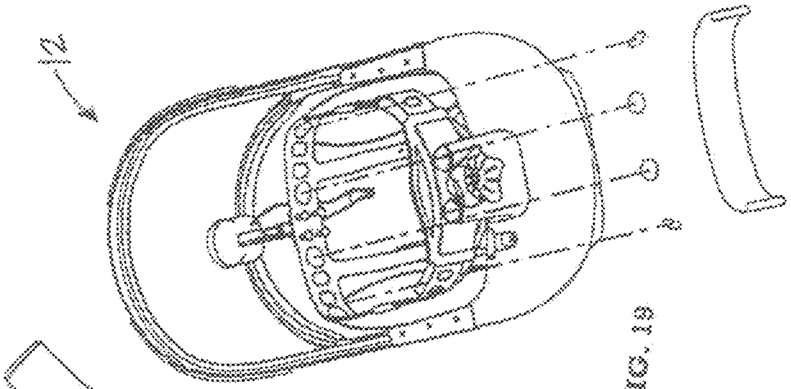
FIG. 19 is a bottom view of the helmet assembly.
Figure 18:
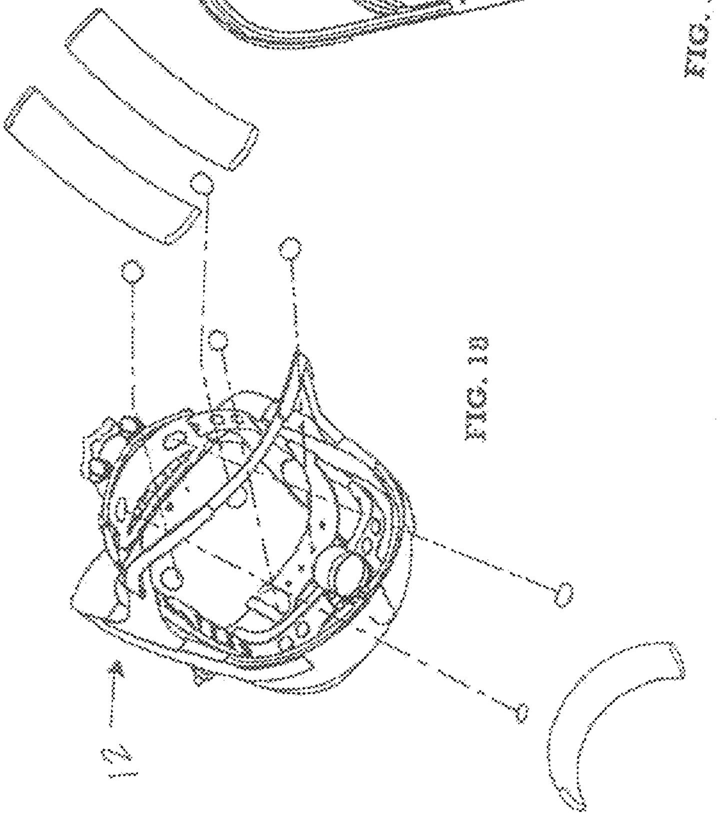
FIG. 18 is a perspective view of the helmet assembly.

As seen in FIG. 10, a lever arm 214 disposed inside shell 17, selectively extends and retracts the cable 216. Lever arm 214 is connected by a pin (not identified) to an adjustment knob 212 located outside of the shell 17 (FIG. 9). The pin extends through the shell outer portion. The proximal end, the rear end of the cable 216 is attached to the end of the lever arm 214 distal from the pin. The rotation of the knob and lever arm sub-assembly thus results in the extension/retraction of the cable. The cable movement, in turn pivots the light housing 202 around the axis defined by pin 211.

The light housing 202 and, more particularly, the light source 201, are positioned directly under the front air outlet opening 35. By positioning as such, the air discharged from opening 35 blows the warm air surrounding the light assembly 200 away from the light assembly. This reduces the buildup of heated air adjacent the light assembly. Instead, the heated air is exhausted out of the hood 92. The removal of this heated air lessens the extent to which the heat generated by the light assembly excessively warms the wearer of the personal protection system 10.

Still another feature of this construction of the invention is that it minimizes the extent to which the temperature of the light assembly 200 itself rises due to the heat emitted by source 201. By maintaining the light source 201 at a relatively low temperature, the source itself is able to function as a relatively efficient light emitter. (The light-emitting efficiency of LED type light source drops with an increase in the temperature of the LED.)

Figure 20:
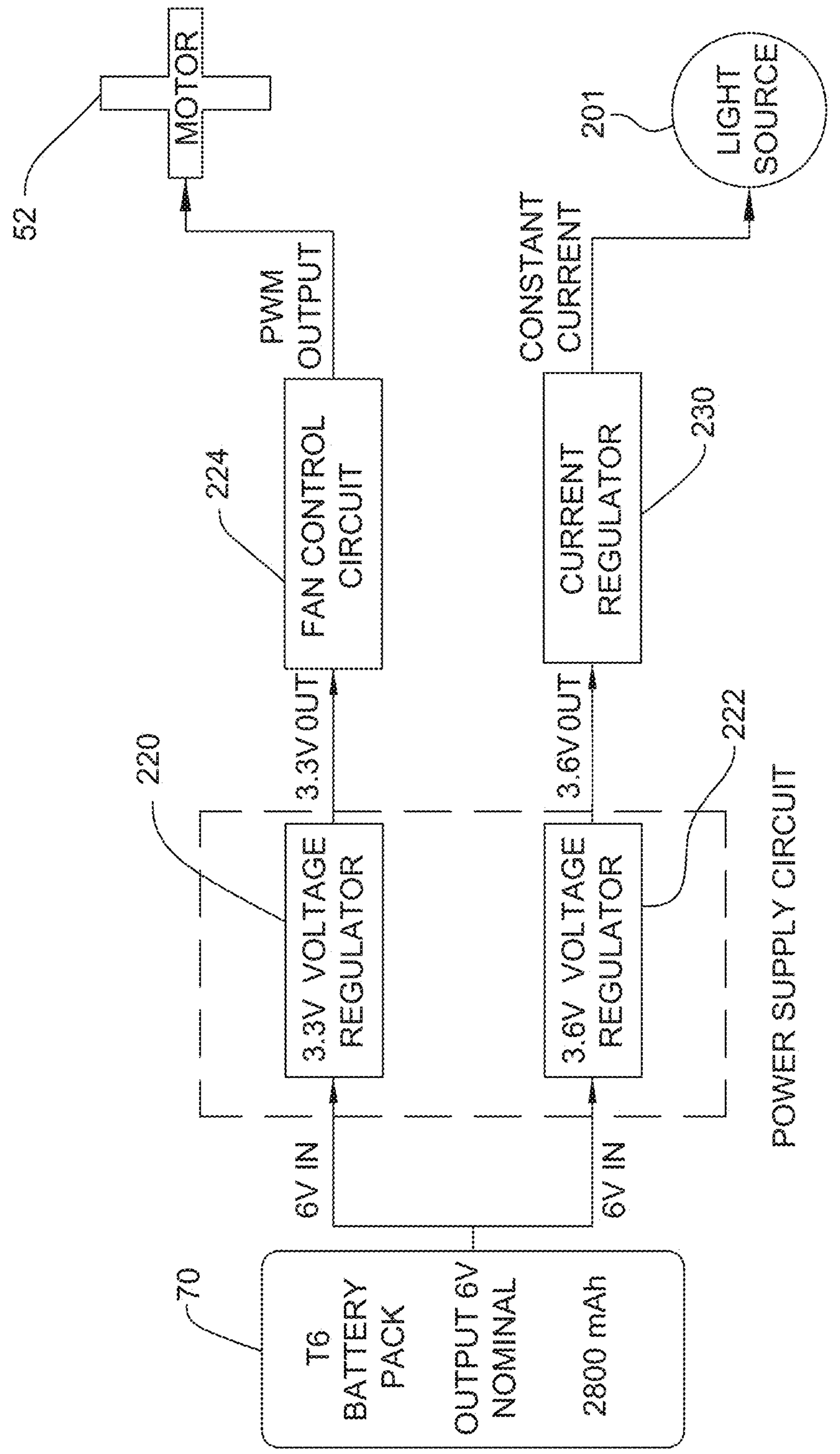
FIG. 20 is an electrical block diagram illustrating the flow of electricity from a power supply to a motor and a light source.

Referring now to FIG. 20, the control circuit for motor 52 and light source 201 are shown in block form. Power supply 70 energizes both the motor and the light source. In alternative versions of the invention, power supply 70 may be divided into a pair of power supplies, with each power supply individually powering the motor 52 or the light assembly 200.

Power supply 70 is preferably at least one cell (i.e., battery). The at least one cell may be rechargeable. However, non-rechargeable (i.e., disposable) cells may also be used. In one version of the invention, power supply 70 provides a 6 VDC power signal. However, other voltages may alternatively be implemented.

The first power supply 70 is preferably mounted to the body 16 of the user as shown in FIG. 5. By mounting the first power supply 70 outside of the toga 88, it can be easily replaced (i.e., switched out) during a medical/surgical procedure. In some versions of the invention, power supply 70 is located where it is accessible through the toga. Alternatively, the first power supply 70 may be disposed within, i.e., integrated into, the helmet assembly 12.

Referring again to FIG. 21, the personal protection system 10 further includes a fan control circuit 224 for regulating the actuation of the fan motor 52. A voltage regulator 220 applies a constant voltage signal to control circuit 224 for energizing the control circuit. Voltage regulator 220 regulates the 6 VDC electric current received from the power supply. In one version of the invention, voltage regulator 220 provides a 3.3 VDC electric current which energizes the fan control circuit 224.

Figure 21:
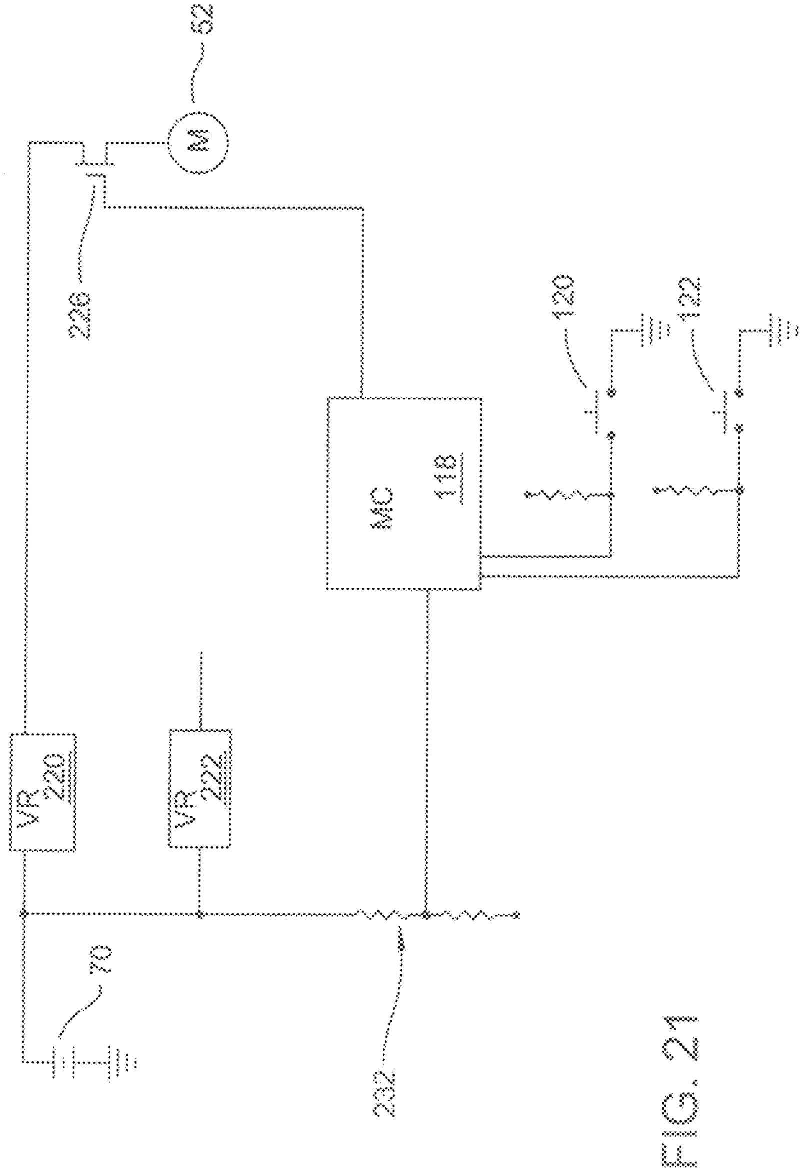
FIG. 21 is an electrical schematic diagram showing the relationship between electronic components disposed on the circuit board.

A light control circuit selectively applies an energization signal to the light source 201 to control both the on/off state of the light source and the intensity of the light emitted by the source. In FIG. 21, the light control circuit is shown as current regulator 230. The current regulator 230 receives a constant voltage energization signal from a voltage regulator

222. In one version of the invention, voltage regulator 222, which is connected to power supply 70, supplies a 3.6 VDC signal to current regulator 230.

In some versions of the invention a single voltage regulator provides a common constant voltage to both the fan control circuit and the light control circuit. In some versions of the invention, there may not even be a need to provide a voltage regulated energization signal to either the fan control circuit or the light control circuit. Thus, in some versions of the invention, either one or both of the fan and light control circuits are powered directly from the power supply 70.

The fan control circuit 224 is electrically connected to the fan motor voltage regulator 220 and the motor 52. The fan control circuit 224 receives electric current from the fan motor voltage regulator 220 and conditions the electric current to control the speed of the motor 52 and the fan 50.

In the illustrated version of the invention, the fan control circuit 224 provides implements pulse-width modulation (PWM) for controlling the speed of the motor 52 and the fan 50. To accomplish the PWM, the fan control circuit 224 includes a microcontroller 118 and a power transistor 226. The microcontroller 118 includes a plurality of inputs and outputs. Two switches 120 and 122 are pushbuttons are electrically connected to individual inputs of the microcontroller 118. (Not identified are the pull up resistors associated with the switches.) The user presses the pushbuttons to adjust the desired speed of the fan 50 (and the consequential air flow). The switches are in the form of pushbuttons mounted to the side of the helmet assembly 12 and are easily operable by the user through the hood 92.

At least one output of the microcontroller 118 is electrically connected to the power transistor 226 to selectively turn on and turn off the transistor based on the desired speed of the fan 50. More specifically, the energization signal applied through the transistor is a PWM signal having a constant frequency and a variable on duty cycle that is directly proportional to the desired fan speed.

Power transistor 226 is in one version of the invention, actually a pair of power MOSFETs, the individual MOSFETs not shown. Here a primary MOSFET is a P-channel type and a secondary MOSFET is an N-channel type. The drain of the primary MOSFET is tied to the positive input of the power supply. The source of the primary MOSFET is tied to fan motor 52. The gate of the primary MOSFET is tied to the positive terminal of the battery through a resistor. The drain of the secondary MOSFET is also tied to the gate of the primary MOSFET. The source of the secondary MOSFET is tied to ground. The gate of the secondary MOSFET is connected to a control line from the microcontroller 118. Thus, the signal present at the drain of the secondary MOSFET gates the primary MOSFET. The IRF7307TR Power MOSFET manufactured by International Rectifier, headquartered in El Segundo, California is a single package that contains both the P- and N-channel MOSFETs that collectively form power transistor 226. Of course, those skilled in the art realize other possible implementations of the power transistor 226 are possible.

Microcontroller 118 is preferably a Model ATmega8 manufactured by Atmel Corporation, headquartered in San Jose, California. The ATmega8 includes built-in PWM support. Other suitable microcontrollers 118 or microprocessors are evident to those skilled in the art. The microcontroller 118 may also be used for functions separate from controlling the speed of the fan 50, as is described in greater detail below.

In one version of the invention, the current through motor 52 is used as feedback signal to establish the PWM rate. A resistor (not illustrated) is tied between the motor 52 and ground. The voltage across the resistor is applied to microcontroller 118 so as to serve as an indication on the motor speed. Motor speed is adjusted by varying the percent on duty cycle of the pulse per fixed total period (on and off) of the pulse.

Microcontroller 118 may also be electrically connected to the focusing servo motor and the light angle servo motor. This eliminates the need to hand adjust the light.

In addition to controlling the volume of air flowing into the helmet assembly 12, the invention provides an audible indication of when the fan is at the minimum and a maximum air flow rates. This indication is provided by momentarily resetting the frequency of the PWM signal applied to the motor. This in turn, causes the motor to be actuated at a rate that causes the shaft to rotate in a manner that causes sound detectable by the human ear to be emitted. This sound provides an audible indication of the minimum and the maximum volume of air to the user. That is, the present invention provides the user with an audible 'ping' upon reaching the minimum and maximum volumes of air flowing into the helmet assembly 12.

This ping is also provided each time the control circuit 224, in response to the depression of one of the control buttons, raises or lowers the speed of the fan motor 52. At the opposed high and low ends of the motor speeds, the controller is configured to actuate the motor so two closely spaced apart in time pings are emitted at the same frequency. This provides the user notice the maximum or minimum motor speed setting has been reached.

The audible ping is provided by, for a brief period, for example between 0.1 and 0.2 seconds, running the fan motor at a frequency at which the motor generates an audible sound. For example, during normal actuation of the motor, the constant frequency of the energization signal applied by the control circuit 224 is 30.3 kHz. Between the transition from outputting the energization signal at a first duty cycle to a second duty cycle, (in order to change the speed of the motor), the energization pulses are applied to the motor at a frequency of between 261 to 523 Hz at a 50% duty cycle. As a result of the energization pulses being applied at this frequency, the speed of the motor drops appreciably. This causes the motor 52 to emit a tone detectable by the human ear In some versions of the invention, the frequency at which the motor is actuated in order to generate the ping varies with new speed range the motor is being set to operate at. For example, in one embodiment of this version of the invention, prior to each time the control circuit 224 increases the on duty cycle of the motor energization signal in order to increase motor speed, the control circuit first applies a high frequency ping-generating energization signal. This results in a relative high frequency ping signal being generated. Prior to the control circuit 224 decreasing the on duty cycle for the energization signal in order to decrease motor speed, the control circuit applies a lower frequency ping-generating energization signal. This results in the emission of a lower frequency ping from the motor 52. Thus, the surgical personnel not only receive an audible indication the fan speed is being reset, they receive an indication regarding if the speed is being lowered or increased.

However, it is to be understood that the frequency at which the motor is selectively actuated may otherwise be within the acceptable range of unaided human hearing (30 Hz to 20 kHz) so long as it provides the audible indication. The frequency of the activation rate causes various components of the motor 52 of the fan module 46 to vibrate at the frequency thereby generating the audible indication.

Alternatively, the fan control circuit 224 includes a potentiometer, also commonly referred to as a variable resistor or varistor, to control the speed of the motor 52 and fan 50, instead of utilizing PWM. Additional implementations for varying the speed of the motor 52 and fan 50 are known to those skilled in the art and may be alternatively utilized.

A printed circuit board 228 (PCB) is disposed within the helmet assembly 12. The PCB 228 supports the voltage regulators 220, 222, the microcontroller 118, and associated electronic devices. The PCB 228 includes conductive tracks to electrically connect items mounted on the PCB 228, as is well known to those skilled in the art.

The personal protection system 10 also includes a light current regulator 230 for providing a constant current, regardless of voltage, to the light source. By keeping the current constant, the light source provides a steady illumination that does not degrade as the cells of the first power supply 70 drain and lose voltage. The light current regulator 230 is preferably integrated with the light assembly 200 within the light housing. However, the light current regulator 230 may be disposed on the PCB 228.

The personal protection system 10 also includes a low power detection circuit for alerting the user when the cells of power supply 70 are running low. In the preferred embodiment, a voltage divider circuit 232 comprising a pair of resistors is electrically connected to the first power supply 70. The signal present at the junction of the resistors is applied as an input signal to microcontroller 118. An enunciator 234 is electrically connected to one of the outputs of the microcontroller 118. The enunciator 234 may be an indicating LED, preferably mounted within the helmet assembly 12 and within the field of view of the user. The enunciator 234 may also be a loudspeaker for producing an audible signal that is hearable by the user, or a combination of the loudspeaker and LED. Alternatively, the enunciator 234 may be substituted with selectively activating and deactivating the power transistor 226 to vibrate the fan and generate an audible signal, as described above.

V. Communications Unit

Referring to FIGS. 22-27, personal protection system 10 also includes a communications unit 236. The communications unit 236 provides wireless communication between other communications units 236. The other communication units may be integrated with other personal protection systems 10 or embodied as one or more stand-alone units. The communications units 236 allow for convenient voice communications between the users of the personal protection systems 10.

The communications unit 236 includes a microphone 238, a speaker 240, and a transceiver 242. Communications unit 236 also includes a second power supply 244. The second power supply 244 powers transceiver 242. Second power supply 244 is preferably at least one cell. The at least one cell is preferably rechargeable; however, non-rechargeable cells may also be used. The at least one cell may be a single cell or a plurality of cells connected together. The transceiver 242 and second power supply 244 are often packaged together and mountable on the body 16 of the user.

Figure 26:
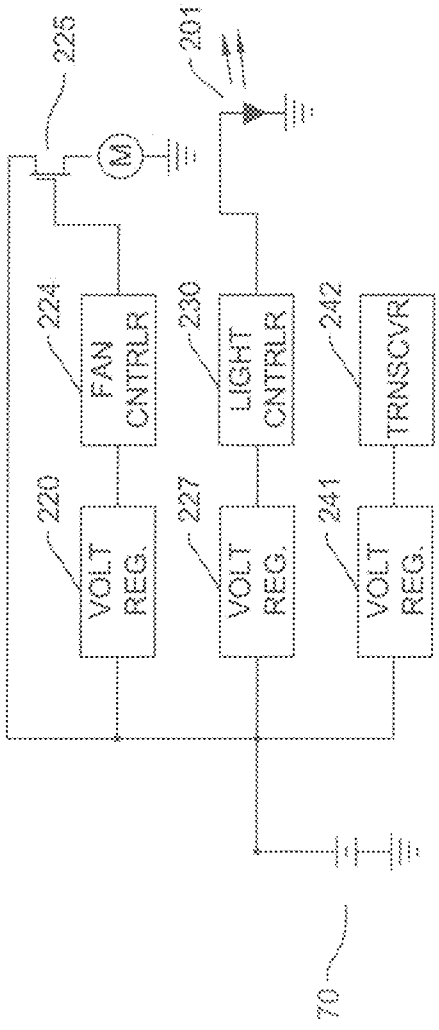
FIG. 26 is a block diagram of how, in some versions of this invention, a single power supply provides the energization current for the fan motor, the light source and the communications transceiver.

Alternatively, as seen in FIG. 26, the transceiver 242 is electrically connected to the first power supply 70, such that the user would not have to carry multiple power supplies. In these versions of the invention a third voltage regulator 241 provides a third constant voltage signal to the transceiver 242. This third voltage is different from the regulated voltages provided to the fan control circuit 224 and the light control circuit (current regulator 230). Transceiver 242 may also be alternatively disposed within the helmet assembly 12.

Microphone 238 converts speech into electrical signals. The signals produced by the microphone 238 are applied to the transceiver 242. Transceiver 242 is preferably a radio frequency (RF) transceiver 242 capable of transmitting and receiving RF signals. The transceiver 242 converts the electrical signal into an RF signal and transmits the RF signal. The transmitted RF signal may then be received by the transceivers 242 of the other communication units. The transceiver 242 converts the received RF signal into an electrical signal. The speaker 240 is electrically connected to the transceiver 242 and receives the electrical signal from the transceiver 242. The speaker 240 decodes the electrical signal into an audio wave which can be heard by the user.

Microphone 238 is attached to the chin bar 44 of the helmet assembly 12. A cable 239 (shown in phantom) over which the signals produced by the microphone is similarly disposed in the chin bar 44. The microphone may be mounted to other locations on the helmet.

In one version of the invention, speaker 240 is an earpiece. The earpiece includes a hook shaped to be worn on the ear of the user. A bud with the actual sound generating transducer is attached to the hook. The bud is shaped to be positioned adjacent or in the ear canal of the user. The audio signal cable that supply signals to the bud are mounted to the helmet. The front end of the cable is however, not mounted to the helmet. This provides a degree of flexibility between the earpiece and the helmet shell 17. This flexibility accommodates for differences in body size of individual users. This flexibility also allows the user to move his/her head while using the personal protection system 10 of the invention while the earpiece remains in place. Also, multiple mounting assemblies are provided in the helmet. This allows the earpiece to be mounted for insertion in either ear of the user of the system 10.

Transceivers 242, in one version of the invention, operate in the 900 MHz band. The individual transceivers exchange digital, spread spectrum RF signals. The communications units 236 preferably operate in full duplex, i.e., the transceivers 242 can transmit and receive RF signals at the same time. One example of a suitable transceiver 242 is the STx 1000 manufactured by Eartec of Narragansett, Rhode Island. Coachcomm of Auburn, Alabama also markets an appropriate transceiver system. Each of these systems allows three or more individuals to simultaneously use the surgical protect system 10 of this invention and communicate in full duplex mode with each other using the transceivers. There is no need to depress a push-to-talk switch in order for any individual to communicate with another individual. Thus, this protection system 10 allows a group of individuals (three or more) to engage in conversation with each other as if in normal group conversation, without having to raise their voices in order to overcome the sound attenuating of the protective hoods 92 and the noise generated by the fan 50 and motor 52.

Figure 27:
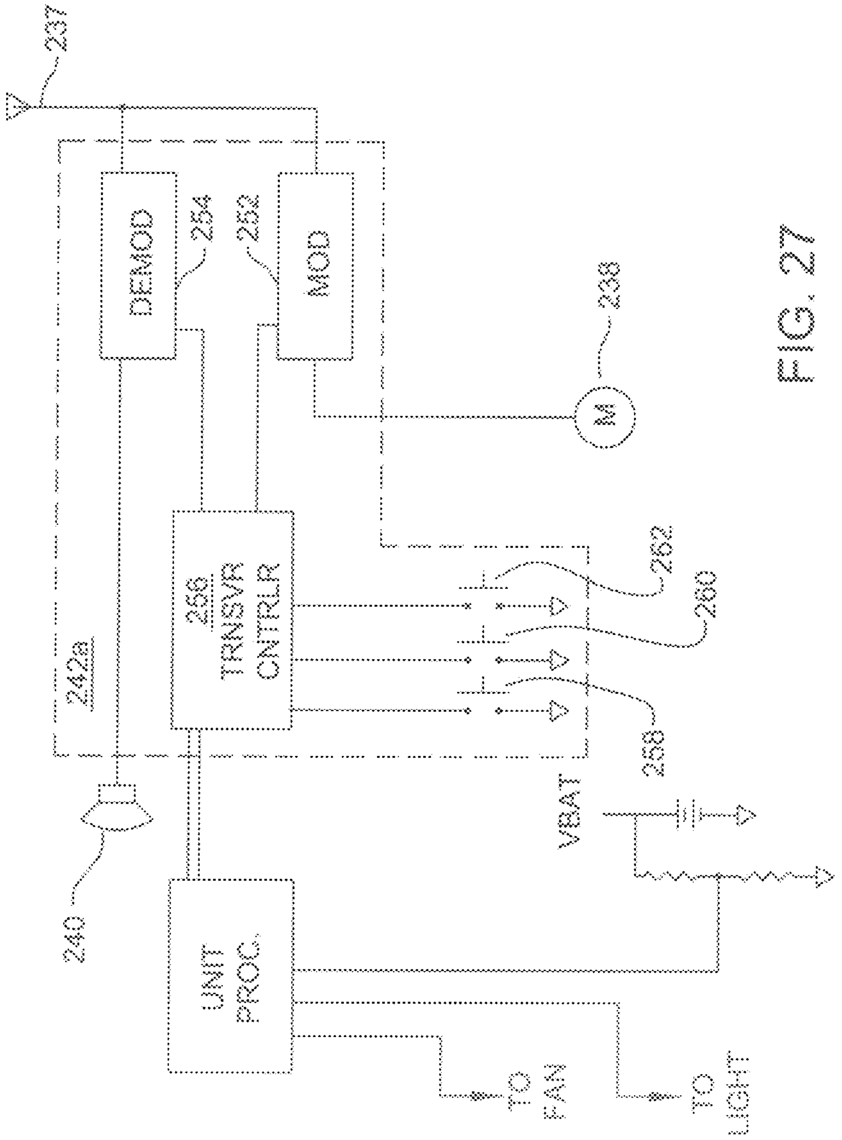
FIG. 27 is a block diagram of the components internal to a transceiver of this invention.

FIG. 27 illustrates in block form an alternative transceiver **242*a* of this invention. Transceiver 242*a* includes a modulator 252 for converting audio signals received from the microphone 238 into RF signals. The RF signals generated by the modulator 252 are broadcast over communications unit antenna 237. Also connected to antenna 237 is the transceiver demodulator 254. The demodulator 254 converts the received RF signals into audio signals that can be used to actuate the speaker 240**.

Actuation of the modulator 252 and demodulator 254 is controlled by a transceiver controller 256 also part of transceiver 242*a*. This transceiver controller 256 could be a conventional digital microprocessor, a PLA or a DSP. Transceiver controller 256 regulates the actuation of the modulator 252 and demodulator 254 in part based on the state of three user actuated switches 258, 260 and 262. An individual wearing system 10 of this invention could actuate one switch, for example switch 258, in order to effectively "turn off" the demodulator. 254. An individual takes this step if he/she does not want to receive the transmissions broadcast by others employing the communications units. If the individual wants the transceiver 242*a* in this state, the transmitter controller could respond by deactivating the demodulator 254. Alternatively, the transceiver controller 256, in response to the user wanting speaker 240 deactivated, turns on a FET that causes the audio output signal generated by the demodulator 254 to go to ground (FET not illustrated).

Transceiver controller 256 also selectively deactivates the output of RF signals by the modulator 252. The individual using system 10 may want the modulator 252 to temporarily stop broadcasting RF signals with embedded audio signals if he/she wants to conduct a conversation with a nearby individual that is not for broadcast. Switch 260 is actuated to regulate the selective broadcast of the RF modulated audio signals. In response to the individual wanting the transceiver 242*a* to not broadcast audio signals, the transceiver controller 256 temporarily stops actuation of the modulator 252. Alternatively, by switching a FET (not illustrated) the transceiver controller 256 selectively blocks the forwarding of audio signals from the microphone to the modulator 252.

The transceiver controller 256 also regulates the modulator 252 to control which group or groups of other communication units 236 are able to receive signals emitted by the transceiver 242*a*. For example, in versions of the invention wherein the individual transceivers exchange signals using a direct sequence spread spectrum protocol, the transmitter controller 256 regulates the codes used to establish the modulation of the output signals and the demodulation of the input signals. In versions of the invention wherein the individual transceivers exchange signals using a frequency hopping spread spectrum protocol, transceiver controller 256 generates the code that establishes the frequency hopping pattern of the carrier frequency. Switch 262 is the control member that is actuated to establish which group or group of communications units are able to exchange and/or receive signals.

The utility of the protection system of this invention's ability to selective exchange signals is now explained by reference to FIG. 28. Here, five individual communication units 236*a*-236*e* are shown. Arbitrarily, communications unit 236*d* is one unit that has this selective transmission/reception capability. Thus, by depressing switch 262, the associated transmitter controller 256 configures the transceiver 242*a* of communication unit 236*d* so that the broadcast audio signals can be received by all the remaining units 236*a*, 236*b*, 236*c* and 236*e* or just by unit 236*e*. This allows a surgeon to have some privacy to communication with another individual wearing the system 10. Alternatively, this allows a surgical assistant to communicate with another individual without disturbing the surgeon.

Figure 29:
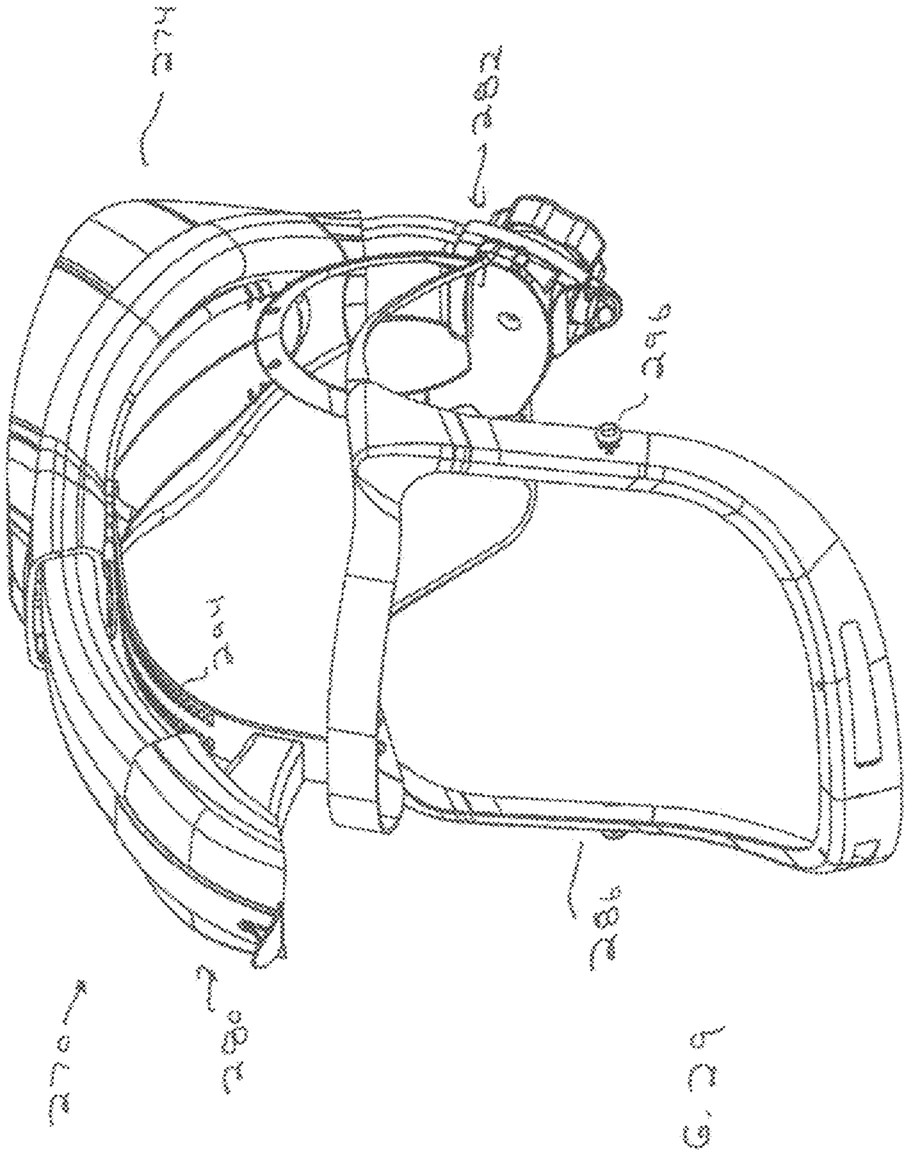
FIG. 29 is a perspective view of an alternative head unit of the personal protection system of this invention.
Figure 30:
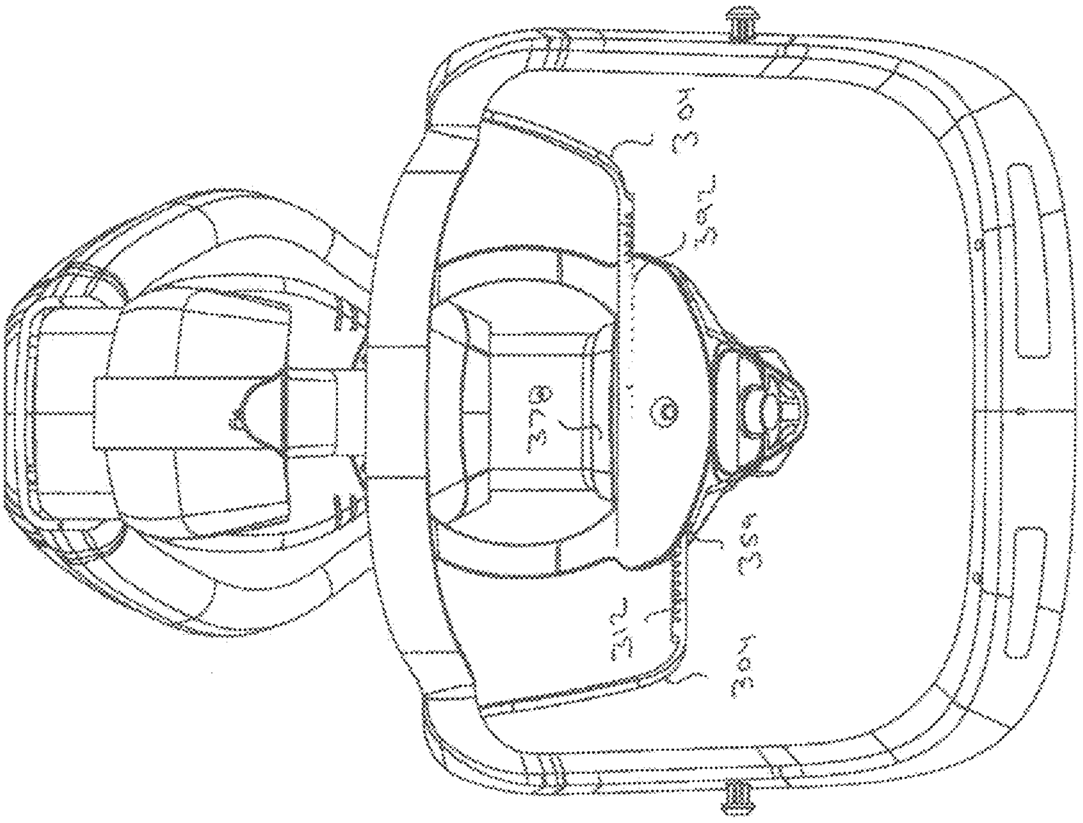
FIG. 30 is a front view of the head unit.
Figure 13:
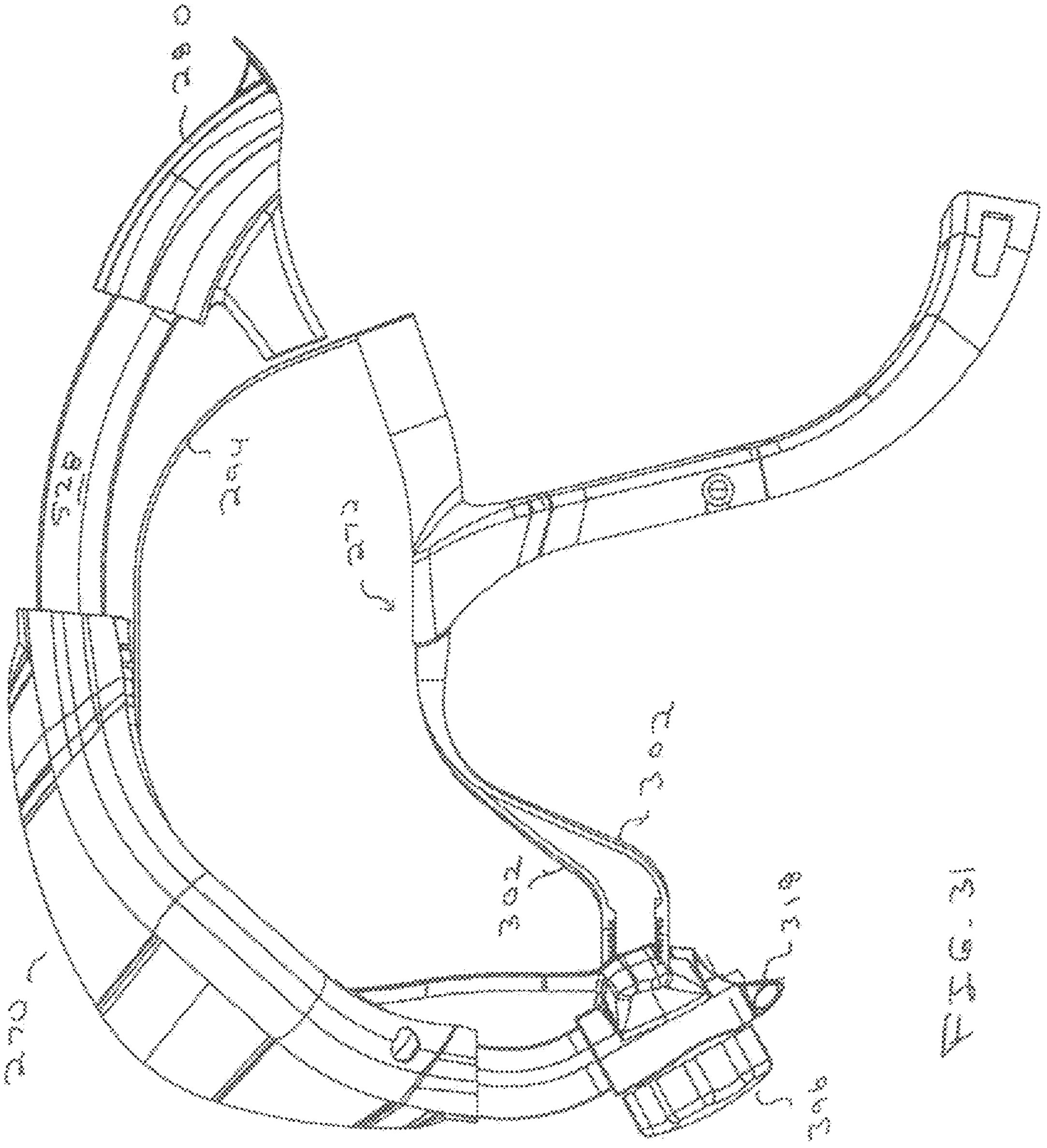
Figure 32:
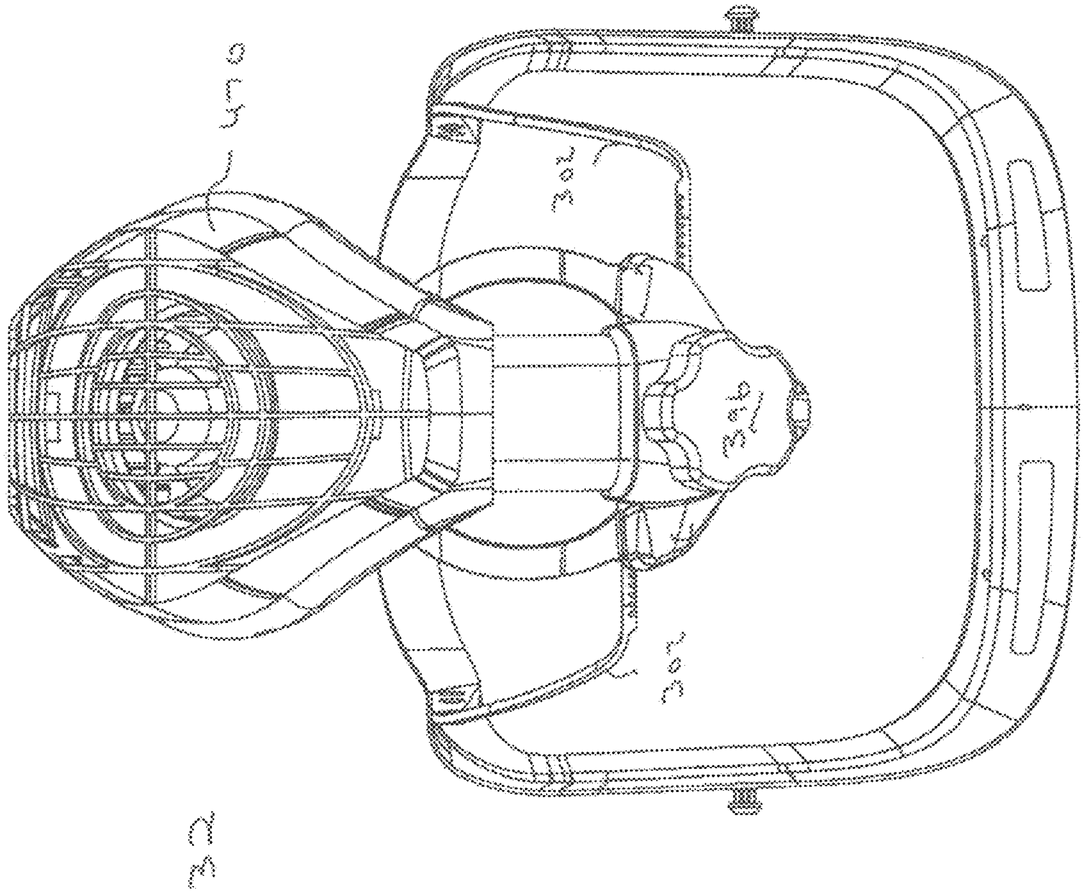
FIG. 32 is rear view of the head unit.

In FIG. 29, a receiver 264 is also shown. The receiver is capable of receiving the signals broadcast by one or more the communication units 236*a*-236*e*. The audio signals broadcast by the receiver 264 can be broadcast through a loudspeaker 263. This may be desirable in a teaching setting. Alternatively, the audio signals may be stored with the aid of a recorder 265. Again, by selective modulation of the broadcast signals, the ability of the receiver to demodulate the signals broadcast by any particular transceiver 242*a* is selectively regulated.

Returning to FIG. 28, it is seen that a unit processor 272 is connected to the transceiver controller 256. Digital signals extracted from the received RF signals by the demodulator 254 are forwarded to the transceiver controller 256. Modulator 252 is able to embed digital signals received from the transceiver controller 256 into the broadcast RF signals. Primarily the transceiver controller 256 functions as an intermediate processor for transmitting digital signals received by the unit processor 272 and forwarding digital signals used by the unit processor. In some versions of the invention, transceiver controller 256 and unit processor 272 are a single unit.

Figure 28:
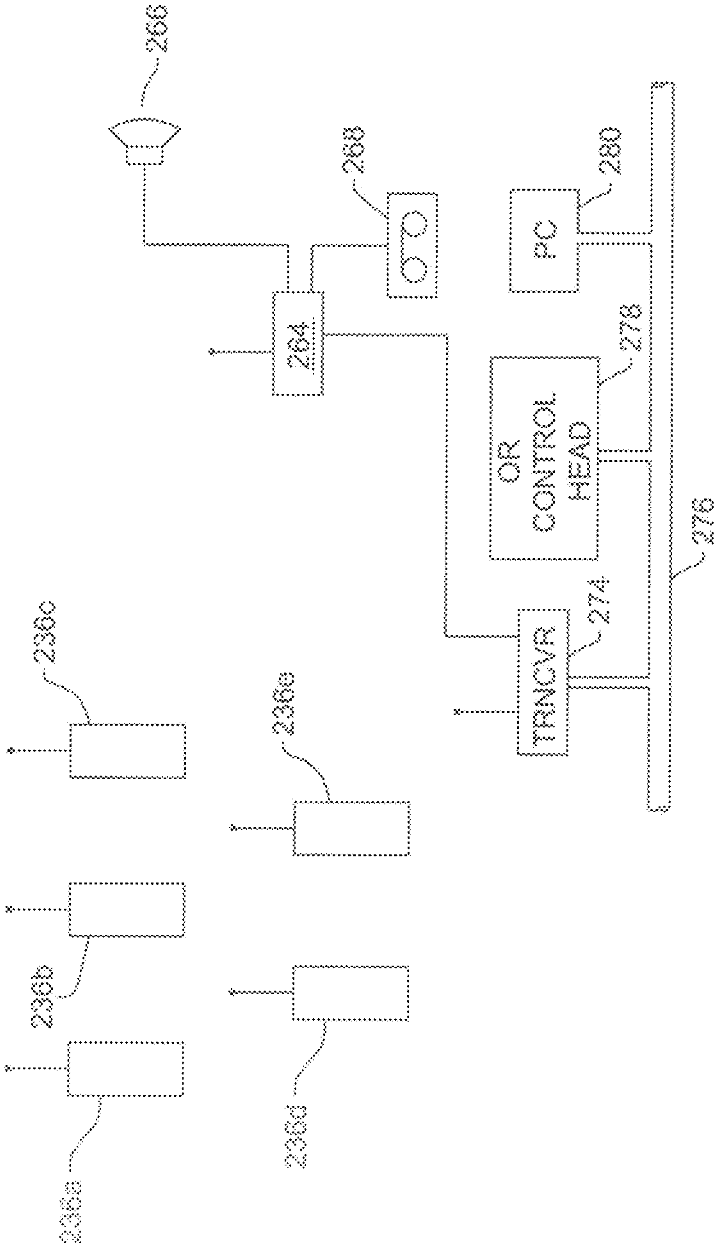
FIG. 28 is a diagrammatic illustration of how signals are exchanged between different communications units of this invention.

The digital RF signals are exchanged with a static RF transceiver 259 seen in FIG. 28. Transceiver 259 is connected to a communications bus 266 in the operating room. Other units connected to the bus include the below-discussed operating room control head 261 and equipment such as a personal computer 268. One such operating room control head 261 is sold by the Applicants' Assignee under the trademark SIDNE. This arrangement allows the transceiver 242*a* to serve as the unit through which other components of the surgical protection system 10 exchange signals with remote devices. In FIG. 28, the operating room control head is shown as receiving audio signals from the static receiver 264. In some versions of the invention, transceivers 264 and 259 are a single unit.

For example, by speaking into the microphone 238, the surgeon speaks the command "Focus Light". The audio signal representative of these words is transmitted by transceiver 242*a* to the operating room control head. The operating room control head processes the audio signals to decode the command. Once the command is interpreted, the operating room control head, through transceiver 259 generates a command data packet to the transceiver 242*a*. The transceiver 242*a* strips out the command message and forwards it to the unit processor 272. Unit processor 272, upon receipt of the command, generates appropriate control signals to cause the actuation of the servo motor employed to displace the lens integral with the light assembly 200.

The speed of the fan motor 52 is similarly regulated by the integrated system of this invention.

Communication unit 236*a* can also provide voice actuated control of the other equipment in the operating room such as the surgical instruments and the operating room environmental settings (HVAC and light). More specifically, the spoken commands entered through microphone 238 are transmitted by transceiver 242*a* and receiver 264 to the operating room control head 261. The operating room control head then generates the appropriate instruction packets that are output on bus 266 to the appropriate device that is to act on the instructions.

The integrated construction of the system of this invention also allows the personal protection system 10 to report back information regarding its own operating state. In FIG. 28, the signal present at the junction of the two resistors forming voltage divider 232 is shown as being applied to unit processor 272. In the event the signal present at this point falls to a level at which indicates the charge stored in power supply 70 is becoming low, the unit processor 272 generates a data packet with these data. The data packet is forwarded to the transceiver controller 256 so it is broadcast by the transceiver 242*a*. The data packet is received by transceiver 259. This packet is forwarded to the personal computer 268. This provides personnel in the operating room with notice that the particular power supply 70 worn by a specific individual is close to being discharged and should be replaced.

VI. Alternative Head Unit

FIGS. 29 through 34 illustrate an alternative support structure for supporting hood 92 around the head and upper body of the wearer. This particular support structure is a head unit 270. Head unit 270 includes a head band 272 to which a ventilation unit 274 and light 276 (FIG. 49) are adjustably mounted. The air forced through the ventilation unit 274 is discharged through front and rear nozzle assemblies 280 and 282, respectively. The adjustability of the ventilation unit 274 relative to the head band allows the components forming the unit, primarily the ventilation fan 278, to be positioned relative to the body of the wearer where the physical strain the unit imposes on the wearer is minimized.

More particularly, head unit 270 includes a face frame 286 formed of plastic that has some flexibility. In one version of the invention, face frame 286 is formed from polypropylene or Nylon. Face frame 286, best seen in FIG. 35, is shaped to have a forehead band 288 that has a curvature designed to allow the bar to fit against the forehead of the individual. Not shown are padding that may be secured to the inner surface of the forehead band 288. Extending downwardly from the opposed ends of forehead band 288, face frame 286 has downwardly extending support posts 290. A chin bar 292, also part of face frame 286 extends between the opposed bottom ends of support posts 290. Chin bar 292 has a curved shape such that forward portion of the guard between the posts 290 extends forward of the posts.

Also part of face frame 286 is a support strap 294. Support strap 294 is in the form of a generally rectangular strip and extends upwardly from the center of the forehead band 288. As discussed below, support strap 294 is the member from which the ventilation unit 274, light 276 and front nozzle assembly 280 are suspended.

A mounting pin 296 extends outwardly from each of the face frame support posts 290. Each mounting pin 296 has a stem (not identified) that extends outwardly from the outer surface of the associated support post 290. Each mounting pin 296 also has a wide diameter head 298 that forms the free end of the pin. Mounting pins 296 support and secure the transparent shield integral with the hood.

Figure 36:
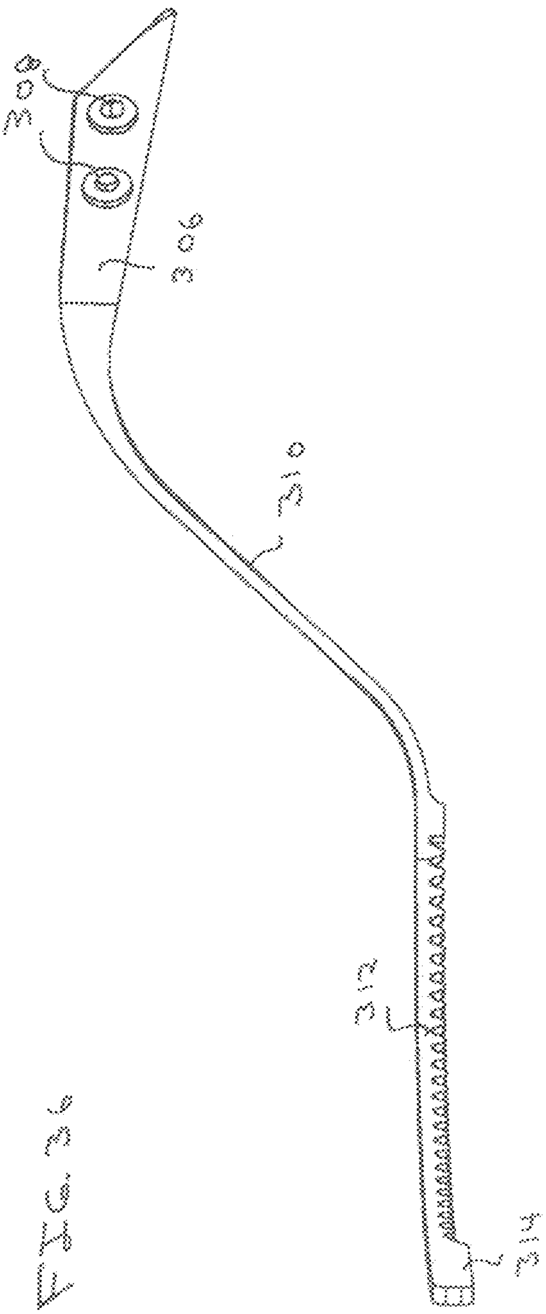
FIG. 36 is a plan view of one of the head straps.

A head strap 302 extends rearwardly from each end of the face frame forehead band 288. Collectively, the forehead band 288 and head straps 302 form the head band 272. Head straps 302 are formed from very flexible plastic such as Nylon 66. Each head strap 302, as seen in FIG. 36, includes a base 306 that has a relatively wide width. Base 306 is seated against the inner surface of the associated end of the forehead band 288. Two openings 308 extend through each strap base 306. Openings 308 accommodate fasteners (not illustrated,) that hold the head strap 304 to the face frame 286. In the illustrated versions of the invention, a counterbore (not identified) extends around each opening 308.

A leg 310 extends downwardly from each head strap base 306. Each leg 310 has a width less than that of base 306 from which the leg extends. Each head strap 302 has a rack 312 that extends from the free end of the leg 310. The racks have a set of teeth (not identified) that extend laterally away from the longitudinal axis of the rack. FIG. 36 illustrates the head strap 302 for the left side of head unit 270. This head strap 302 is formed so that the rack teeth project downwardly. The head strap 302 for the right side of the head unit 270 is formed so that the teeth project upwardly. A toe 314 projects perpendicularly away from the free end of each rack 312. Each toe 314 is directed in the same direction in which the associated rack teeth are directed.

Rear nozzle assembly 282 both directs the output flow from the fan 278 down the neck of the wearer and holds head straps 302 together. Rear nozzle assembly 282 includes a shell 320 and a tip 318 that rotates around the longitudinal axis of the shell.

Figure 37:
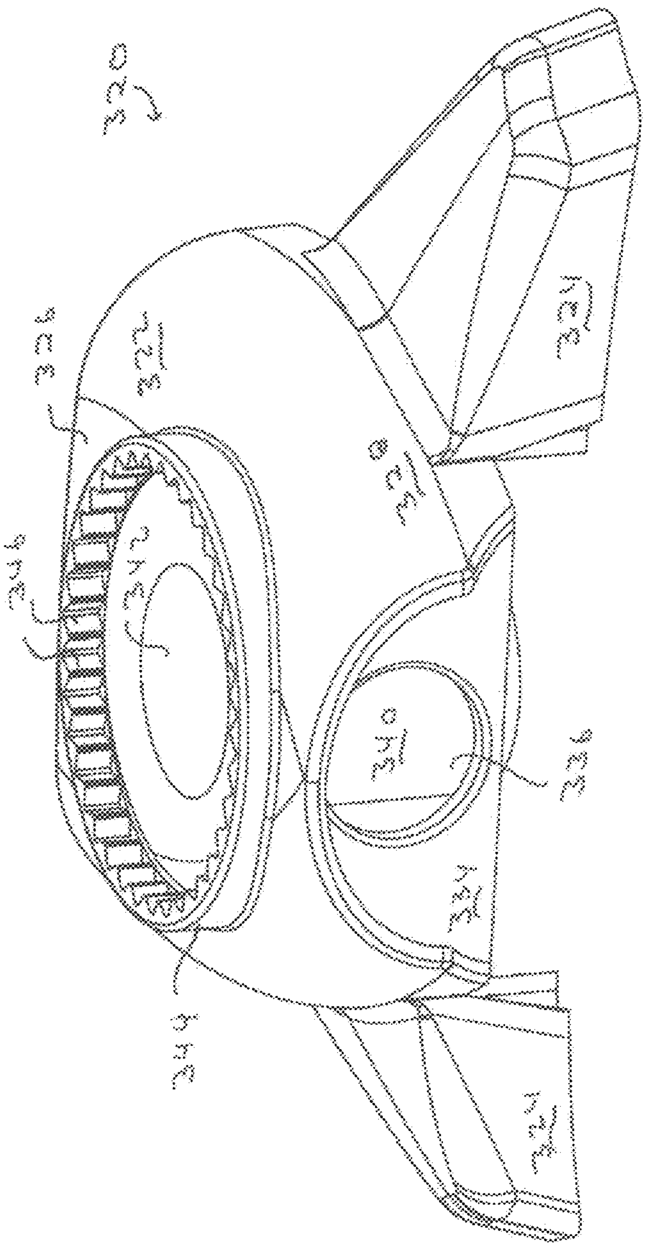
FIG. 37 is view of the outside of the rear nozzle assembly shell.
Figure 38:
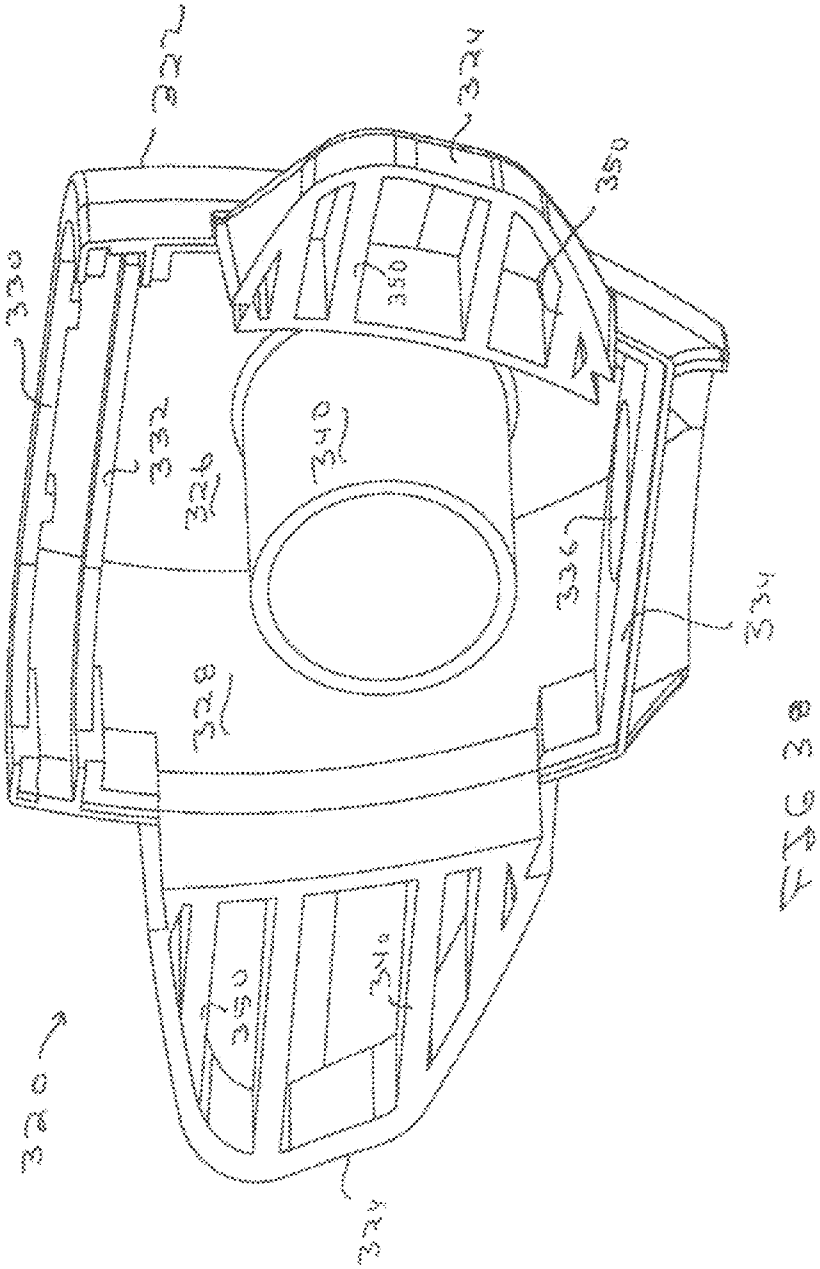
FIG. 38 is a view of the inside of the rear assembly shell.

The rear nozzle assembly shell 320 now described by reference to FIGS. 37 and 38. Shell 320, is formed from a single piece of plastic and has a three-sided trunk 322 from which two wings 324 extend. More particularly, the trunk 322 is formed to have a back wall 326 that curves into two opposed side walls 328. Shell 320 is further formed so that the opposed side walls 328 are inwardly tapered. Consequently, shell 320 is wider at the top than at the bottom. The shell 320 is further formed to have two spaced apart ribs 330 and 332 that extend laterally across the inner surface of the shell, from side wall to side wall. Rib 330 is located around the open end of the shell 320. Rib 332 is parallel to and located below rib 330.

A plate 334 extends from the inner surfaces of back wall 326 and side walls 328. Plate 334 extends to and does not project beyond the inner edges of the side walls 328. An opening 336 extends through the plate 334. Opening 336 is centered along an axis that extends longitudinally through the void space defined by the shell back wall 326 and side walls 328.

A rigid tubular sleeve 340 extends inwardly from the shell back wall 326 so to project into the void space between the back wall and side walls 328. Sleeve 340 extends from an opening 342 in the back wall 326. The back wall 326 is further formed to have an annular ring 344 concentric from and radially spaced away from opening 342 that projects from the wall outer surface. Ring 344 is formed with spaced apart teeth 346 that extend inwardly to opening 342.

Each shell wing 324 extends from a separate one of the base side walls 328. The wings 324 are basically three wall structures that are arranged so that the open faces thereof extend forwardly, toward face frame 286. Plural spaced apart reinforcing webs 350 extend through the void spaces defined by each wing 324 and the trunk side wall 328 from which the wing extends. Webs 350 extend laterally, that is perpendicular to the top-to-bottom longitudinal axis through the shell 320.

A plate 352, also part of the rear nozzle assembly 282, extends over the open void defined by the shell 320. Plate 352, now described by reference to FIG. 39, has a panel section 354 with a generally concavo-convex profile. The panel section 354 is further formed to have side edges (not identified) that are inwardly tapered. Panel section 354 is further formed so that the opposed top and bottom side edges are outwardly bowed. The panel section 354 is also shaped to have curved corners.

Figure 39:
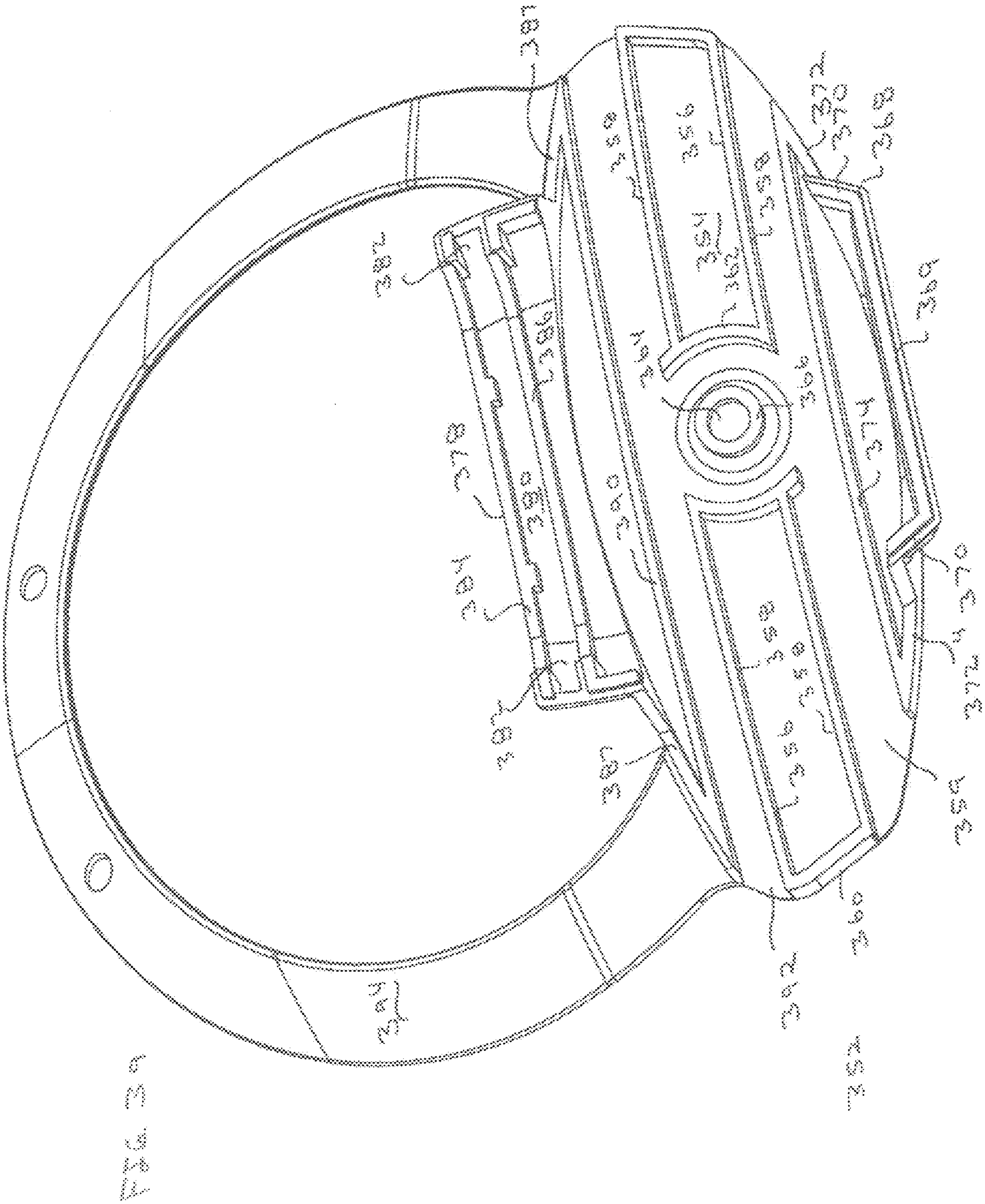
FIG. 39 is a perspective view of the inside of the plate of the rear nozzle assembly.

Extending outwardly from the inner surface of the panel section 354, the surface seen in FIG. 39, plate 352 is shaped to have two four sided reinforcing frames 356. Each reinforcing frame 356 extends outwardly from the inner surface of panel section 354. Each frame 356 has two parallel and spaced apart top and bottom ribs 358. An outer rib 360 located along the adjacent side edge of the panel section 354 extends between ribs 358 at one end of each frame. An inner rib 362, that is curved toward the side, extends between each of the ribs at the opposed inner end of each frame 356.

A hole 364 extends through the center of panel section 354. The panel section 354 is formed with an annular rib 366 around the hole 364. The plate 352 is further shaped so that the frame inner ribs 362 have a center of curvature that is concentric with hole 364.

A foot 368 projects outwardly from the bottom of panel section 354. Foot 368 has a planar base 369 that forms the bottommost structural component of the plate 352. Steps 370 extend from the opposed ends of foot 369 to the adjacent sections of the panel section bottom edge. Short lips 372 extend from each step 370 a short distance along the adjacent section of the panel section bottom edge. A reinforcing web 374 extends along the inner surface of the panel section 354. Web 374 extends between the opposed free ends of lips 372. The web 374 is parallel with and spaced apart from the two linearly aligned bottom ribs 358 of the reinforcing frames 356. Thus, a slot 359 is defined between the lowermost ribs 356 and web 374.

The plate 352 also has a three sided collar 378 that is integral with and extends a short distance above the panel section 354. Collar 378 has a front wall 380. Two side walls 382 curve inwardly from the opposed ends of the front wall 380. Formed integrally with the collar are two parallel ribs 384 and 386. Rib 384 extends inwardly across the coplanar top edges of the collar front wall 380 and side walls 382. Rib 386 is located below and is spaced from rib 384.

A lip 387 extends from each collar outwardly along the panel section top edge. The lips 387 project away from the inner surface of the panel section 354. A web 390 extends outwardly from the inner surface of the panel section 354 between the ends of the opposed lips 387. The web 390 is parallel to and located above the opposed, linearly aligned top ribs 378 of the reinforcing frames 356. Thus, a slot 392 is defined by the top located ribs 356 and web 390.

Plate 352 is further formed to have a support arch 394. The arch 394, which has a generally circular shape, extends upwardly from top edge of panel section 354. While cross sectional slices through the arch are of constant diameter, the arch does not lie flat. The arch 394 is angled toward the center. This profile approximately matches the general contour at the back of the skull. More particularly, the opposed terminuses of arch 394 are each located between one end of collar 378 and the adjacent panel side edge. As discussed below, arch 394 flexibly supports the ventilation unit 274 above the head of the wearer.

Figure 40:
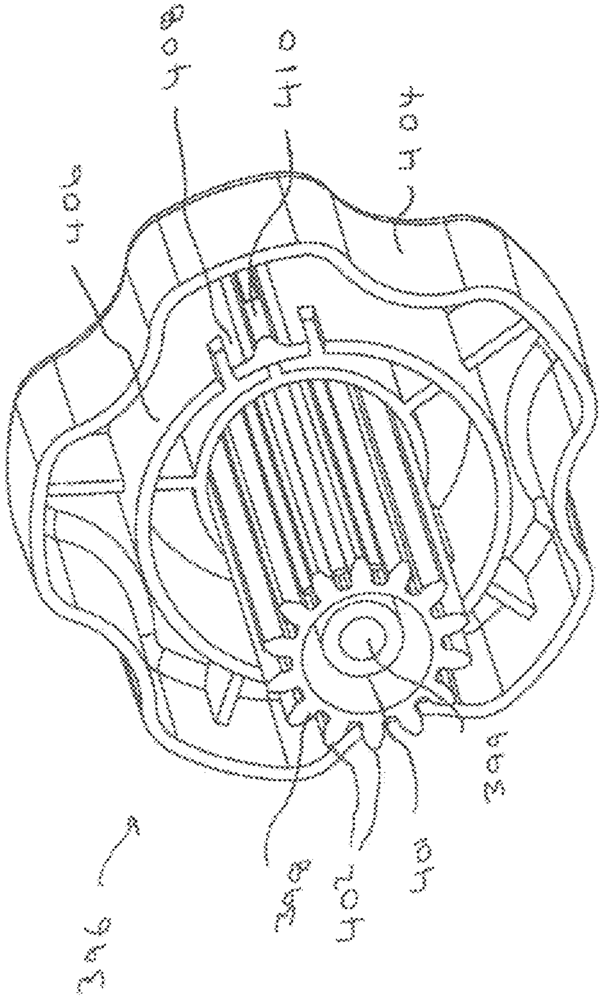
FIG. 40 is a perspective view of the knob integral with the rear nozzle assembly.

When the rear nozzle assembly 280 is assembled, plate 352 is positioned against the open, forward directed surfaces of shell 320. A knob 396, also part of the rear nozzle assembly 282, is mounted to the exposed back surface of the shell 320. The knob 396, seen best in FIG. 40, includes a cylindrical shaft 398. Arcuately spaced apart teeth 402 extend radially outwardly along the shaft 398. The knob shaft 398 is further formed to have a bore 399 that is open from the free end of the shaft. In one version of the invention, bore 399 extends through a sleeve 401 constrict with and located in shaft 398.

The knob 396 also has a head 404 disposed over one end of the shaft 398. Internal to the head 404 is ring 406 that extends around the portion of the shaft disposed in the head. Ring 406 is concentric with and spaced radially outwardly from shaft 398. The ring 406 is formed with two diametrically opposed flexible tabs 408 (one shown). Each tab 408 has a single rib 410 that extends longitudinally along the outer surface of the tab.

The rear nozzle assembly 280 is constructed so that the knob shaft 398 seats in and extends through shell sleeve 340. The free end of the shaft 398 seats against the annular space about the reinforcing rib 366 formed in plate 352. A threaded fastener (not illustrated) extends through plate hole 364 and into bore 399 integral with knob 396. This fastener holds the panel 352 to the shell 320. When the rear nozzle assembly is so constructed, the ribs 410 integral with knob 396 seat in the void spaces between shell teeth 346.

When head unit 270 is assembled, the head strap racks 312 seat in the slots between shell 320 and panel 352. This is seen best in FIG. 30; here it is understood the left-right sides of head unit being inverted. Specifically, the rack 312 integral with the right side head strap 302 seats in slot 359. The rack 312 the forms part of the left side head strap seats in slot 392. The rack teeth engage knob teeth 402.

Figure 41:
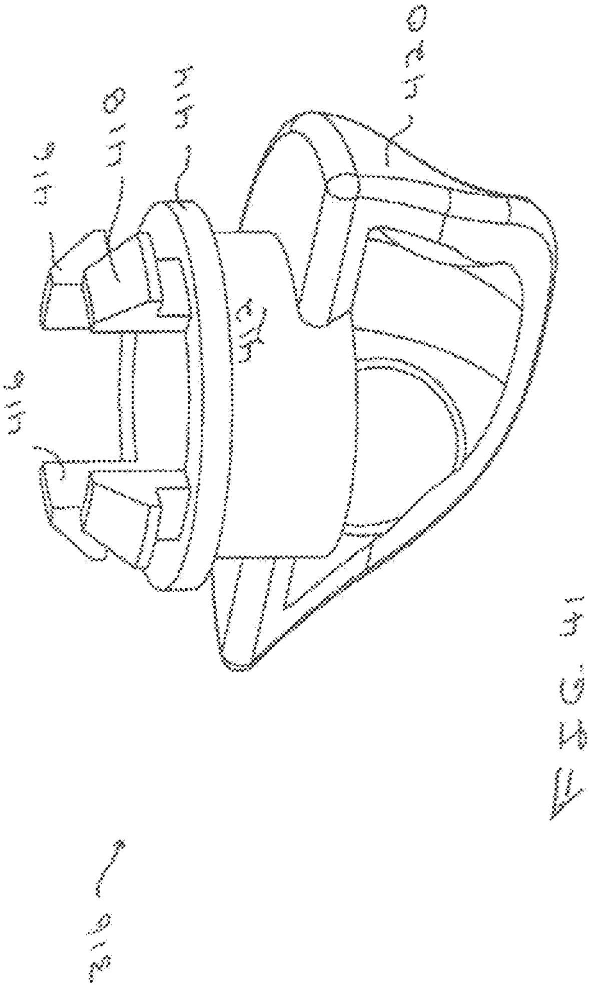
FIG. 41 is a perspective view of tip of the rear nozzle assembly.

Rear nozzle tip 318, now described by FIG. 41, includes a tubular base 412. A lip 414 extends annularly around the open end of base 412 and away from the outer surface of base. Projecting upwardly from lip 414, nozzle tip 318 has four equiangularly spaced apart mounting tabs 416. Each tab 416 has a head 418 with a tapered outer surface. When the rear nozzle assembly 282 is put together, tabs 342 snap fit in shell opening 336. Nozzle tip 318 is thus able to rotate relative to the axis that extends through opening 336.

Nozzle tip 318 is formed with a head 420 that partially surrounds the bottom open end of base 412. The nozzle tip 318 is formed so that tip head 420 is generally shell shaped such that the open end of base 338 opens into the void space defined by the concave surface of the head.

Figure 42:
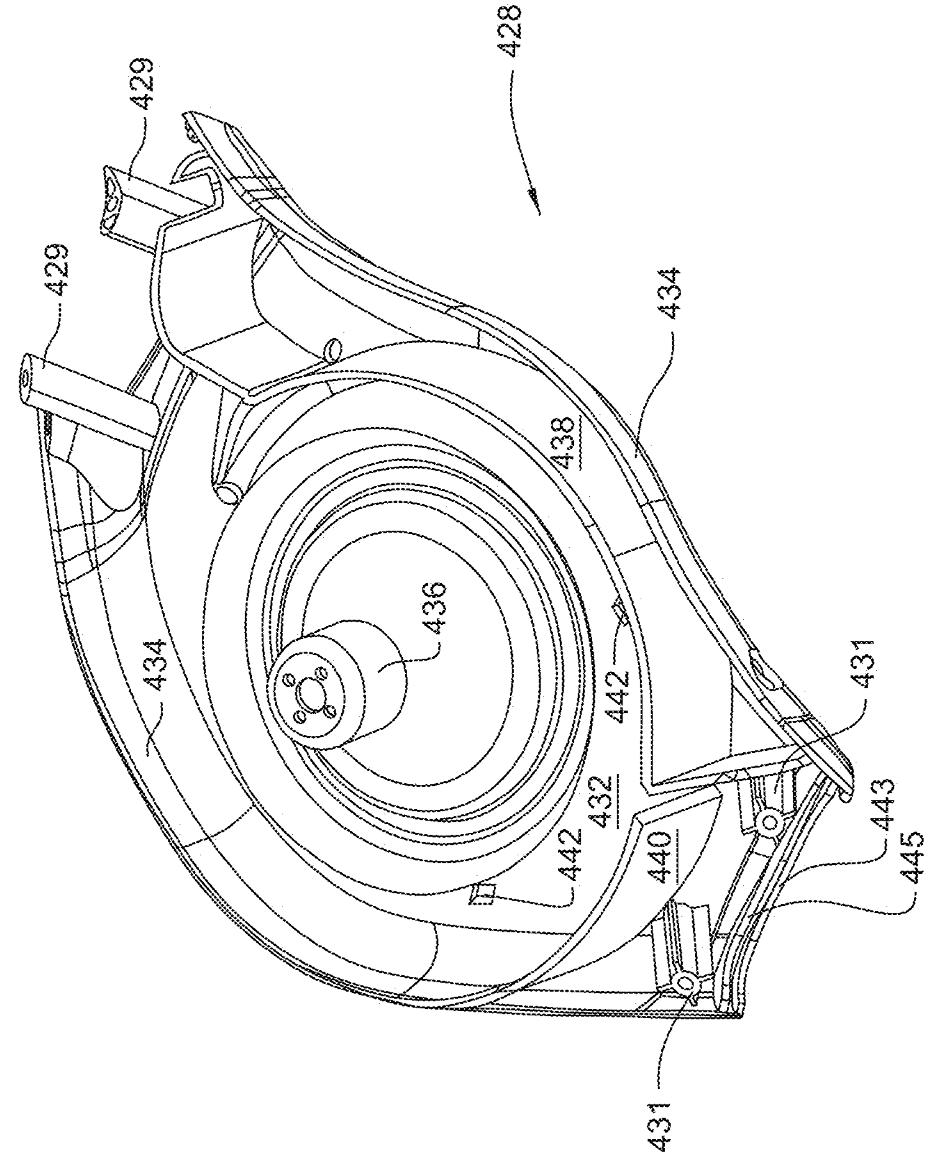
FIG. 42 is a view of the inside of the lower shell of the ventilation unit.

Returning to FIG. 34 it can be seen that ventilation unit 274 includes lower and upper shells 428 and 430, respectively, that house a fan 433 and a motor 434. The lower shell 428, best seen in FIG. 42, includes a base 432. The lower shell 428 is formed so that the base 432 is widest at the center and relatively narrow at the opposed front and rear ends. Opposed side walls 434 extend upwardly from the side edges of base 432 extend along the longitudinal side edges of the base. Shell base 432 also has a cylindrical, hollow boss 436 that extends upwardly from the center of the base. Boss 436 is dimensioned to receive the fan motor 434. Not identified is the opening in the center of the boss 436 wherein the rotating shaft of the motor extends therethrough.

The lower shell 428 is formed with two pairs of posts 438 and 440 that receive fasteners for holding the upper and lower shells together. Each of the posts 438 and 440 extends upwardly from the shell base 432. A first pair of posts, posts 438, are located adjacent the front end of the lower shell 428. Each post 438 is located inwardly of an adjacent one of the side walls 434 at the front end of the shell 428. Each post 440 is located inwardly of and adjacent one of the side walls at the rear of the shell 428.

Two parallel ribs 442 and 444 extend inwardly from the shell base 432 and side wall 434 adjacent the rear opening these surfaces define. One rib, rib 442 extends inwardly around the open rear end of the shell. Rib 444 is located forward of and spaced apart from rib 442. While not illustrated, it should be appreciated that similar ribs project outwardly from the base 432 and side walls 434 at the front end of the lower shell 428.

The lower shell 428 also has a set of baffle plates 438 and 440 that partially surround and are radially spaced away from boss 436. One plate, plate 438, is generally S-shaped and starts at a locating slightly behind the open front end of the shell and the curves slightly inwardly. Baffle plate 438 then has a section that is has a radius of curvature that is centered on the axis of boss 436. This particular section of the baffle plate 438 subtends approximately 150° of the circumference around the boss 436. Baffle plate 438 also has a tail section that angles away from the S-section. This section of the baffle plate angles back to and abuts the adjacent shell side wall 434.

Baffle plate 440 has an arcuate profile. The baffle plate 440 extends from the side wall 434 opposite the side wall with which plate 438 is associated. Baffle plate 440 is spaced forward of and substantially covers the open end of the lower shell 428. The baffle plate 440 subtends an arc of approximately 70° around boss 436. There is an arcuate separation of approximately 5 to 10° between the arcuate section of baffle plate 438 and the adjacent plate 440.

The lower shell 428 is also formed so that there are a number of rectangular openings 442 in the base 432. Openings 442 facilitate the securing of a motor cover 444 (FIG. 34) to the exposed bottom surface of the lower shell 428 as discussed below.

Figure 43:
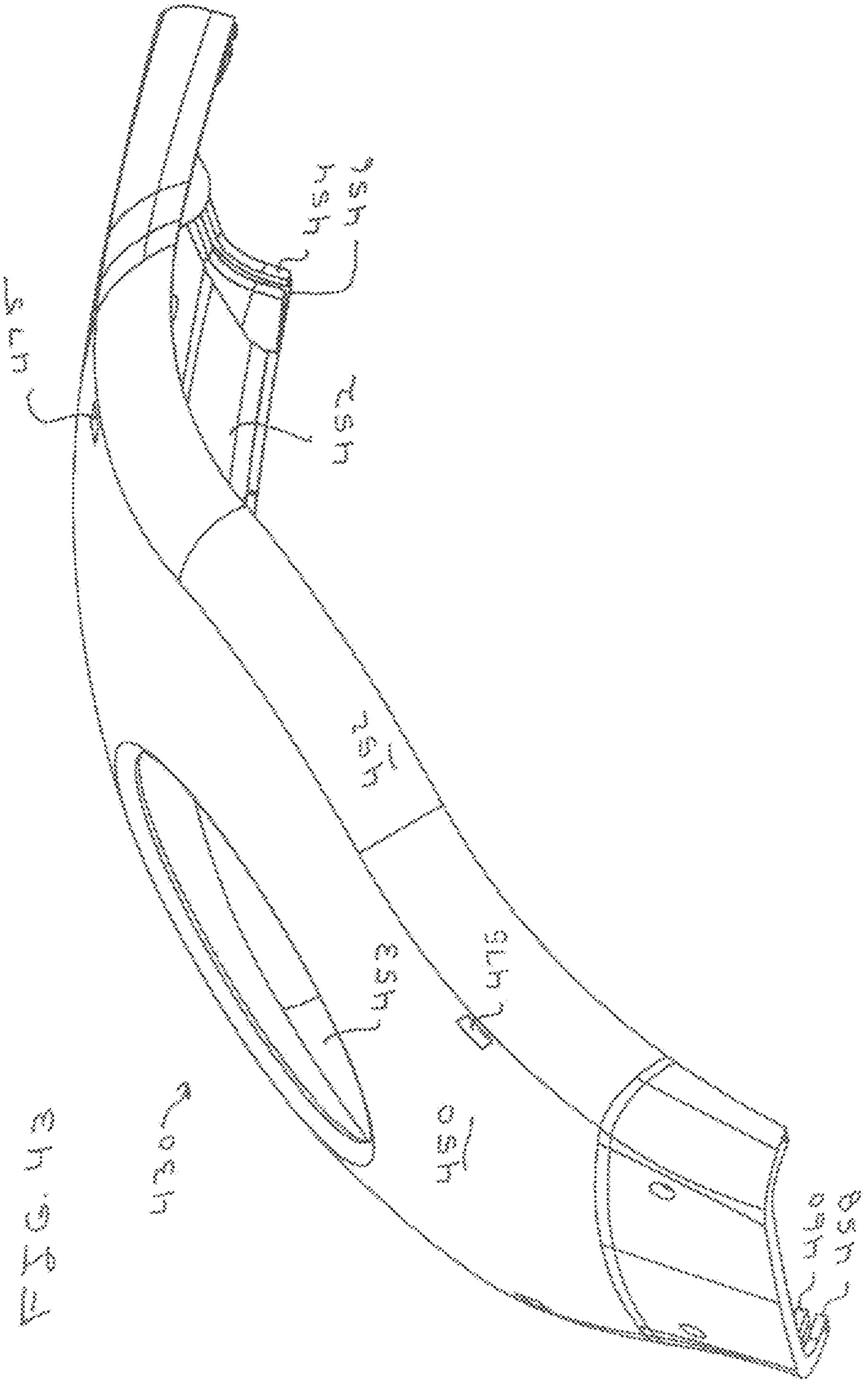
FIG. 43 is a perspective view of the upper shell of the ventilation unit.

The upper shell 430, now described by reference to FIG. 43, includes a lid 450 from which two side walls 452 extends. Lid 450 has a shape that generally conforms to that of lower shell base 432. The lid 450, like the lower shell base 432 is curved along its longitudinal axis. Side walls 452 extend along the longitudinal side edges of the lid and curve downwardly from the lid. The lid 450 is formed with a circular center opening 453. When the shells 428 and 430 are assembled together, opening 453 is coaxial with lower shell boss 436.

The upper shell 430 is further formed to have ribs 454, 456, 458 and 460 similar to the ribs 442 and 44 of the lower shell 428. Two parallel ribs 454 and 456 extend side wall to side wall at the front end of the upper shell. Rib 454 extends into the opening defined by the lid 450 and the adjacent side walls 452. Rib 456 is parallel to and spaced behind rib 454. Ribs 458 and 460 adjacent the rear opening of the upper shell 428 (ribs only partially shown.) The first rib, rib 458, extends around the rear opening. The second rib, rib 460, is spaced inwardly of rib 458.

Figure 44:
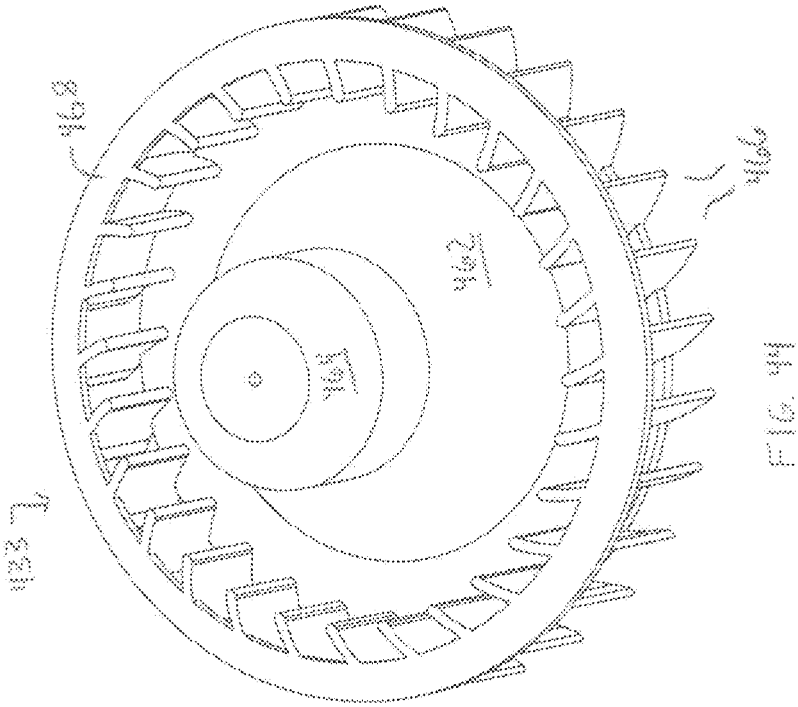
FIG. 44 is a perspective view of the ventilation unit fan.
Figure 44A:
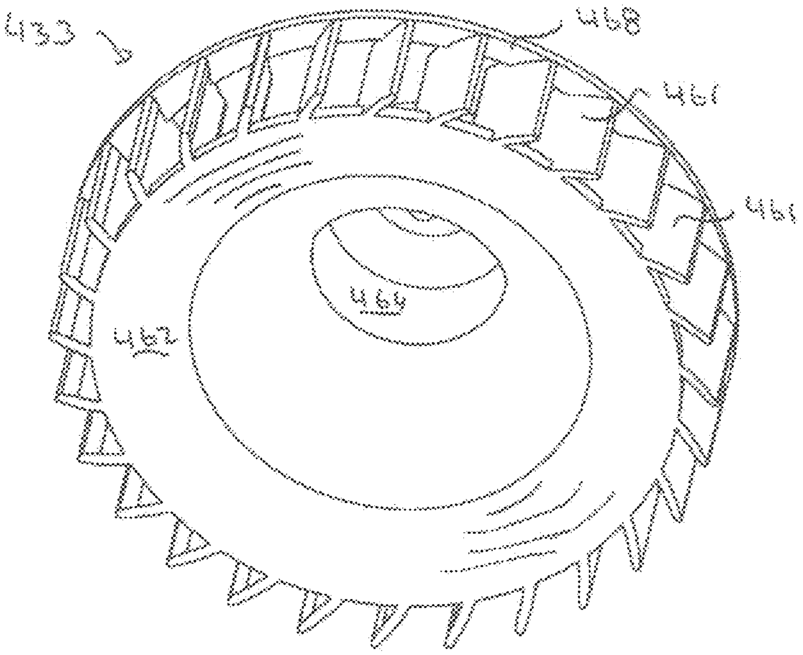
FIG. 44A is a perspective view of the underside of the fan.

Fan 433, illustrated in FIGS. 44 and 44A, has a circular base 462. A hollow boss 464 extends upwardly from the center of the base 462. While the fan base is circular, it is not flat. Instead the base 462 curves upwardly to the hole formed by boss 464. When the ventilation unit 274 is assembled, the fan 433 is fitted in the lower shell 428 for mounting to the motor 434 the fan boss 464 seats over shell boss 436. The motor shaft mounts to the center of the fan boss 464 (motor shaft securement means not illustrated.) Located around the outer perimeter of base 462 are a number of arcuately spaced apart blades 466.

A ring 468 is disposed over the top surfaces of the blades 466. While in cross section ring 468 is flat, the ring has a tapered profile. Thus the inner edge of the ring is located above the outer edge. This change in lateral elevation of the ring 468 approximates the similar rise in elevation of the fan base 362. This profile of having these surfaces rise to the center approximates the curvature towards the center of the caudal portion of the skull. This is the portion of the head over which the ventilation unit 274 is centered.

Figure 45:
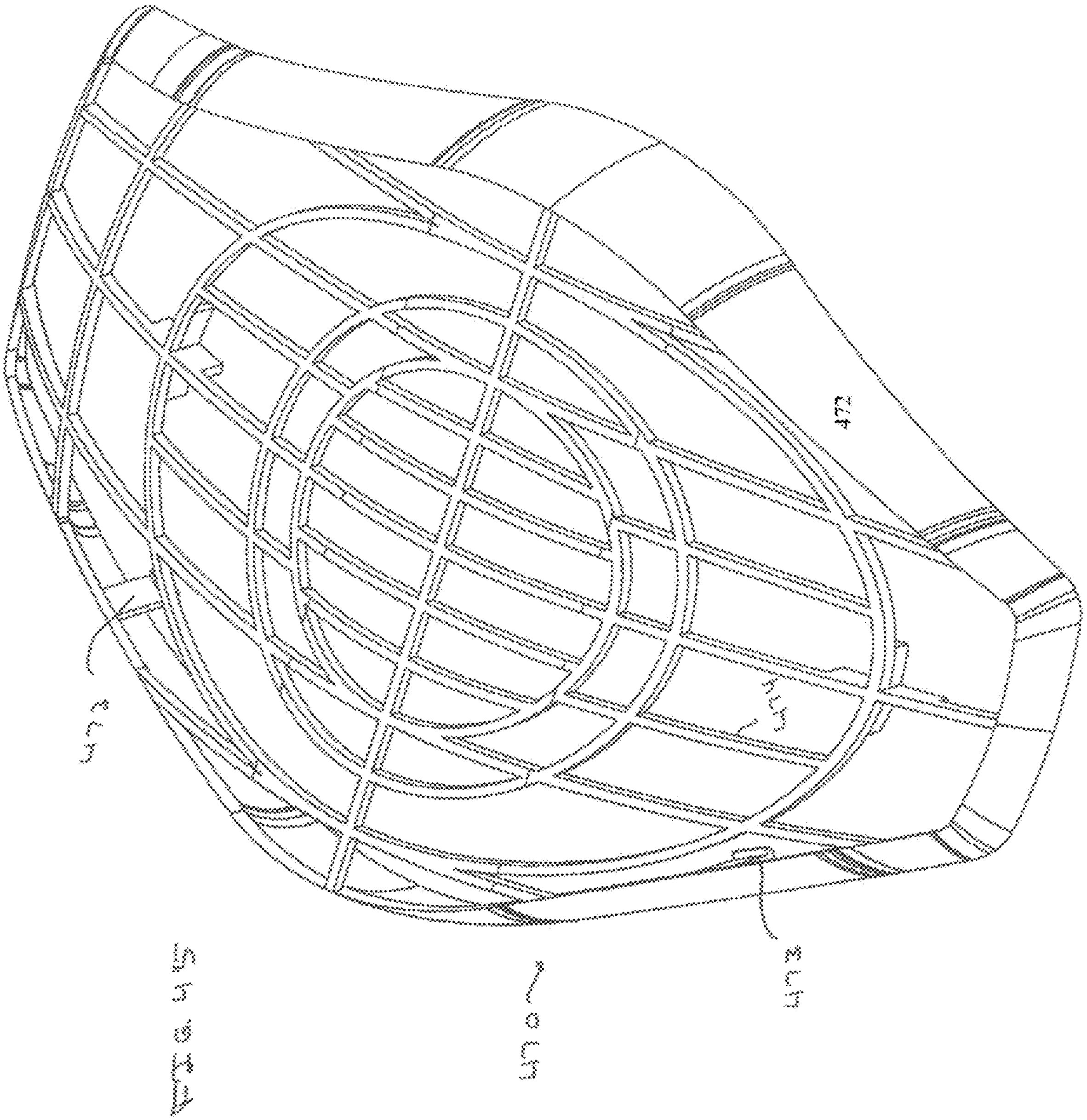
FIG. 45 is a perspective view of the ventilation unit grill unit.

A grill unit 470, also part of ventilation unit 274, is disposed over the top of the upper shell 430. As seen in FIG. 45, the grill unit 470 includes a frame 472. The frame 472 generally has a shape similar to that of the lid. However, frame 472 is sized to fit wholly on the outer surface of the upper shell lid 472. The frame, while formed from a set of flat strips of plastic, is shaped so that the strips are tapered inwardly. Thus the outer edges of the individual strips forming the frame are the surface of the grill unit 470 that seat against the adjacent outer surface of the upper shell lid 450.

Formed integrally with frame 472 is a lattice 474. The lattice is formed from a number of crossing webs. The lattice 474 extends over lid opening 453 and fan 433. Shown extending downwardly from frame 472 are snap tabs 473. When ventilation unit 274 is assembled snap tabs lock in openings 475 in the upper shell (FIG. 43) to hold the grill unit to the upper shell.

Figure 46:
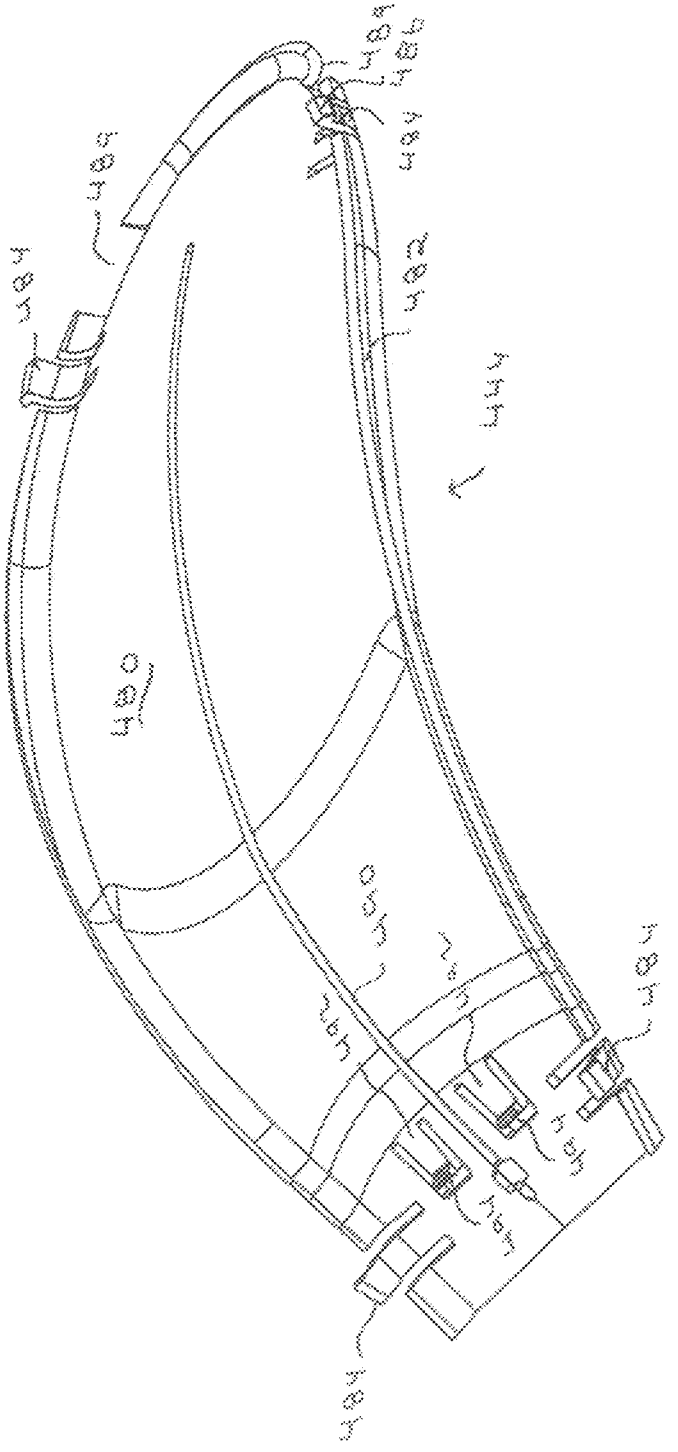
FIG. 46 is a perspective view of the ventilation unit motor cover.

The motor cover 444, best seen in FIG. 46, is fitted to the exposed under surface of the lower shell base 432. Motor cover 444 has a main body 480 that, while sheet like in shape, is curved along its longitudinal axis. Motor cover main body 480 is also curved into the center of the longitudinal center axis. Again, this curvature approximates the curvature of the portion of the skull over which the ventilation unit is typically seated. The front end of the main body has a straight edge; the rear end has a curved profile between the side edges. The motor cover 478 is further formed to have a lip 482 that extends upwardly from the outer perimeter of the main body 480. More particularly, the lip 482 extends upwardly along the side and rear edges of the cover body 480.

Four feet 484 interrupt the lip 482. Each foot 484 is generally L-shaped and extends upwardly in the same direction as the lip 482. Each foot 484 extends from the cover main body 480. Two of the feet 484 are located immediately behind the front edge of the cover base 432. The remaining two feet 484 are located forward of the curved rear end. Each foot 484 has an outwardly extending toe 486. Toes 486 extend above the outer edges of the adjacent lip 482. Motor cover 444 is secured to the lower shell 428 by snap fitting toes 486 in shell openings 442.

Motor cover 444 is further formed so that, one each side, forward the rear end and rearward of the rear located feet 484, there is a gap 489 in the lip 482.

The motor cover main body 480 is formed with a slot 490 that extends along the longitudinal axis of the body. Slot 490 starts at the front end of the body. The slot 490 terminates at a location forward of the rear end of the main body 480. Immediately rearward of the front end of the main body 480, motor cover 444 is formed with two flexible fingers 492. The fingers 492 are located diametrically opposite each other relative to slot 490. The finger 492 are formed integrally with the rest of the motor cover 444. Each finger 492 has a tip 494 that extends upwardly in the same direction as lip 482.

Ventilation unit 274 is partially suspended above the head of the wearer by arch 388. When head unit 270 is assembled, the upper end of the arch 388 is sandwiched between the outer surface of the lower shell 428 and the motor cover 444. Fasteners, (not illustrated,) hold the lower shell 428, and therefore the whole of the ventilation unit 274, to the arch. When motor cover 444 is secured to the lower shell 428 the arch extends through the gaps 489 in the cover lip 482.

Figure 33:
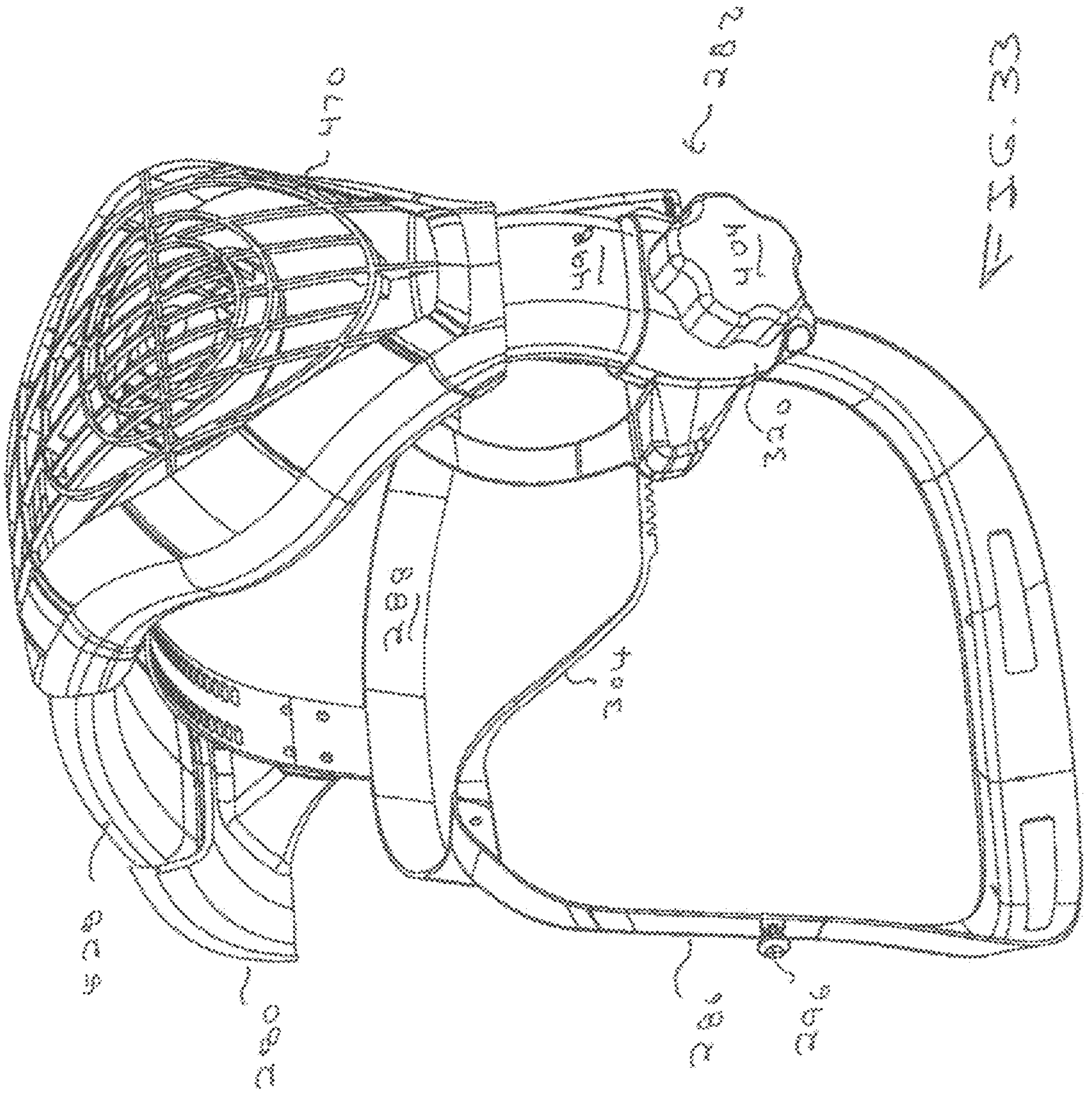
FIG. 33 is a rear perspective view of the head unit.
Figure 34:
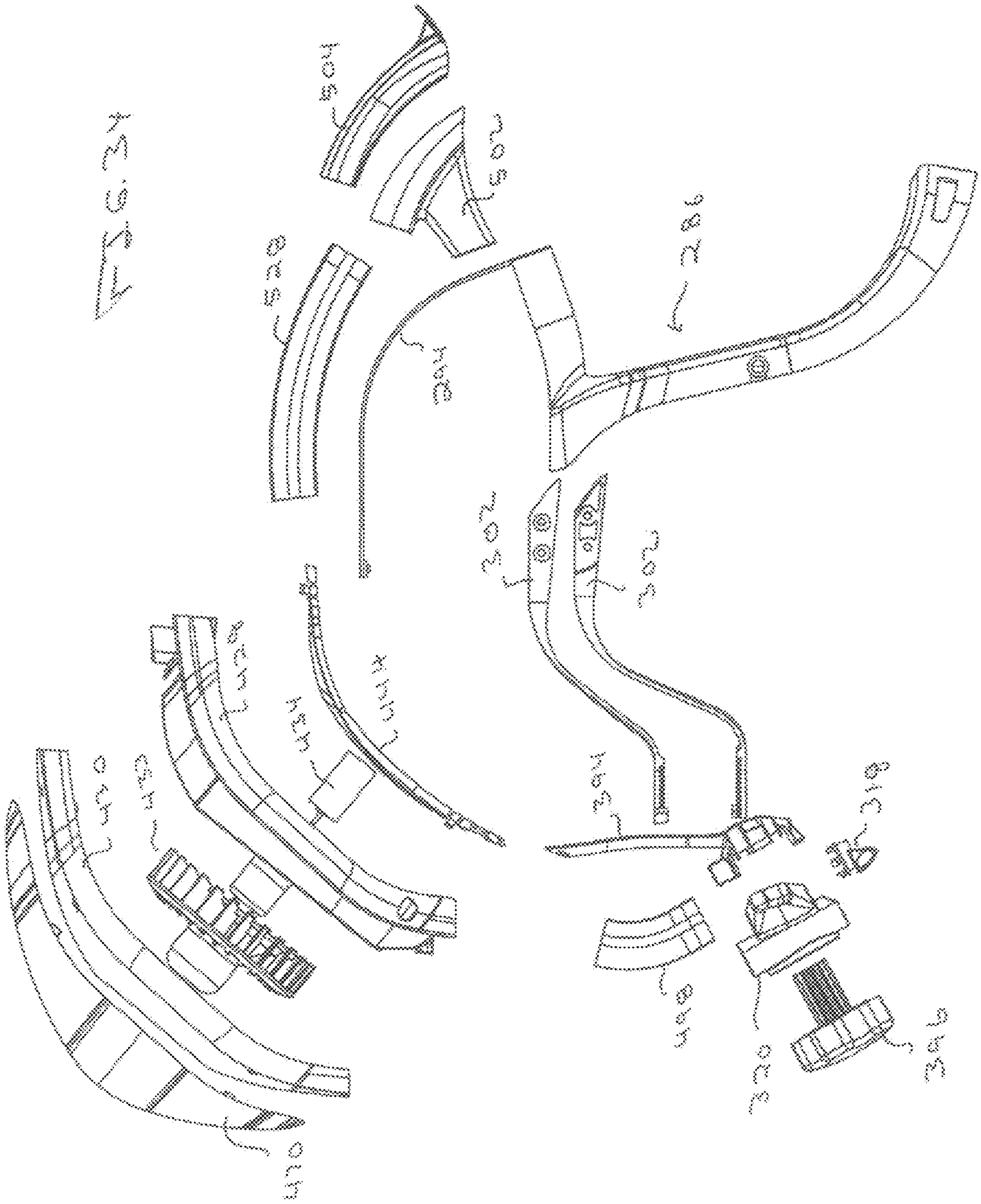
FIG. 34 is an exploded view of the head unit.

An accordion-like rear bellows 498, seen in FIGS. 33 and 34, functions as the conduit from the rear end opening of the ventilation unit 270 to the rear nozzle assembly 282. At the ventilation unit end, rear bellows 498 extends through the generally oval shaped opening formed by the ends of the lower and upper shells 428 and 430, respectively. The forwardmost rib of the rear bellows 498 (rib not identified) is seated in the slot around this opening defined by adjacent lower shell ribs 442 and 444 the aligned adjacent upper shell ribs 458 and 460.

The rear end of rear bellows 498 seats in the oval opening defined by the adjoining top ends of the rear nozzle assembly shell trunk 322 and plate collar 378. The rear most rib of the rear bellows 498 is seated in the slot around this opening defined by shell ribs 330 and 332 and adjacent collar ribs 384 and 386.

Figure 47:
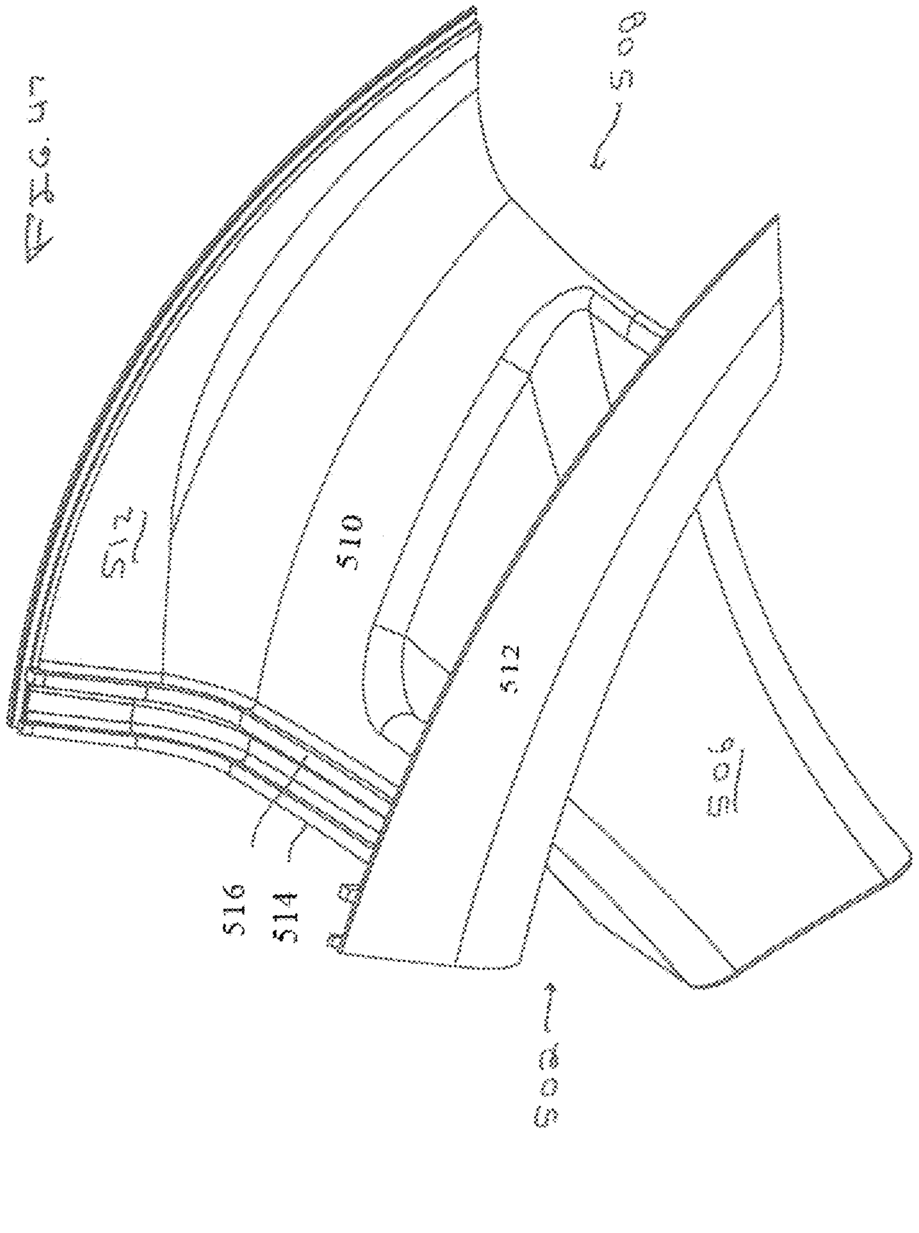
FIG. 47 is a perspective view of the front nozzle assembly pedestal.

Front nozzle assembly 280 includes a pedestal 502 and a cap 504. The pedestal 502, seen best in FIG. 47, includes a hollow post 506. Post 506 has a generally rectangular cross sectional profile. The base of the post 506 is secured to the section of the face frame support strap 294 immediately above the forehead band 288. Not shown are the fasteners used to accomplish this securement.

Above post 506, pedestal 502 has a head 508. The head has a planar base 510 that extends outwardly from the front, back and sides of the pedestal. Side walls 512 that curve upwardly from the opposed longitudinal sides of the base 510 complete the head 508. Two ribs 514 and 516 extend inwardly from the inner surfaces of the base 510 and side walls 512. Rib 514 is located around the rear end of the pedestal head 508. Rib 516 is parallel to and located forward of rib 514.

Figure 48:
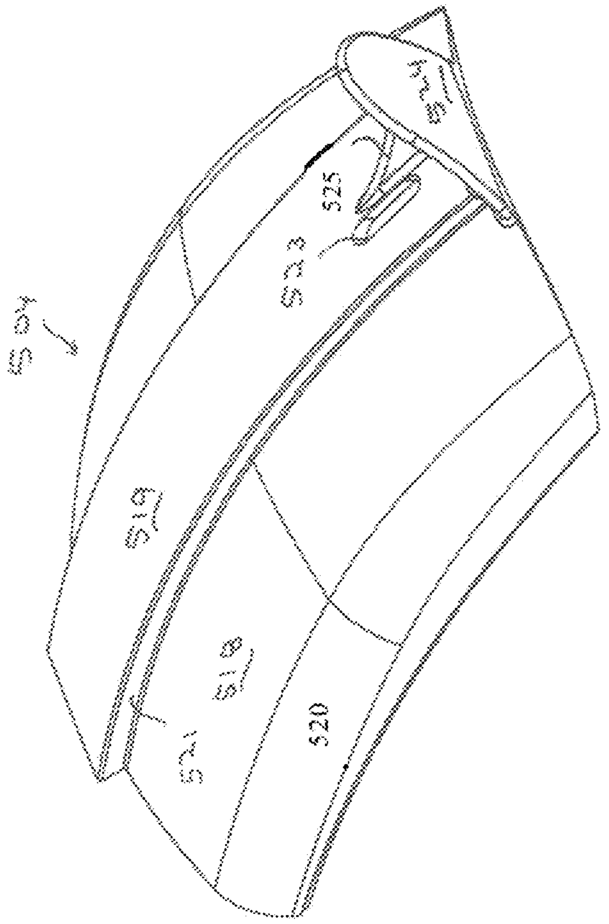
FIG. 48 is a perspective view of the front nozzle assembly cap.

Cap 504 seats over the pedestal head 508 to complete the front nozzle assembly 280. Referring to FIG. 48, it can be seen that the cap 504 has a top panel 518 from which two side panels 520 curve downwardly (one side panel shown). The cap 504 is further formed so that the top panel 518 is curved along its longitudinal axis. When the front nozzle assembly 280 is put together, the cap side panels 520 abut the top edges of the pedestal head side walls 512.

The front nozzle assembly cap 504 is further shaped so that a rib 519 extends along the longitudinal axis of the cap top panel 514. The rib 519 is formed so as have slots 521 that extend inwardly from the sides (one slot shown.) At the front end of the top panel 518, a tab 524 extends upwardly. Tab 524 is thus located immediately in front of rib 519. A small web 525 extends perpendicularly from tab 524 to the rib 519. Flange 525 extends upwardly from the longitudinal axis of the rib 519. Immediately behind tab 524, an elongated slot 523 is formed in the rib 519.

While not illustrated, it should be appreciated that a pairs of ribs extend inwardly from the inner surface of the cap top panel 518 and side panels 520. A first one of these ribs abuts pedestal rib 514. The second cap rib abuts pedestal rib 516.

Figure 31A:
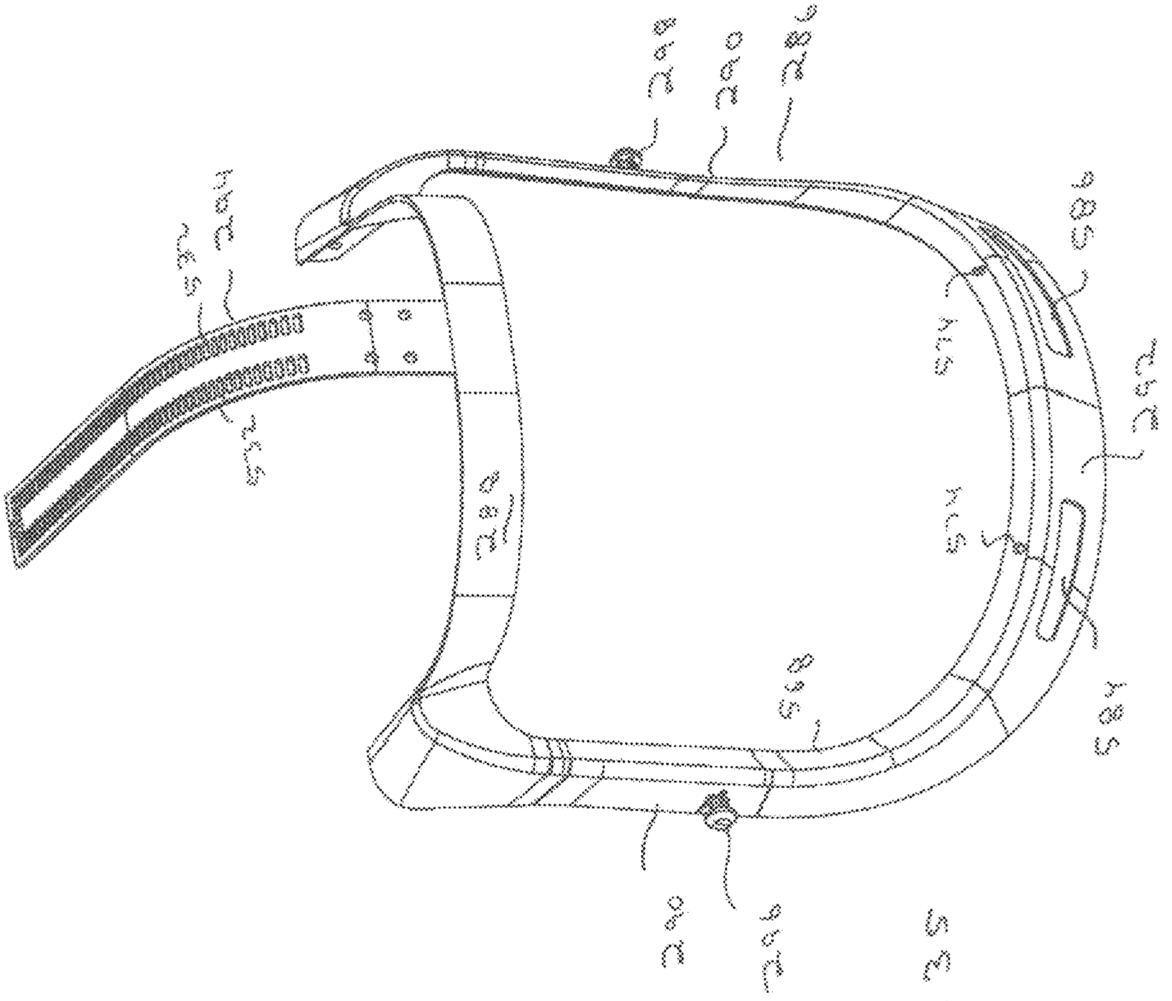
FIG. 31 is a side view of the head unit.

A front bellows 528 seen best in FIGS. 31 and 34, similar in structure to rear bellows 498, serves as the conduit through which the forced air from the ventilation unit 274 is output to the front nozzle assembly 280. The rear most rib internal to front bellows seats in the slot defined by lower shell ribs (not illustrated) and adjacent upper shell ribs 454 and 456. The front most rib internal to the front bellows 528 seats in the slot defined by pedestal ribs 514 and 516 and the adjacent complementary ribs formed on the cap 504.

Support strap 294 assists in the suspension of the ventilation unit 274 above the head of the wearer as now described by reference to FIGS. 29 and 31. Specifically, when the support strap 294 extends through the open front end of the motor cover 444 below the lower shell 428. Returning to FIG. 35, it is noted that the support strap is formed with two rows of parallel openings 532. Openings 532 extend laterally across the support strap 294. The pairs of openings 532 are spaced apart from each other longitudinally along the length of the strap.

When support strap 294 is positioned between the lower shell 428 and the motor cover 444, finger tips 494 seat in a pair of opposed strap openings 532. This engagement of the motor cover 444 to the support strap 294 serves to provide a front support for the ventilation unit 274 above the head of the wearer.

Owing to the flexibility of the rear nozzle assembly arch 388, ventilation unit 274 is able to pivot around the rear attachment of the unit rear nozzle assembly 282. Motor cover fingers 492 are flexible. This means the position of the ventilation unit 274 can be selectively set to be relatively close to or spaced from the front nozzle assembly 280. Collectively, this adjustability of the ventilation unit 274 means that the unit may be positioned relative to the head of the wearer wherein it will least likely impose a strain on the wearer.

Strain on the wearer is also reduced by the fact that the center of gravity of the ventilation unit 274 is relatively close to the seventh cervical vertebra. This goal is accomplished by shaping the components such as the lower shell 428, upper shell 430 fan 433, motor cover 444 and grill unit 470 so that they extend downwardly from their centers. As discussed above, this shaping approximates the back of the skull, the portion of the head against which the ventilation unit is typically fitted.

Still another reason this invention minimizes strain on the wearer is that the head unit is relatively light in weight. The head unit 270, include the head band 272, the ventilation unit 274 the front nozzle assembly 280, the rear nozzle assembly 284 and face frame 286 typically has a weight of less than 450 grams. In more preferred versions of the invention, this assembly has a weight of less than 400 grams.

In regard to the minimization of this strain, experiments with head mounted equipment have shown that the strain is kept to the minimum if the center of mass is located over the seventh cervical vertebra. Thus a wearer of this head unit 270 is able to configure the unit so that the unit's center of mass is located as closely as possible positioned over this landmark. Again this position can be accomplished regardless of the head size of the wearer.

Regardless of the adjustment of the size of the head band 272 and the position/orientation of the ventilation unit 274 relative to the head band, the discharge opening of the front nozzle assembly 280 remains at a fixed position relative to the forehead band 288. This means the transparent shield, which is suspended from the front nozzle assembly, remains a constant distance from the forehead band 288 and thus the face of the wearer. Therefore, the air flow discharged from the front nozzle assembly remains a constant distance away from the face of the wearer, regardless of the sizing of the head unit 270. This means the front nozzle is positioned, regardless of head unit configuration, to ensure the discharge of air is at the appropriate position relative to the wearer's face to ensure, there is proper purging of $CO_2$ away from the face and delivery of relatively cool make up air.

Still another advantage with maintaining the front nozzle assembly 280 at a relatively constant position in front of the face is associated with hood/toga placement. As discussed below the hood/toga face shield 590 (FIG. 52) is suspended from the front nozzle assembly 280. Again since this assembly 280 is at relatively constant position relative to the face, transparent shield 590 is likewise at a constant distance from the face. This means the shield 590 can be located at a position so that regardless of head unit adjustment glare from either the light 276 or ambient light is kept to a minimum.

Similarly, regardless of the adjustment of the head unit, the rear nozzle assembly 282 remains essentially a constant distance from the neck of the wearer. This ensures that air discharged from tip 318, regardless of head size and shape, optimally cool the neck.

Another advantage of so locating the transparent shield 590 essentially a constant distance from the face is that the shield can be sized to ensure that regardless of head size the field of view is essentially constant. In an ideal construction of the invention, no aspect of the head unit and the hood/toga is within the field of view except the transparent shield 590.

This can reduce feelings of claustrophobia an individual may developing using the system.

Figure 50:
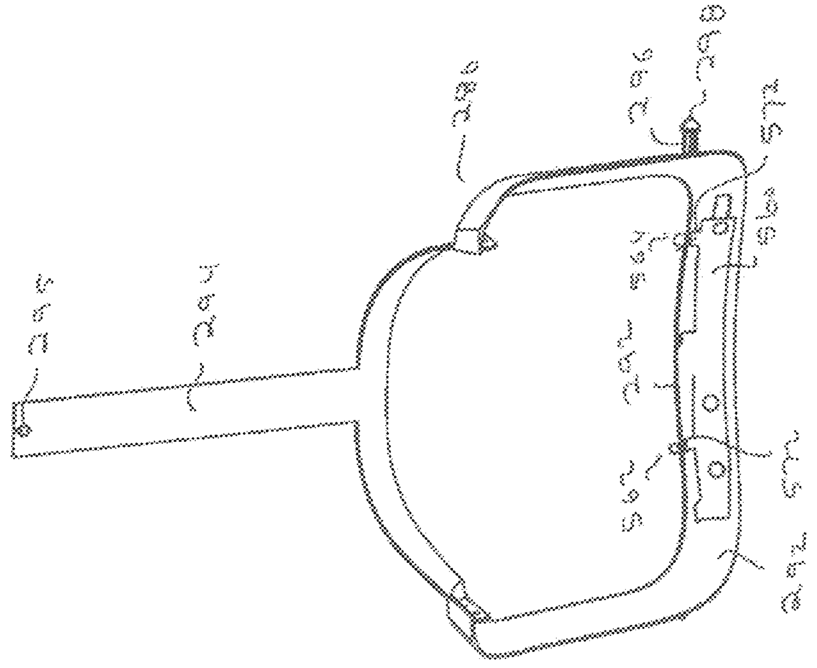
FIG. 50 depicts how the flex circuit is attached to the front frame chin bar.

The support strap 294 is formed at the tail end thereof with a small downwardly directed tab 295 (FIG. 50). This tab extends through slot 490 formed in the motor cover. The tab provides a visual indication of the extent to which the support strap 294 is extended into or retracted away from the ventilation unit 274.

Figure 49:
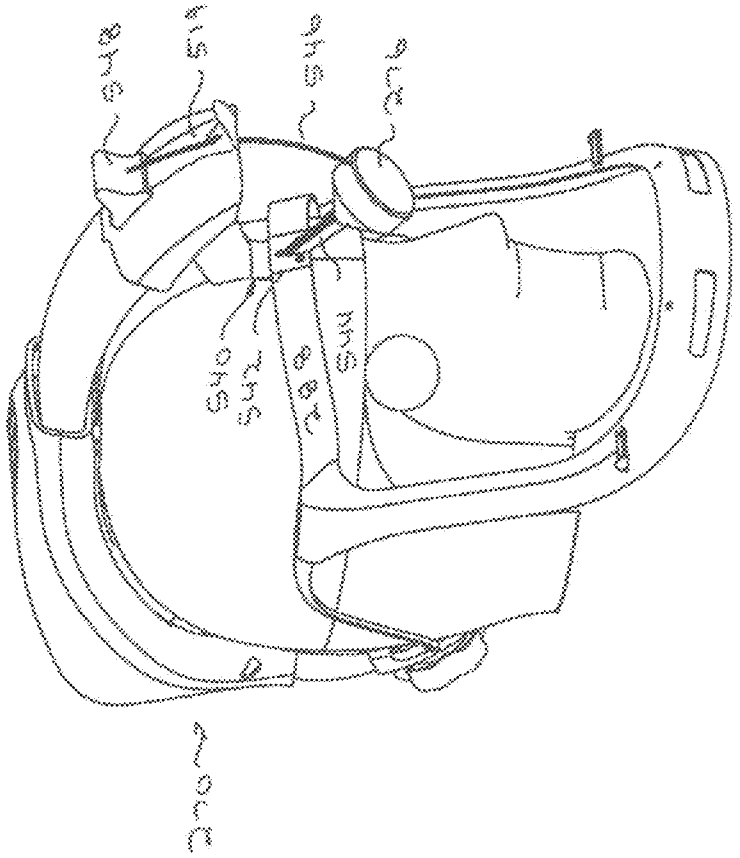
FIG. 49 is a perspective view illustrating how the light is adjustably mounted to the head unit.

As seen in FIG. 49, the light 276 is a self-contained unit that includes an LED (not illustrated) or other light emitting element. Light 276 is pivotally mounted to a bracket 540 that is attached to forehead band 288. Specifically, the bracket 540 includes a flat base 542. Fasteners, (not illustrated,) hold the bracket base 542 to the face frame forehead band 288 immediately below support strap 294. Two arms 544 extend diagonally downward from base 542. The light is pivotally mounted to and between the free ends of the bracket arms 544.

A support wire 546 controls the up/down angle of the light 276. The wire extends from a small tab 548 that is slidably mounted to the rib 519 on the top of the front nozzle assembly. The tab 548 has feet (not illustrated) that sit in rib slots 521. The feet-in-slot arrangement facilitates the friction fitting of the tab 548 along the length of the rib 519 so that the tab can be slid to a left in position.

Wire 546 extends from tab 548 through cap opening 523 to the light unit 276. The pivotal up/down position of the light 276 is set by adjusting the position of the tab 548 along the length of the front nozzle assembly 280.

As seen in FIG. 50, a flex circuit 560 is mounted to the inner surface of the face frame chin bar 292. Flex circuit 560 supports two lower power indicator LEDs 562 and 564 and a microphone 566. While not illustrated it should be understood that layered on the flex circuit are the conductive traces that extend to the LEDs 562 and 564 and the microphone 566.

More particularly, returning to FIG. 35, it can be seen that the face frame 286 around the posts 290 and chin bar 292 has an inwardly directed lip 568. The flex circuit 560 has a main body 570 with generally rectangular shape. Three fingers 572 integral with the flex circuit main body 570 extend upwardly from the main body at longitudinally spaced apart locations along the upper side surface of the main body. The LEDs 562 and 564 are mounted to the outer surface of the two outer flex circuit fingers 572. Each LED 562 and 564 extends through a separate opening 574 formed in the face frame chin bar lip 568.

The microphone 566 is mounted to the center located flex circuit finger 572. This finger 572 wraps around so as to overlap the flex circuit main body 570. A cap (not illustrated) is fit over the chin bar 292 to cover the flex circuit. The microphone 566 extends through an opening in this cap so as to be directed to the mouth of the wearer.

Figure 22:
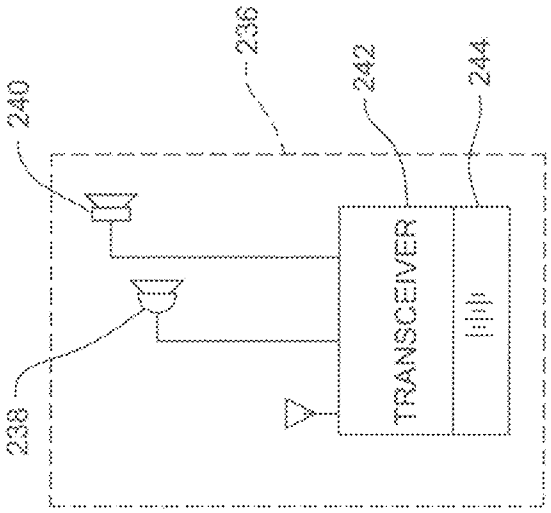
FIG. 22 is an electrical block diagram of a communications system.
Figure 25:
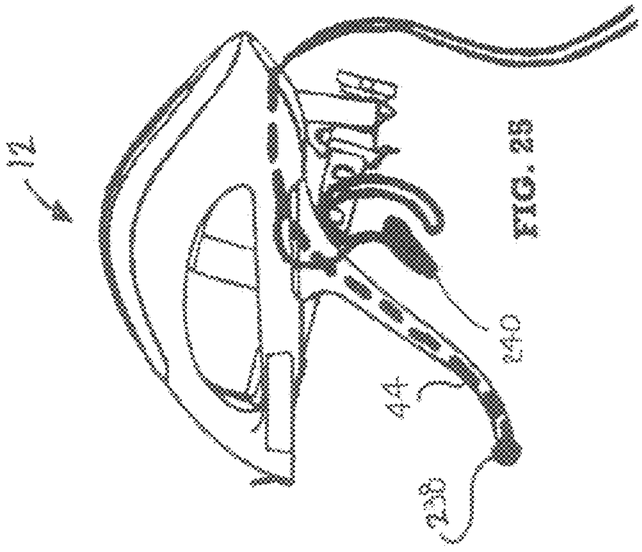
FIG. 25 is a side view of the helmet assembly illustrating the microphone and the speaker of the communications system.
Figure 24:
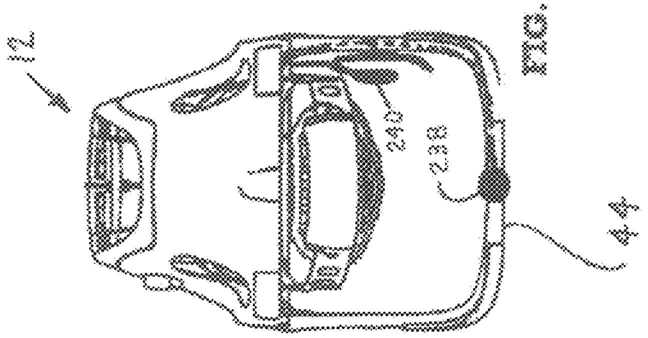
FIG. 24 is a front view of the helmet assembly illustrating the microphone and a speaker of the communications system.
Figure 23:
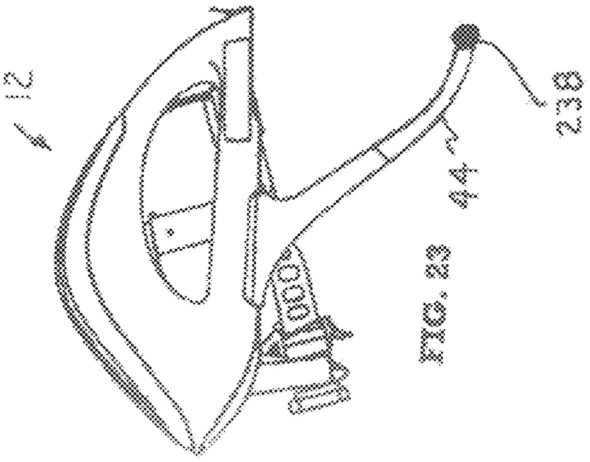
FIG. 23 is a side view of the helmet assembly illustrating a microphone of the communications system.

A first one of the LEDs, arbitrarily LED 562, performs the function of the power monitor enunciator 234 (FIG. 22). Thus LED 564 is illuminated whenever the power monitoring circuit determines that the battery 562 is almost discharged.

The second LED, LED 564, and microphone 566 are associated with the communications unit internal to the head unit 270. The microphone 566 converts the words spoken by the wearer into electrical signals. The transceiver controller circuit 256 actuates switch 258 to place the communications system in the "mute" mode.

Figure 51:
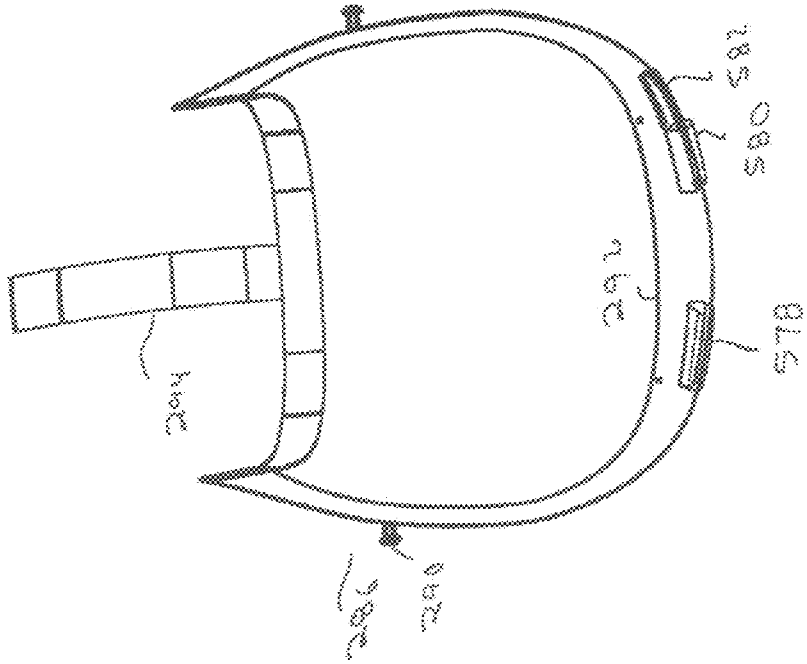
FIG. 51 depicts how switches are mounted to the front frame chin bar.

Also mounted to chin bar 292 are the wearer actuated switches 578, 580 and 582, seen in FIG. 51, for controlling the system. The switches 578, 580 and 582 are formed from silicon rubber and have carbon contacts. A first one of the switches, switch 578, is mounted in a first opening 584 defined by the chin bar 292. The remaining two switches 580 and 582 are mounted in a second chin bar opening 586.

Flex circuit main body 570 is disposed over the chin bar openings 584 and 586. Formed on these surfaces of the flex circuit 560 are the conductive traces against which the switch carbon contacts abut (contacts not shown.) A first one of the switches, switch 578, performs the function of switch 258. This switch 578 is actuated to take the communications system in and out of the mute mode. The remaining two switches are analogues to switches 120 and 122. Switches 580 and 582 thus are depressed to regulate the speed of the ventilation unit fan 278.

An advantage of the above placement of switches 578, 580 and 582 is that the switches are immediately in front of the wearer. This makes it relatively easy for the wearer, by moving a hand towards his/her head to actuate the switches. Thus, an individual wearing this unit 270, for most definitions of a sterile field, does not have to move his/her hand out of the field in order to actuate the switches.

Figure 52:
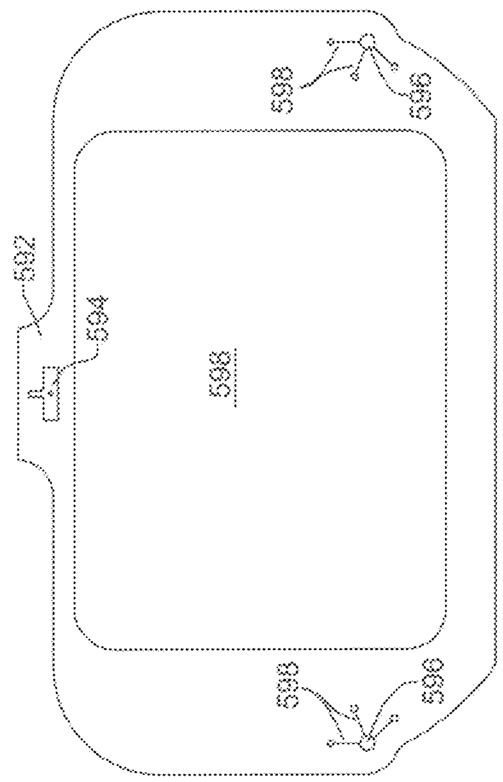
FIG. 52 is a plan view of the hood/toga transparent shield used with the head unit.

FIG. 52 illustrates the transparent shield 590 attached to a hood or toga used with head unit 270. Shown as a dashed line is the position internal to the perimeter of the shield 590 around which the sterile material forming the hood or toga is secured to the shield 590. The top of the shield 590 is formed to have a tab 592. Tab 592 has a slot shaped opening 594. Opening 594 is rectangular in shape and on an axis parallel to the latitudinal, right-to-left axis of the shield 590. The opening 594 further has an extension slot 595 that extends upwardly. Extension slot 595 is centered on the longitudinal, up-to-down axis of the shield 590.

Shield 590 is formed to have two circular openings 596. Each opening 596 is located adjacent a side edge of the shield 590 above the curved edge that functions as the transition edge between the side edge and the shield bottom edge. Cuts 598 extend radially from each opening 596. It is appreciated that openings 594 and 596 are located in the perimeter section of the shield 590. This is the section of the shield that is covered by the material forming the sterile hood or toga.

When the hood or toga is to be fitted to head unit 270, the shield is placed over the head unit so that the tab 524 integral with the front nozzle assembly 280 is inserted in shield opening 590. Front nozzle assembly web 525 seats in opening extension slot 595. This seating of the shield 590 over the static tab 524 and web 525 serves to align the shield with the outer components of the head unit 270 and prevent rotation of the aligned shield.

Shield 590 is then curved around the face frame 286. This flexing of the shield 590 brings each of the shield openings 594 into alignment with a separate one of the face frame pins 296. Shield openings 594 are smaller in diameter than heads 298 of the mounting pins 296. Thus, at this time the shield 590 is snap fitted over pins 296. This engagement secures the shield 590 and the associated hood or toga, to the head unit.

In this version of the invention, there is spacing of at least 3 cm between the topmost attachment of the shield 590 to tab 524 and where the shield is attached to the two laterally spaced apart pins 296. As a consequence of this arrangement, when the shield is fitted to the head unit 270, the radius of curvature of the shield varies along the top to bottom longitudinal axis. More particularly at the top of the shield, adjacent the tab, there is a relatively wide diameter radius of curvature. Between pins 296 the shield has a smaller diameter of curvature, a more pronounced curvature.

An advantage of this construction is that near eye level the less curved, relatively flat, shield profile minimizes the amount glare. This arrangement also serves to assist in the shield's suspension of the material forming the hood/toga away from the forehead and top of the wearer's head. This feature provides a relatively large transparent shield-hood free space around the top of the head. This reduces the effort required to fit auxiliary equipment, such as a heads up display, a camera, other communication devices or lights around the wearer's head.

Another advantage of this configuration of this invention is that openings 594 and 596 serve as the means integral with the shield 590 for holding the shield to the head unit 270. This arrangement eliminates the need to provide snap heads, magnets or hook-in-fabric fastening strips to the hood/toga on the shield in order to facilitate the attachment of the shield to the head unit. The elimination of these fastening members results in a like elimination of the costs associated with providing the shield with these components.

VII. Alternative Light, Communications and Fan Unit

Figure 53:
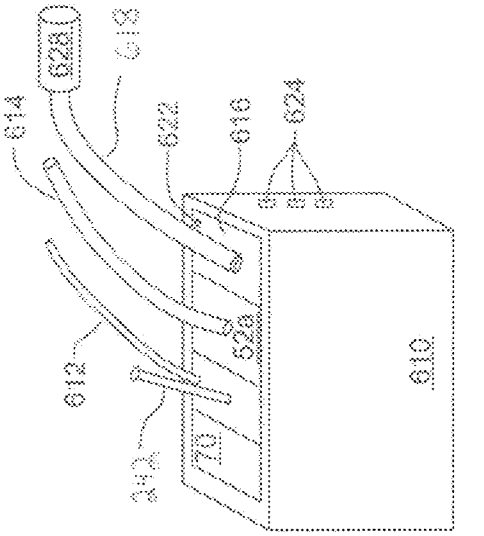
FIG. 53 is a block diagram of how the power supply, the fan, the transceiver and light generating source of the personal protection system of this invention are contained in a common housing.

FIG. 53 is a diagrammatic illustration of how a number of components of the personal protection system 10 of this invention are, in some versions of the invention, contained in a single housing 610. Housing 610 is configured to be worn someplace on the individual. For example, the housing 610 may include a clip (not illustrated) so it can be attached to an article of clothing such as a belt. The housing 610 may alternatively include a strap (not illustrated) so it can be strapped to the individual.

Internal to the housing 610 is the power supply 70. Also integral with the housing is the transceiver 242. A cable 612 that leads to head of the individual includes the conductors that are connected to the microphone 238 and speaker 240. In these and other versions of the invention, the microphone and speaker may be built into a head set separate from the structure used to suspend the hood. Also disposed inside housing 610 is a fan 52*a*. The majority of the airflow output by the fan is discharged through a flexible tube 614. Tube 614 is connected to the output vents in the body support structure from which the air should be discharged.

A light generating unit 616 is also contained housing 610. The light generating 616 unit may contain an LED or an incandescent bulb such as a halogen bulb. A fiber optic cable 618 extends from the light generating unit 616. The distal end of the fiber optic cable is attached to the light emitting head 620 attached to the body support structure.

In this version of the invention, the outlet flow from the fan 52*a* is discharged from two ports, (not shown). The proximal end of tube 614 is connected to one of the ports. The second port leads to a duct 622 in the housing. Duct 622 is located between the face of the sub housing 302 in which the light generating unit 616 that would be closest to the wearer of the system 10 and the adjacent structural wall of the housing 610. Thus, the system is actuated fan 52*a* continually blows new make-up air into duct 298. The air is discharged from exhaust ports 624 formed in the side of the housing 610. This constant supply of this air minimizes the extent to which the heat generated by the light generating unit 616 convectively warms the housing 610 and the adjacent portion of the body of the wearer.

An advantage of this version of the invention is that the majority of the weight of the active components of the personal protection system 10 are suspended from the waist or other body part of the user where the presence of such weight does not induce significant appreciable physical stress.

VIII. Alternative Features

Body-worn support structures for suspending the hood other than the illustrated and described helmet may be employed in this invention. One possible structure is a shoulder mounted frame. This frame contains structural members for supporting the hood. This fan or light generating unit may be directly mounted to this support structure. In versions of the invention where both components are so mounted to the support structure, a duct is present to circulate a fraction of the air discharged by the fan around the light generating unit. Alternative embodiments of this version of the support structure of this invention may simply have ducts for receiving the air and ports through which the air is discharged and a light emitting head for emitting the light. In these versions of the invention the waist mounted unit contains the fan and the light generating unit.

In some versions of the invention, the body support structure includes a vest like garment worn about the trunk of the wearer. Integral with this garment are one more supports from which the hood is suspended.

Also, in some versions of the invention, the support unit may include an outwardly directed speaker. For example, this speaker could be mounted to flex circuit 560. In these versions of the invention, there is also an amplifier capable of amplifying the signals produced by microphone 566. These signals are broadcast by this speaker through the hood/toga into the surrounding environment. This arrangement eliminates the need to provide RF signal transceivers.

It may also be desirable to provide the transparent shield of the hood/toga with at least one section that transmits sound. (Generally the material forming the transparent shield absorbs or reflects sound.) Thus, the transparent shield could be formed an opening that is generally aligned with the mouth of the wearer. This opening is covered with a section of the sterile material from which the rest of the hood/toga is formed. This construction can eliminate the need to provide any assembly for broadcasting or amplifying the speech of the wearer.

Alternatively the transparent shield opening may be covered with material that absorbs and retransmits sound waves. Electrometric materials such as a silicon rubber may perform this function.

It should likewise be appreciated other duct assemblies may be provided to direct air from the ventilation fan to the light generating unit. For example, there may be a duct within either the front or rear nozzle assembly that leads directly to the light source. This duct extends to a conduit, which may be flexible, that extends to the light source. In some versions of the invention, this conduit opens into the inside of the housing of the light source. Thus, the air passes directly over the heat generating, light emitting elements or heat sink elements internal to the light source housing.

Alternatively, in some versions of this invention, the light source has its own ventilation fan. This arrangement may be useful if it is necessary to flow large volumes of air over the light source.

In either of the above versions of the invention, the light source may be formed with a conduit through which the air introduced into the source is exhausted. This conduit has an exhaust port that opens away from the wearer.

It may also be desirable to position a temperature sensitive transducer adjacent the heat generating components of the light source. The signal output by this sensor can be used to regulate the light source and/or the fan that provides the air for cooling the light. Thus when this sensor indicates the temperature adjacent the light source is rising to uncomfortable levels, the current regulator 230 could respond by reducing the power supplied to the light. When this condition is detected, alternatively, microcontroller 118 could step up the speed of the fan so as to increase the air flow over the light source.

It should be appreciated that there are reasons other than wearer comfort for so controlling the temperature of the light source and the space surrounding the source. This excessive heating of the light source can appreciably diminish its useful life. In some instances, the excessive heating of the source can cause its failure. Also, this heat, if not exhausted, could potentially warm the user to the point at which the skin blisters or is burned.

In some versions of the invention a heat pipe formed from thermally conductive material extends from the light source. This heat pipe may extend to a duct that extends from the fan.

An anti-glare hood may be fitted over the light emitting head so as to extend between the head and the inner surface of the transparent shield. The inner surface of this hood is formed from light reflective or absorbing material. This arrangement reduces, if not eliminates, the amount of light emitted by the head that is reflected by the inner surface of the transparent shield back to the wearer as glare.

This hood may be formed from rigid or flexible material. One advantage of employing flexible material is that it can ensure the hood abuts the inner surface of the transparent shield when the shield is fitted to the helmet or head unit.

Some light systems may also be configured to provide the wearer with short bursts of high intensity light. This light is provided in response to depression of a specific control switch. The light burst may be provided in situations in which a very large amount of light is required. Only a burst of light for a period between 1 to 10 minutes is provided. Only the burst is provided so as to minimize the possibility this high driving of the light source results in excessive heat being output or the source or the source being excessively operated to the level at which it may burn out.

Devices other than the bellows may be employed as the adjustable conduits that connect the ventilation unit 274 to the front and rear nozzle assemblies 280 and 284, respectively. For example, telescoping tubes and/or tubes with flexile joints may be employed as these conduits.

Further, there is no requirement that in all versions of the invention two spaced apart support members, support strap 294 and arch 394 both be provided to suspend the ventilation unit 274 above the head band 272. In some versions of the invention, a single support member or support post may be all that is required.

Also, in not all versions of the invention may it be necessary to attach the front ventilation unit 280 to the head band 272. Thus, in some versions of the invention the adjustable conduit that extends from the ventilation unit 274 to the front nozzle assembly 280 provides support for suspending the front nozzle assembly in a specific position relative to the head band.

Further, there is no requirement that the all versions of the invention include both the front and rear nozzle assemblies 280 and 282. Clearly most units will include the front nozzle assembly.

Thus it should be clear that the foregoing description is directed to specific embodiments of the invention. Therefore, it is an object of the appended claims to cover all such modifications and variations that come within the true spirit and scope of this invention.

What is claimed is:

1. A surgical protection system to define a barrier between a user and an external environment, the surgical protection system comprising:
- a surgical helmet assembly comprising:
  - a shell;
  - a face frame coupled to the shell;
  - a static tab;
  - a first fastener disposed on the face frame; and
  - a fan mounted in a cavity of the shell and configured to circulate air about the user;
- a hood configured to be at least partially disposed over the surgical helmet assembly, the hood including a material defining an opening;
- a transparent face shield formed from flexible material and disposed within the opening of the hood, the transparent face shield comprising:
  - opposed top and bottom portions and an axis that extends from top-to-bottom of the transparent face shield;
  - a tab extending from the top portion of the transparent face shield; and
  - wherein the transparent face shield defines an opening configured to receive the static tab of the surgical helmet to align the hood to the surgical helmet, and
- wherein the first fastener disposed on the face frame is configured to facilitate removable attachment of the transparent face shield to the surgical helmet assembly via the first fastener.

2. The surgical protection system of claim 1, wherein the first fastener comprises a hook or loop fastener of the surgical helmet.

3. The surgical protection system of claim 2, wherein the transparent face shield further comprises a second fastener configured to engage the hook or loop fastener of the surgical helmet assembly removably couple the transparent face shield to the surgical helmet assembly.

4. The surgical protection system of claim 3, wherein the face frame is formed from a flexible plastic, the face frame comprising:
- a forehead band;
- a support post extending downwardly from each of the opposed ends of the forehead band; and
- a chin bar extending between opposed bottom ends of each of the support posts.

5. The surgical protection system of claim 3, wherein the surgical helmet assembly further comprises a light assembly.

6. The surgical protection system of claim 5, wherein the light assembly further comprises a control arm connected to the light assembly for pivoting the light assembly.

7. The surgical protection system of claim 5, wherein the light assembly further comprises a light angle adjustment mechanism, the light angle adjustment mechanism configured to allow the user to change a direction of a beam of light emitted from the light assembly so it can be directed to a specific location.

8. The surgical protection system of claim 5, wherein the light assembly is positioned adjacent a ventilation duct of the surgical helmet assembly, the fan is configured to blow air through the ventilation duct that is discharged through one or more exhaust ports to minimize the extent to which the heat generated by the light assembly warms the light assembly and the user.

9. The surgical protection system of claim 3, wherein the surgical helmet assembly is configured to provide an audible indication when the fan has reached a minimum volume and a maximum volume of air flowing into the surgical helmet assembly.

10. The surgical protection system of claim 3, wherein the surgical helmet assembly is configured to provide an audible indication to the user when a maximum or a minimum motor speed of the fan is reached.

11. The surgical protection system of claim 3, wherein the transparent face shield further comprises an anti-reflective coating.

12. The surgical protection system of claim 3, wherein the transparent face shield further comprises an anti-refractive coating.

13. The surgical protection system of claim 3, wherein the surgical helmet assembly further comprises:

a head band including a knob for adjusting a circumference of the head band; and a strap extending from the head band to adjustably mount the head band to the shell.

14. The surgical protection system of claim 5, further comprising a sensor, the sensor configured to provide an output signal, the helmet being configured to control the fan based on the output signal.

15. A surgical protection system to define a barrier between a user and an external environment, the surgical protection system comprising:

a surgical helmet assembly comprising:

a shell;

a face frame coupled to the shell;

a first fastener disposed on the face frame; and a fan mounted in a cavity of the shell and configured to circulate air about the user;

a hood defining the barrier between the user and the external environment, the hood comprising:

a first material; and a filter element coupled to the first material, the filter element configured to filter air passing through hood; and a transparent face shield disposed in an opening defined by the hood, the transparent face shield configured to allow the user to see the external environment through the hood, the transparent face shield comprising:

a tab extending from a top portion of the transparent face shield;

a first opening defined in the transparent face shield; and wherein the transparent face shield is coated with an anti-reflective material configured to reduce the glare observed by the user through the transparent face shield.

16. The surgical protection system of claim 15, further comprising a fastener disposed on the transparent face shield, the fastener configured to facilitate attachment of the transparent face shield to the surgical helmet.

17. The surgical protection system of claim 16, wherein the first opening comprises a rectangular shape; and wherein a longitudinal axis of the first opening is generally perpendicular to an axis that extends from top-to-bottom of the transparent face shield.

18. The surgical protection system of claim 17, wherein the first opening is at least partially defined by the tab extending from the top portion of the transparent face shield.

19. The surgical protection system of claim 18, wherein the surgical helmet assembly further comprises a light assembly.

20. The surgical protection system of claim 19, wherein the light assembly further comprises a light angle adjustment mechanism, the light angle adjustment mechanism configured to allow the user to change a direction of a beam of light emitted from the light assembly so it can be directed to a specific location.

21. The surgical protection system of claim 20, wherein the surgical helmet assembly is configured to provide an audible indication to the user when a maximum or a minimum motor speed of the fan is reached.

22. A surgical protection system to define a barrier between a user and an external environment, the surgical protection system comprising:

a surgical helmet assembly comprising:

a shell;

a face frame coupled to the shell;

a static tab;

a hook or loop fastener disposed on the face frame;

a fan mounted in a cavity of the shell and configured to circulate air about the user; and a sensor, the sensor configured to provide an output signal, the helmet being configured to control the fan based on the output signal;

a hood including a first material and a second material, the first material defining an opening;

a transparent face shield disposed in an opening defined by the hood, the transparent face shield configured to allow the user to see the surrounding environment through the hood, the transparent face shield comprising:

a tab extending from a top portion of the transparent face shield;

a first opening defined in the transparent face shield; and a fastener configured to engage the hook or loop fastener of the surgical helmet assembly to facilitate attachment of the transparent face shield to the surgical helmet assembly.

23. The surgical protection system of claim 22, further comprising the tab extending from a perimeter section at the top portion of the transparent face shield, the perimeter section being covered by a portion of the first material.

24. The surgical protection system of claim 23, wherein the second material comprises a filter element, the filter element configured to filter air passing through the hood.

25. A surgical garment assembly configured to be removably coupled to a surgical helmet including a fan and a static tab, the surgical garment assembly comprising:

a hood comprising a first material defining an opening, the hood configured to be at least partially disposed over the surgical helmet;

a transparent face shield formed from a flexible material and disposed within the opening of the hood, the transparent face shield having opposed top and bottom portions, the transparent face shield comprising:

a tab extending from the top portion of the transparent face shield;

a fastener disposed on the transparent face shield configured to facilitate attachment of the transparent face shield to the surgical helmet, and wherein the transparent face shield defines an opening configured to receive the static tab of the surgical helmet to align the hood to the surgical helmet.

26. The surgical garment assembly of claim 25, wherein the transparent face shield further comprises a perimeter section wherein the first material of the hood is secured to the transparent face shield at a position internal to the perimeter of the transparent face shield such that the perimeter section is covered by a portion of the first material of the hood.

27. The surgical garment assembly of claim 26, wherein the opening is defined in the perimeter section of the transparent face shield that is covered by the first material of the hood; and wherein the transparent face shield has an axis that extends from top-to-bottom of the transparent face shield bisecting the transparent face shield, the opening positioned on the axis of the transparent face shield.

28. The surgical garment assembly of claim 27, wherein the transparent face shield further comprises an anti-reflective coating to enhance vision through the transparent face shield.

29. The surgical garment assembly of claim 27, wherein the transparent face shield further comprises an anti-refractive coating to enhance vision through the transparent face shield.

30. The surgical garment assembly of claim 27, wherein the opening is a slot-shaped opening comprising a generally rectangular shape; and wherein a longitudinal axis of the slot-shaped opening is generally perpendicular to the axis that extends from top-to-bottom of the transparent face shield.

* * * * *